United States Patent
Lee et al.

(10) Patent No.: US 12,445,173 B2
(45) Date of Patent: Oct. 14, 2025

(54) METHOD FOR CONTROLLING BEAM IN WIRELESS COMMUNICATION SYSTEM, AND APPARATUS THEREFOR

(71) Applicant: LG ELECTRONICS INC., Seoul (KR)

(72) Inventors: Hojae Lee, Seoul (KR); Sangrim Lee, Seoul (KR); Kyungho Lee, Seoul (KR); Kijun Jeon, Seoul (KR); Jayeong Kim, Seoul (KR); Byungkyu Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/695,260

(22) PCT Filed: Sep. 28, 2021

(86) PCT No.: PCT/KR2021/013219
§ 371 (c)(1),
(2) Date: Mar. 25, 2024

(87) PCT Pub. No.: WO2023/054739
PCT Pub. Date: Apr. 6, 2023

(65) Prior Publication Data
US 2024/0340044 A1    Oct. 10, 2024

(51) Int. Cl.
*H04B 7/02* (2018.01)
*H04B 7/0408* (2017.01)
*H04B 7/06* (2006.01)

(52) U.S. Cl.
CPC ....... *H04B 7/0408* (2013.01); *H04B 7/06952* (2023.05)

(58) Field of Classification Search
CPC ...... H04B 7/0408; H04B 7/10; H04W 72/046
(Continued)

(56) References Cited

U.S. PATENT DOCUMENTS

| | | |
|---|---|---|
| 10,893,542 B2 | 1/2021 | Cho et al. |
| 2015/0351103 A1 | 12/2015 | Kim et al. |

(Continued)

FOREIGN PATENT DOCUMENTS

| | | |
|---|---|---|
| KR | 10-2015-0137612 | 12/2015 |
| KR | 10-2017-0041115 | 4/2017 |
| WO | 2020-032862 | 2/2020 |

OTHER PUBLICATIONS

PCT International Application No. PCT/KR2021/013219, International Search Report dated Jun. 23, 2022, 4 pages.

(Continued)

*Primary Examiner* — Zewdu A Kassa
(74) *Attorney, Agent, or Firm* — LEE, HONG, DEGERMAN, KANG & WAIMEY

(57) ABSTRACT

A method performed by means of a first wireless device in a wireless communication system, according to one embodiment of the present specification, comprises the steps of: transmitting, to a second wireless device, a first signal to which a first specific beam is applied; transmitting, to the second wireless device, a second signal to which a second specific beam is applied; receiving, from the second wireless device, feedback information generated on the basis of the first signal and the second signal; and determining, on the basis of the feedback information, a beam related to the second wireless device.

13 Claims, 35 Drawing Sheets

(58) Field of Classification Search
USPC .............. 375/267, 260, 259, 219, 295, 316
See application file for complete search history.

(56) References Cited

U.S. PATENT DOCUMENTS

2017/0338874 A1  11/2017  Pratt et al.
2019/0053286 A1*  2/2019  Cho .................... H04B 7/0617
2020/0007197 A1  1/2020  Kang

OTHER PUBLICATIONS

European Patent Office Application Serial No. 21959510.5, Search Report dated Jun. 24, 2025, 9 pages.

* cited by examiner

[FIG. 1]
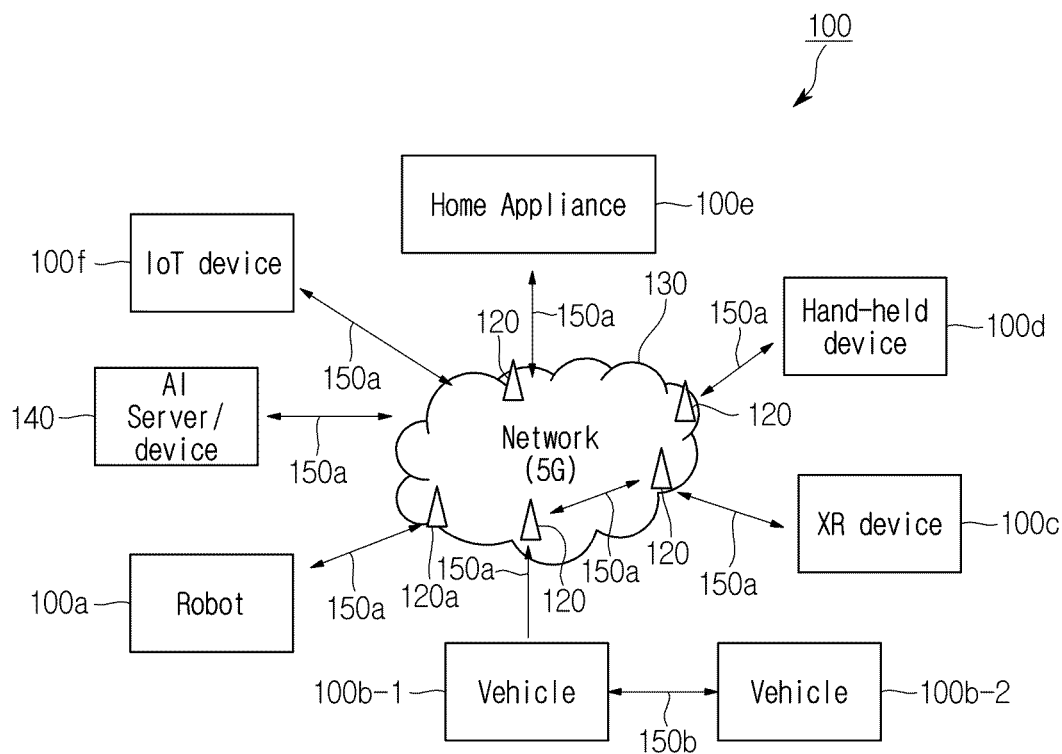
[FIG. 2]
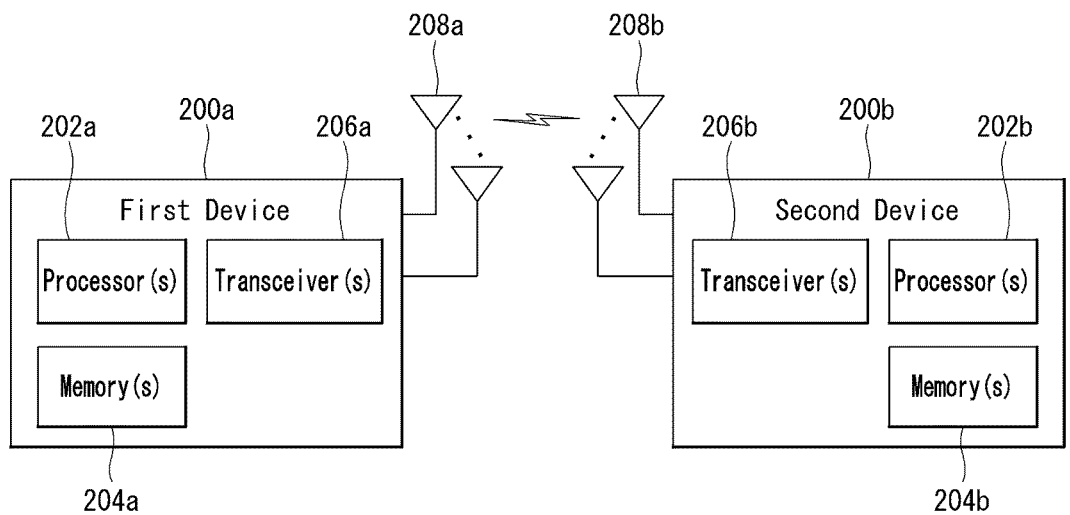

【FIG. 3】
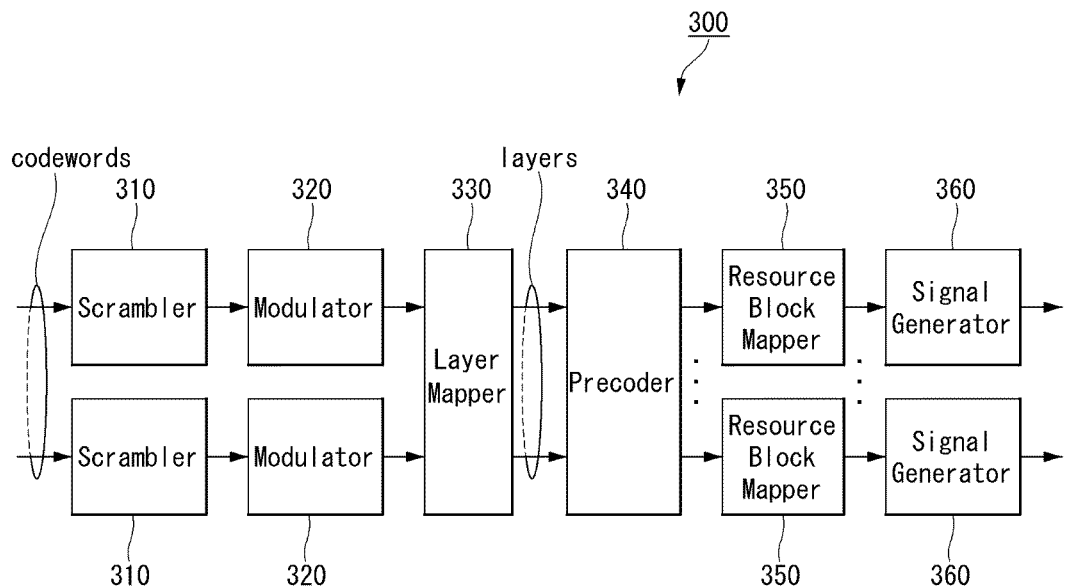
【FIG. 4】
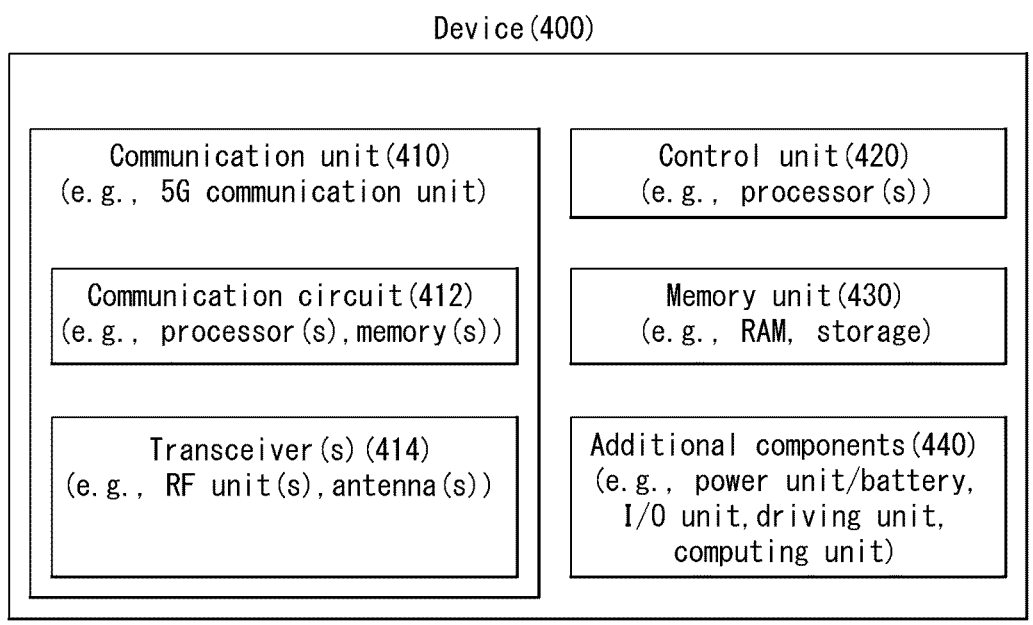

[FIG. 5]
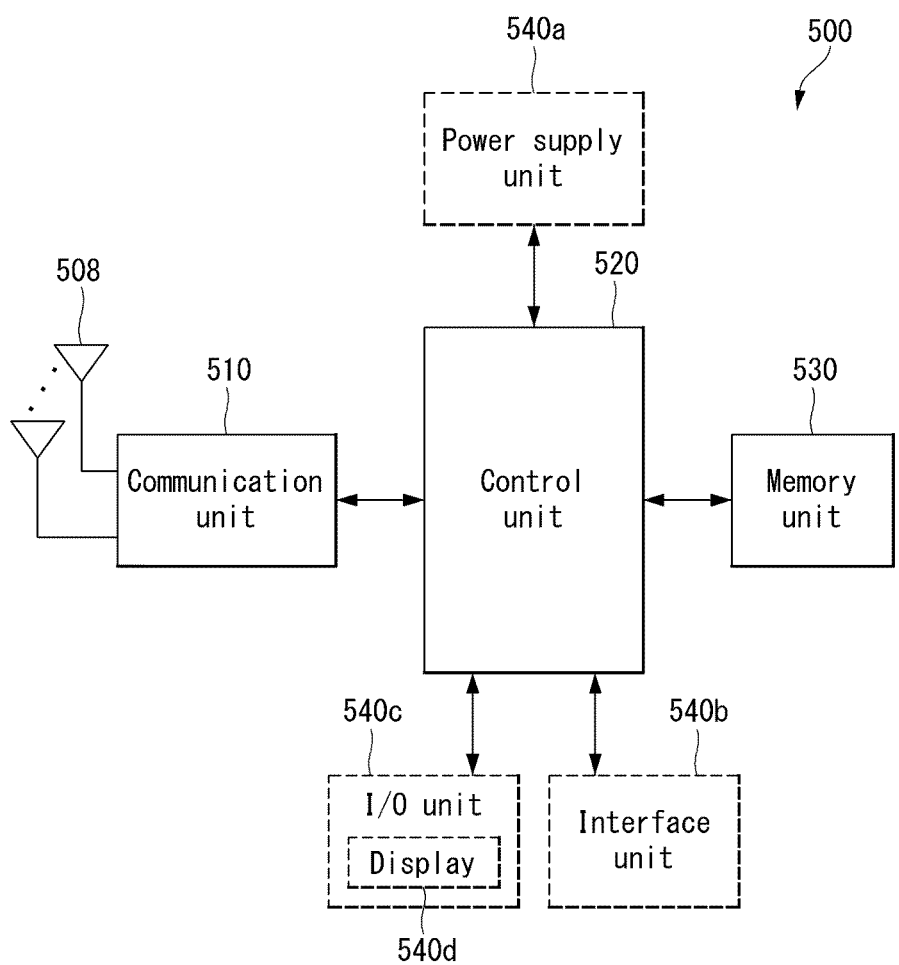

[FIG. 6]
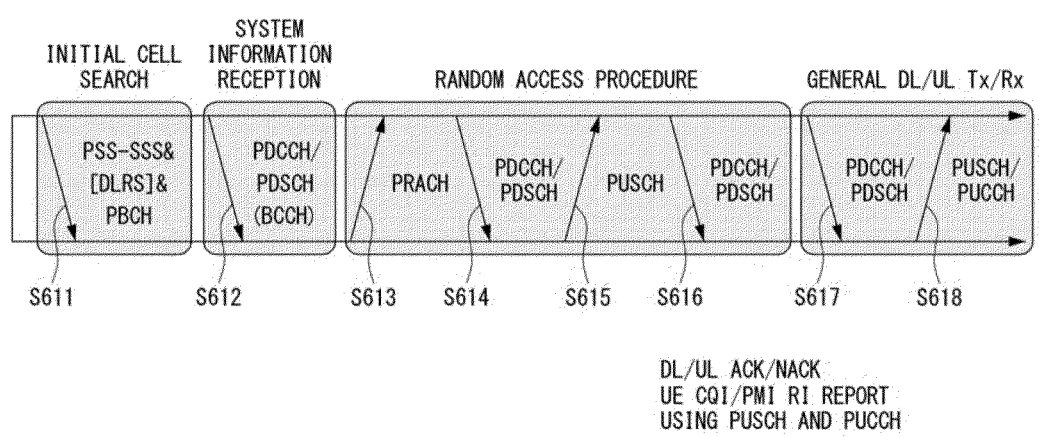
DL/UL ACK/NACK
UE CQI/PMI RI REPORT
USING PUSCH AND PUCCH

[FIG. 7]
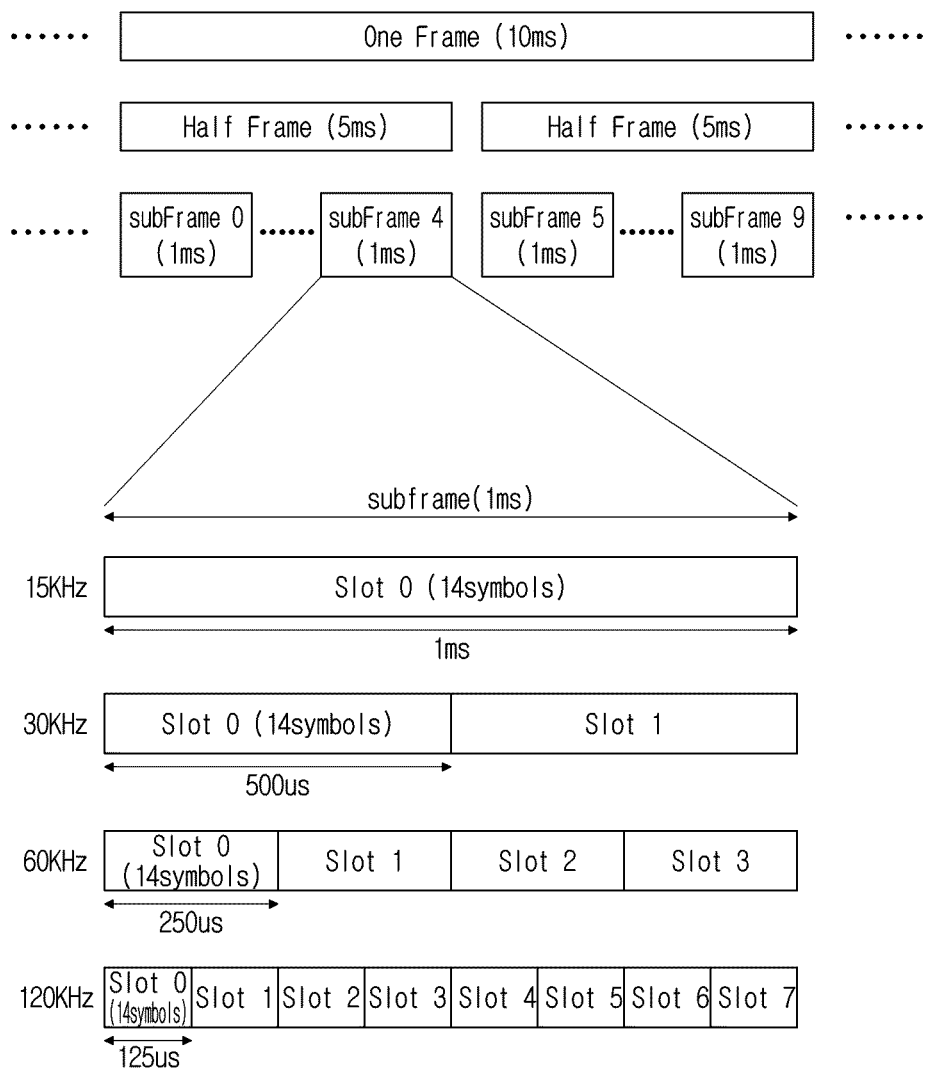

[FIG. 8]
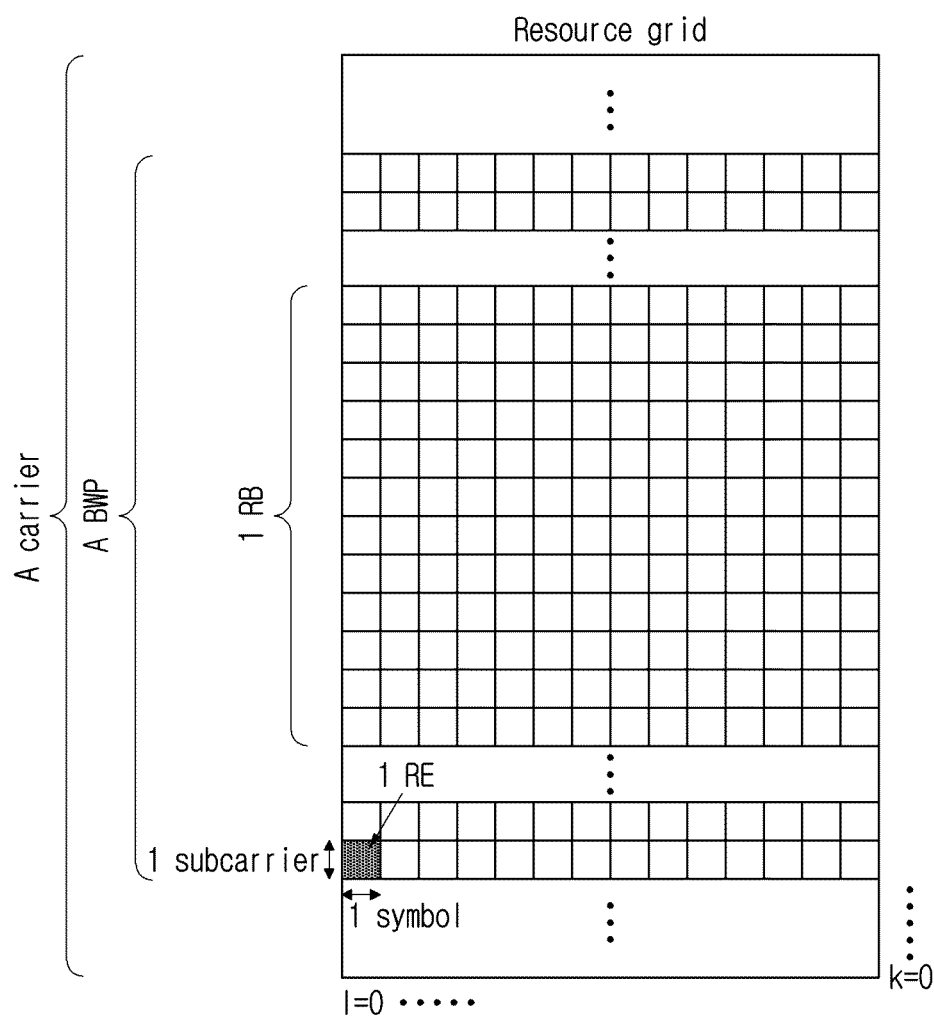

[FIG. 9]
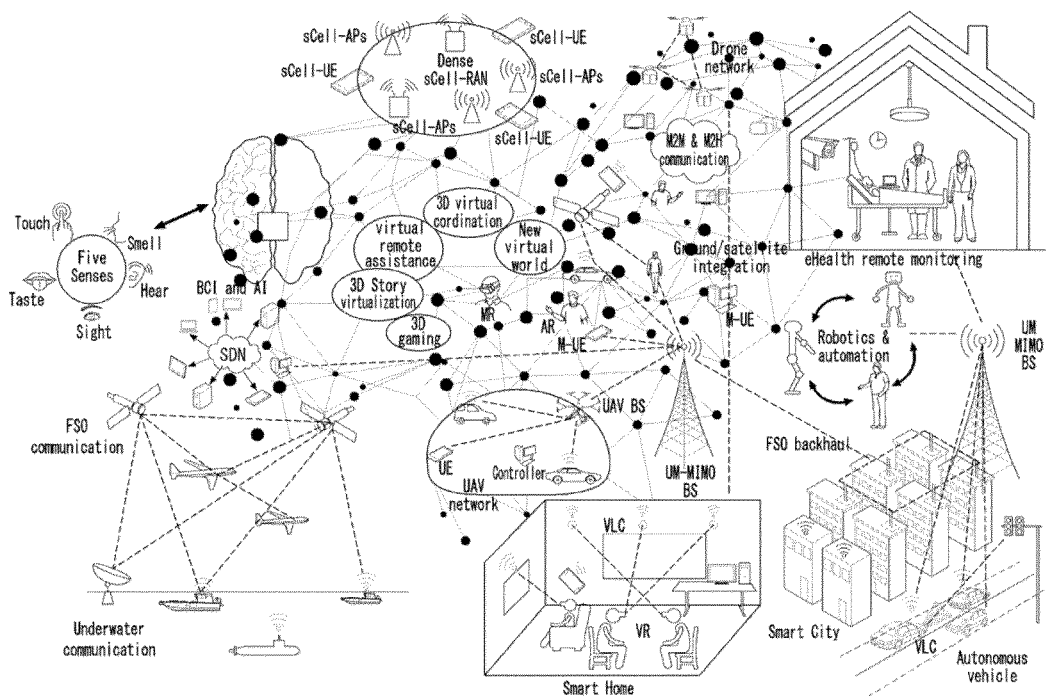

【FIG. 10】
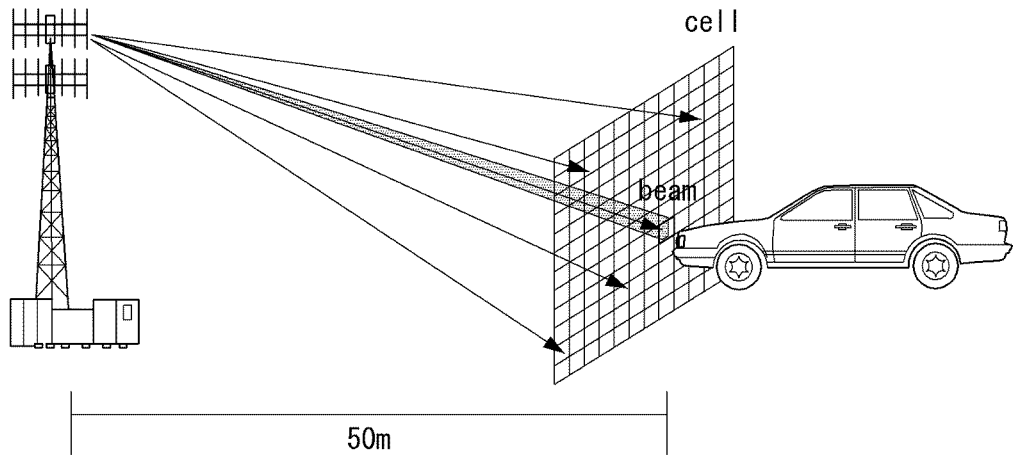
【FIG. 11】
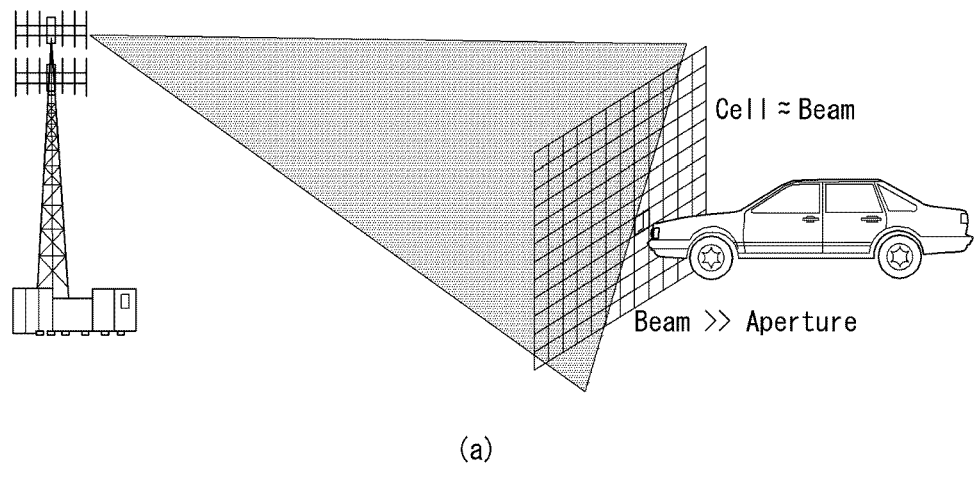
(a)
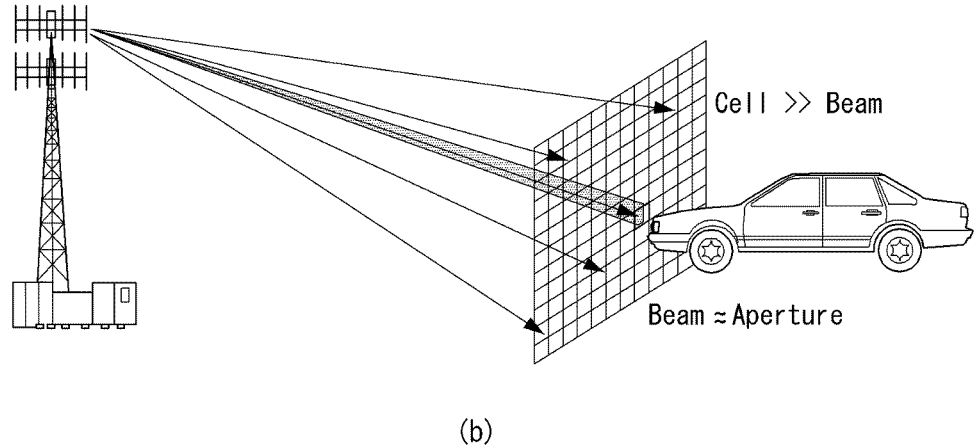
(b)

[FIG. 12]
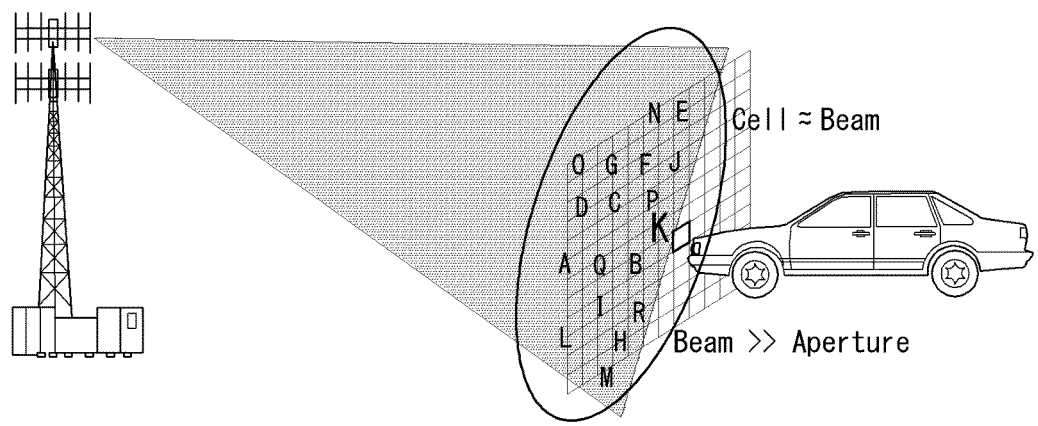

【FIG. 14】
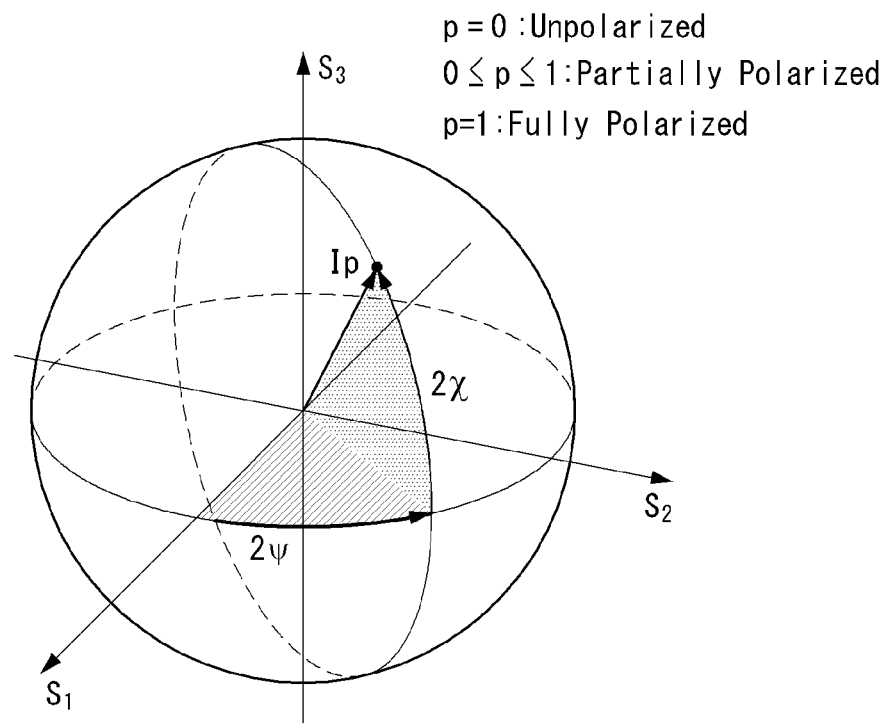
Stokes Parameters in Spherical Coordinates
【FIG. 15】
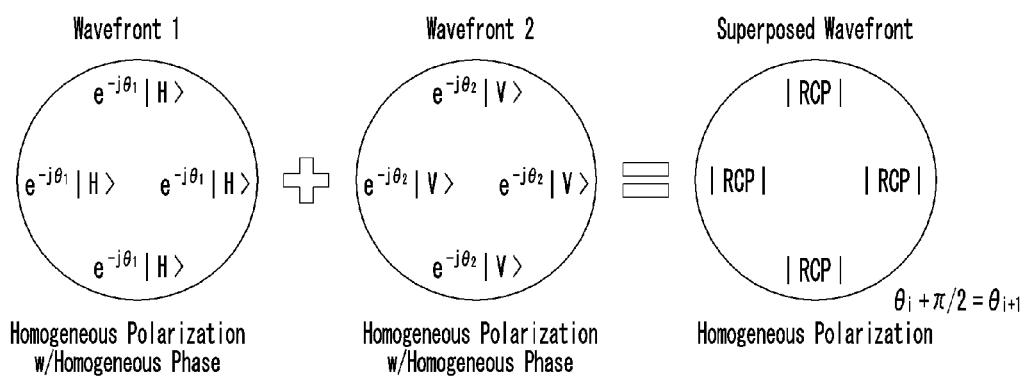

[FIG. 16]
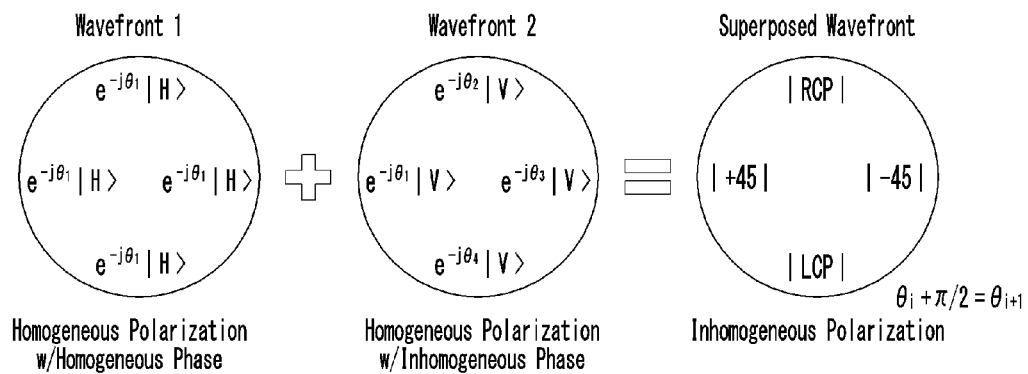
[FIG. 17]
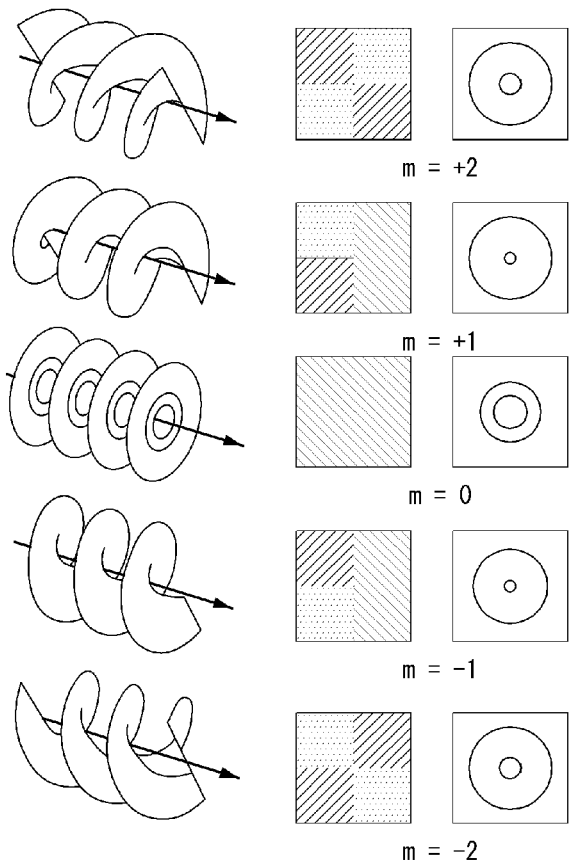

[FIG. 18]
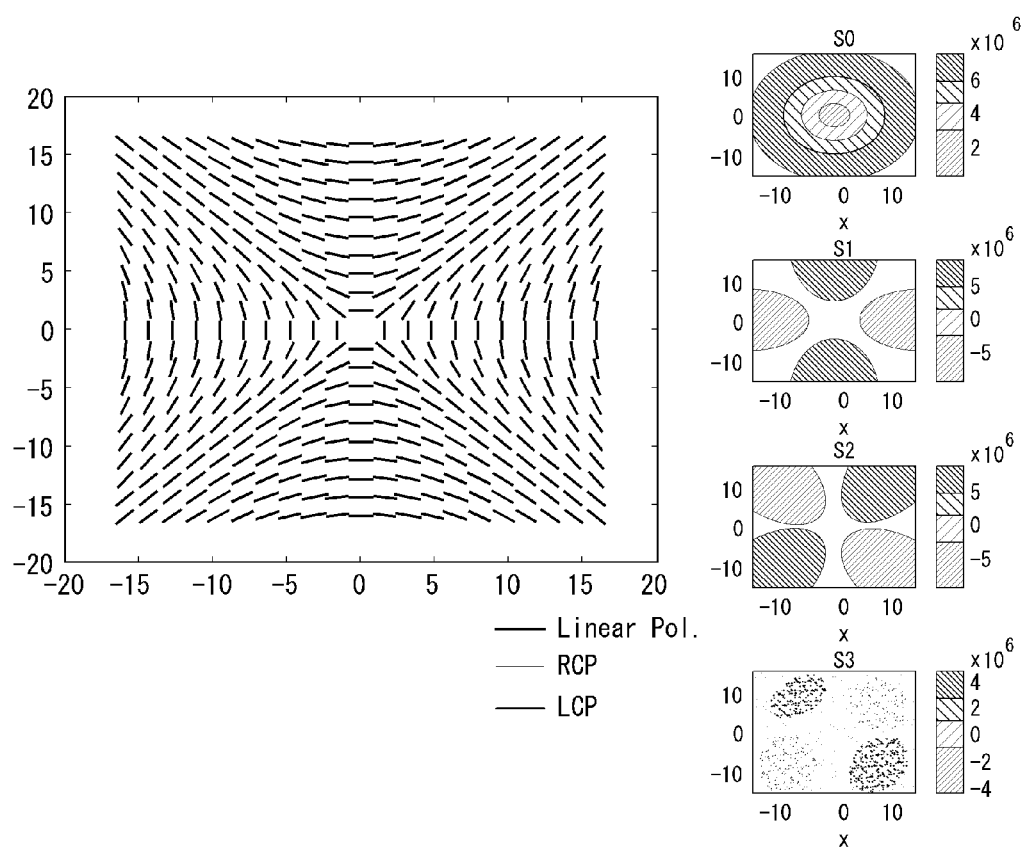

[FIG. 19]
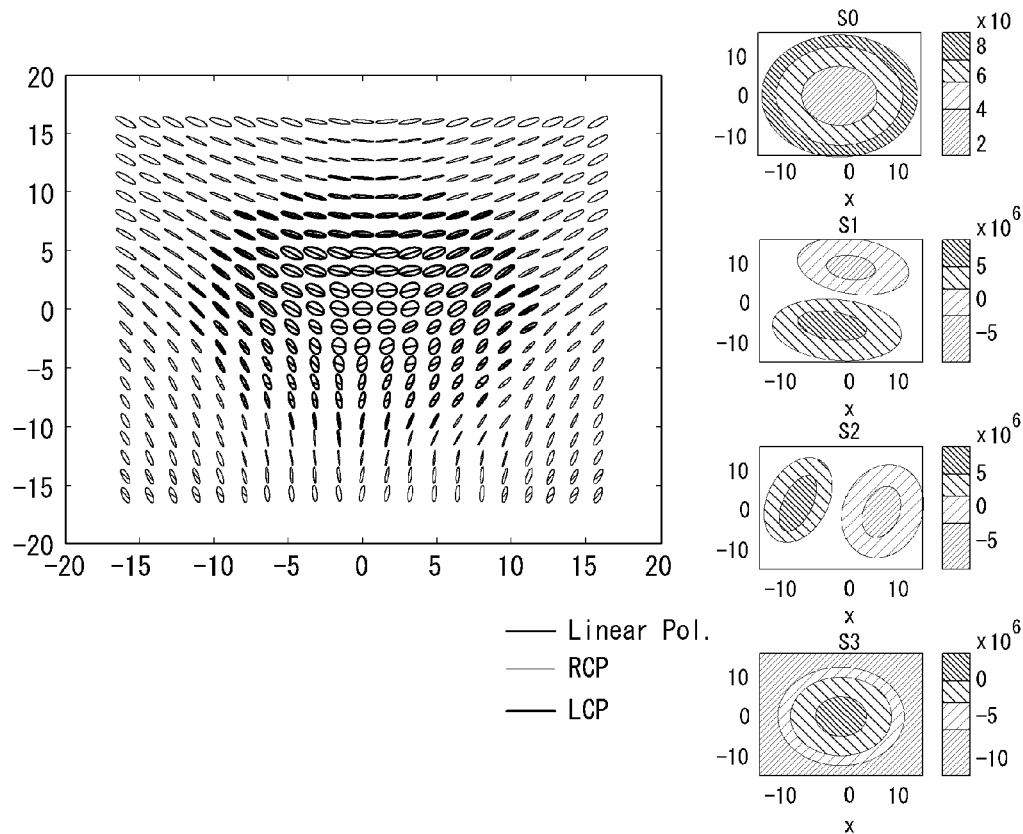
[FIG. 20]
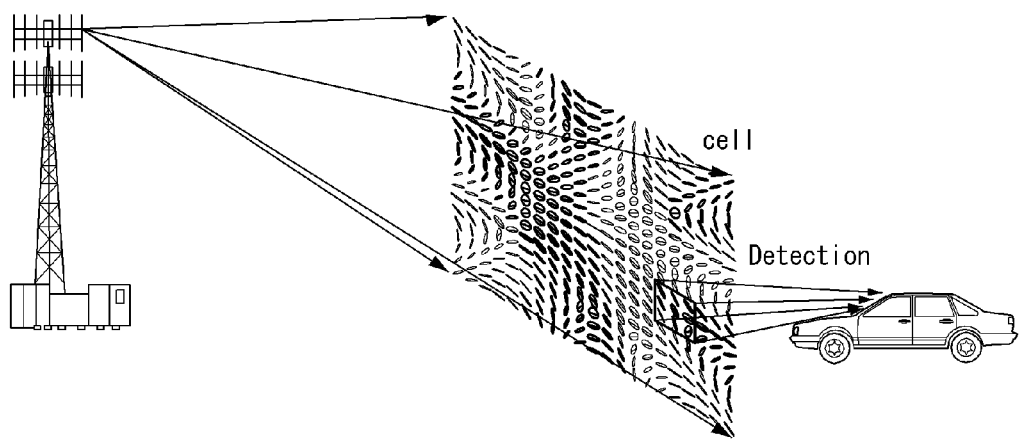

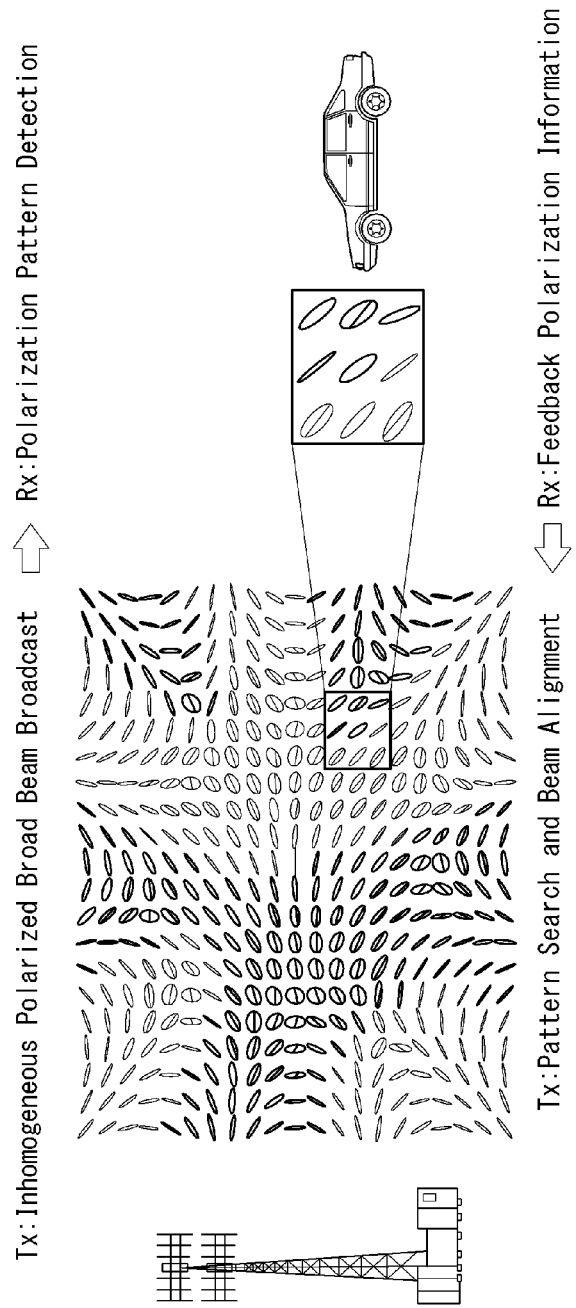
[FIG. 21]

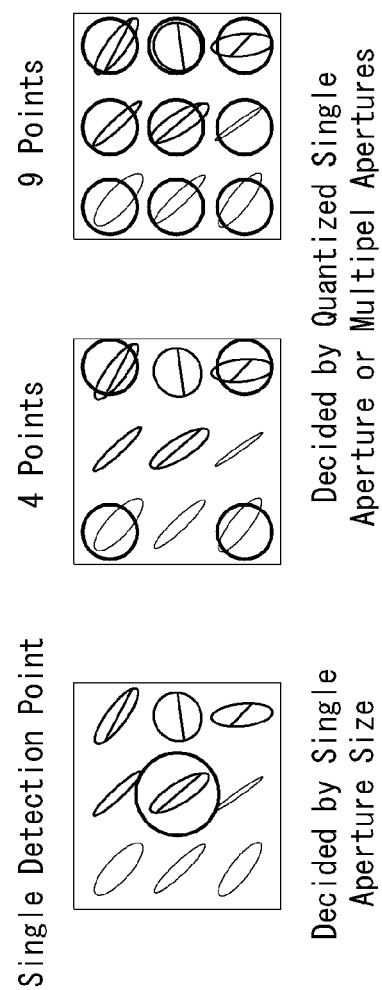
[FIG. 22]

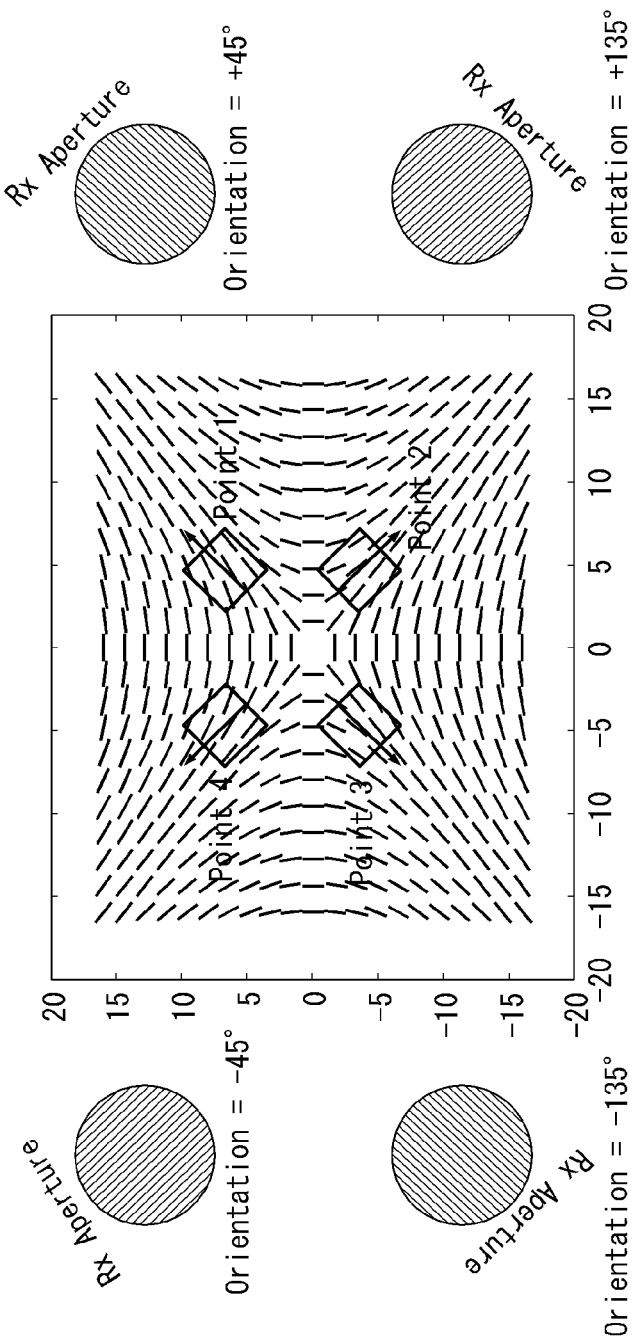
[FIG. 27]

[FIG. 28]
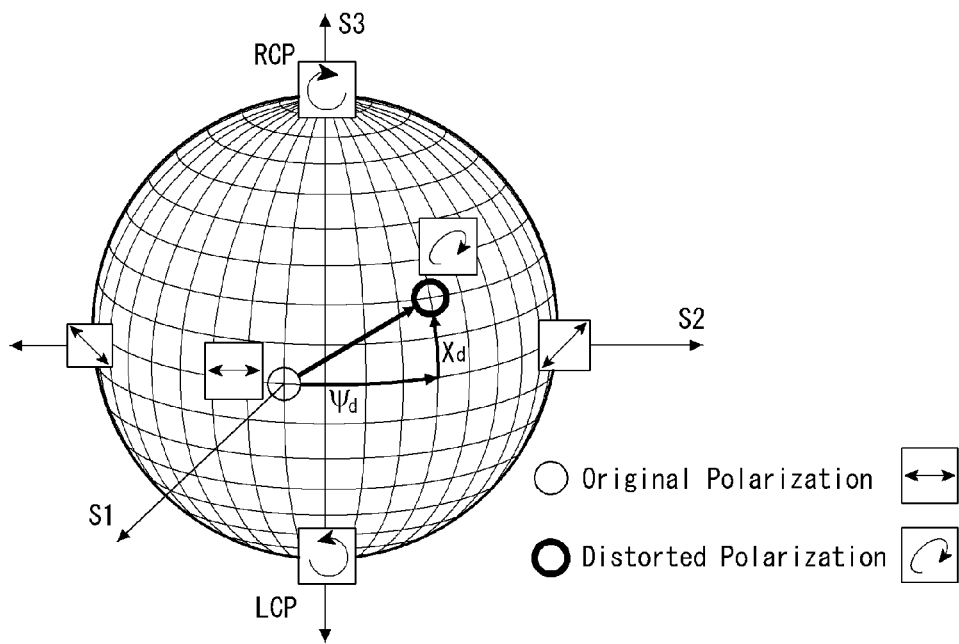
[FIG. 29]
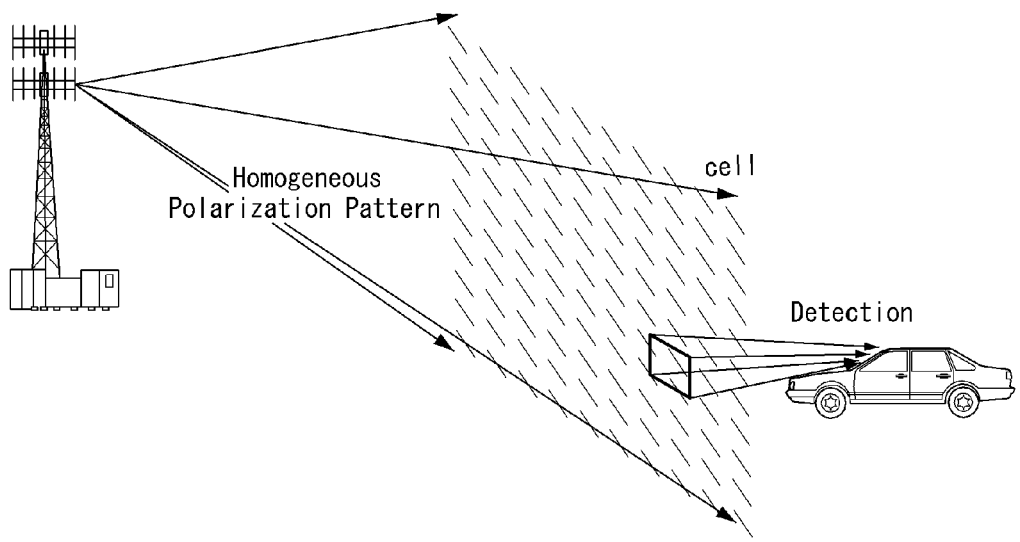

[FIG. 30]
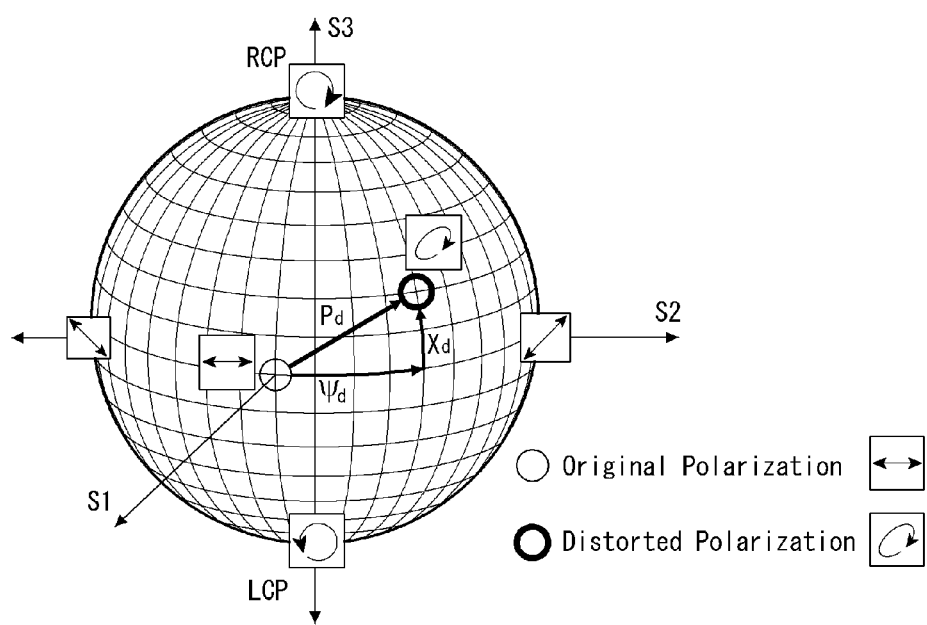
[FIG. 31]
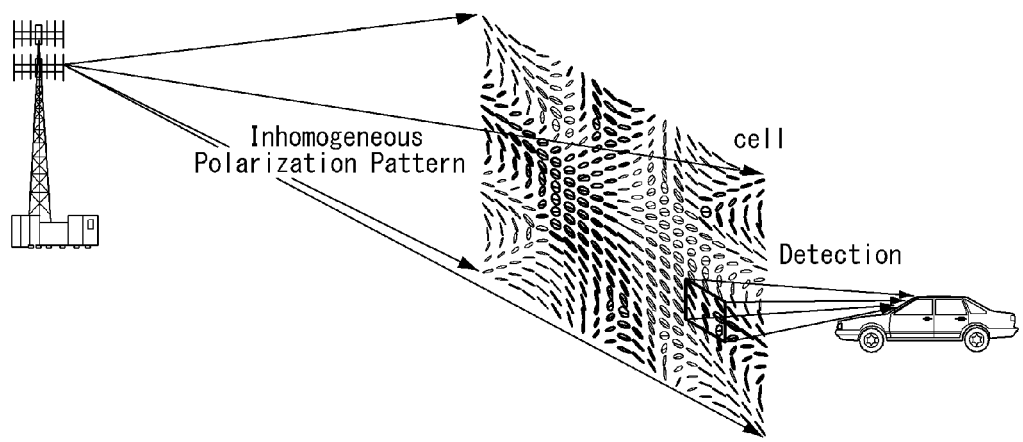

【FIG. 32】
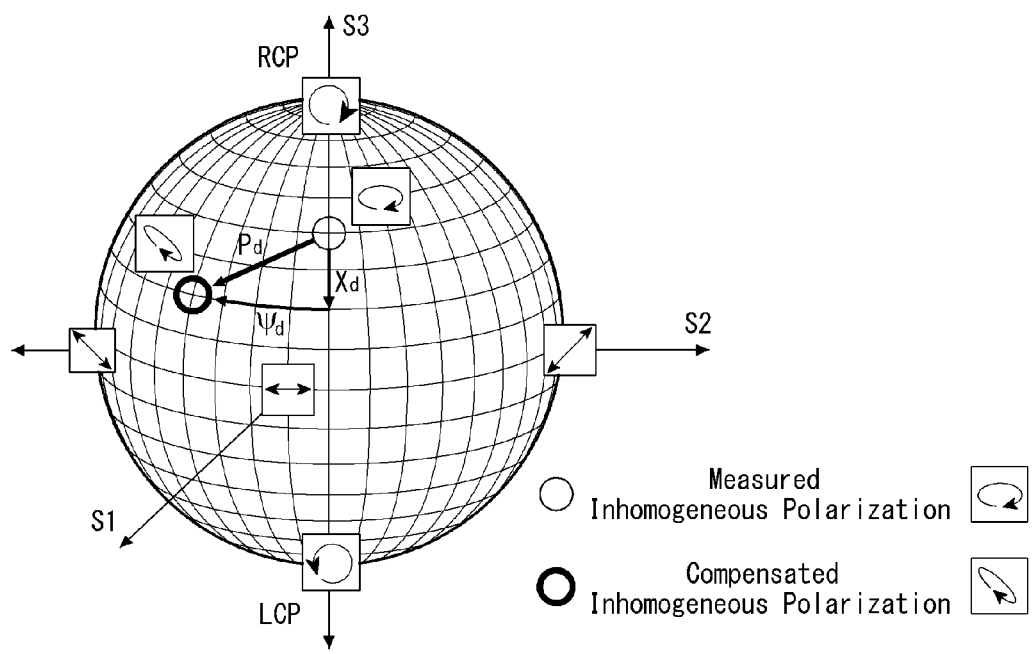

[FIG. 33]
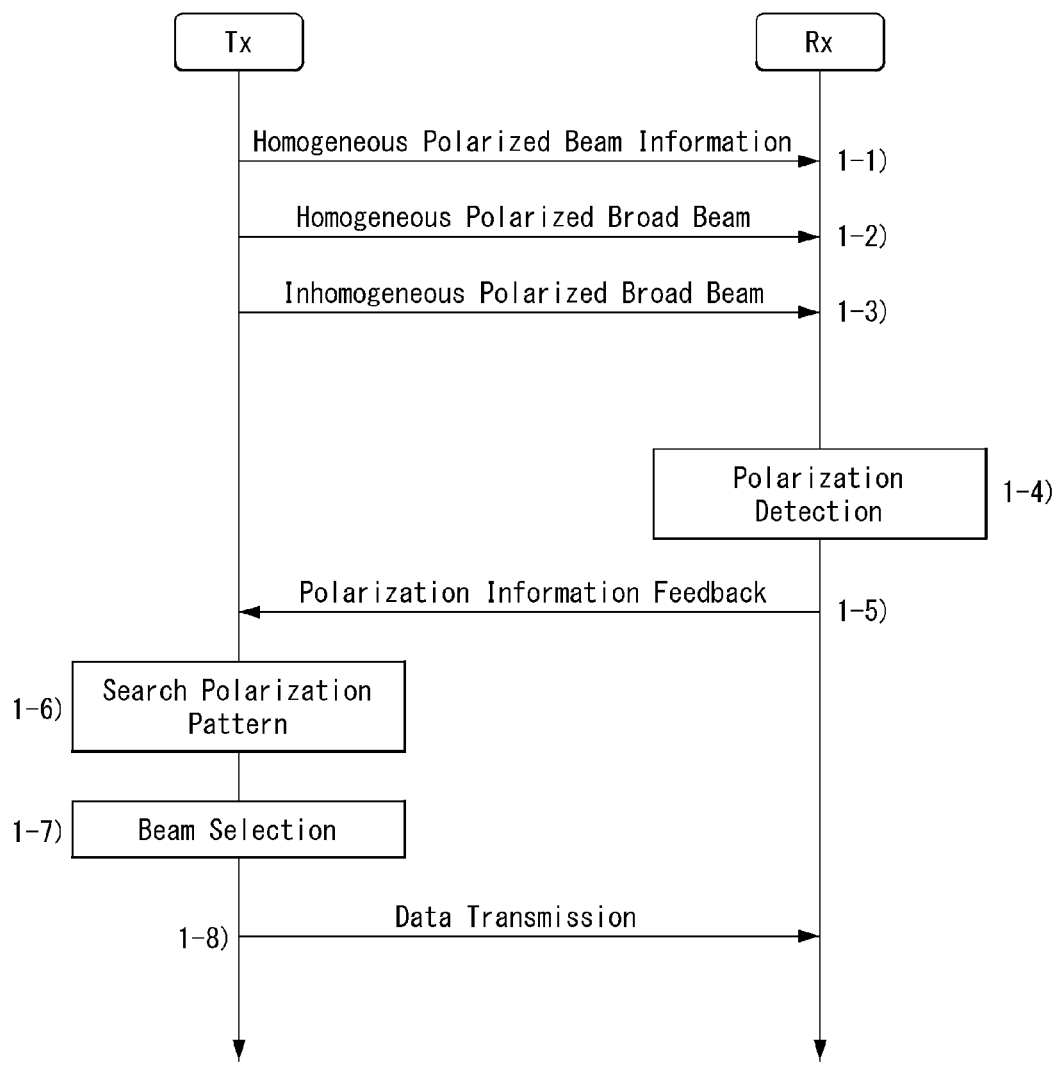

[FIG. 34]
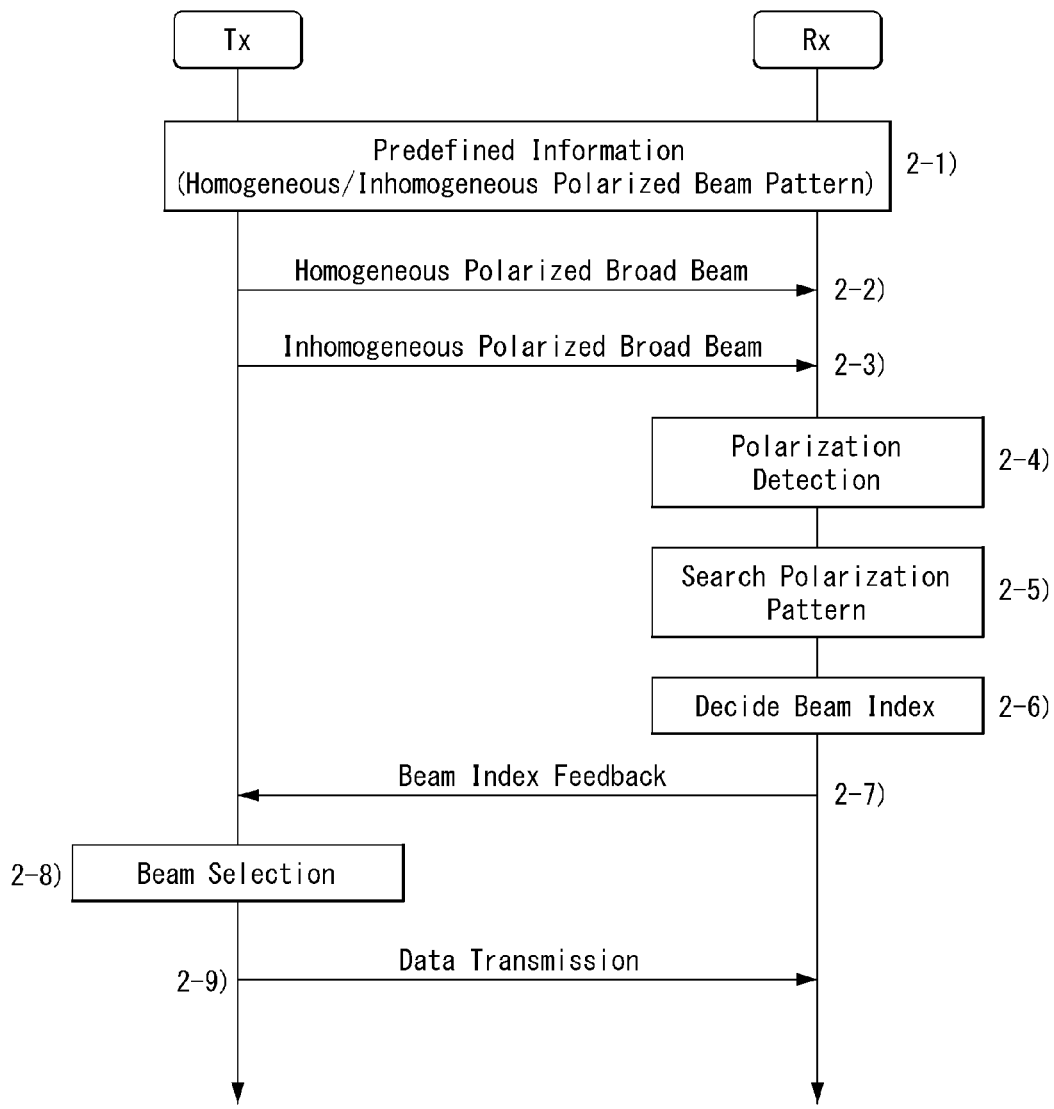

[FIG. 35]
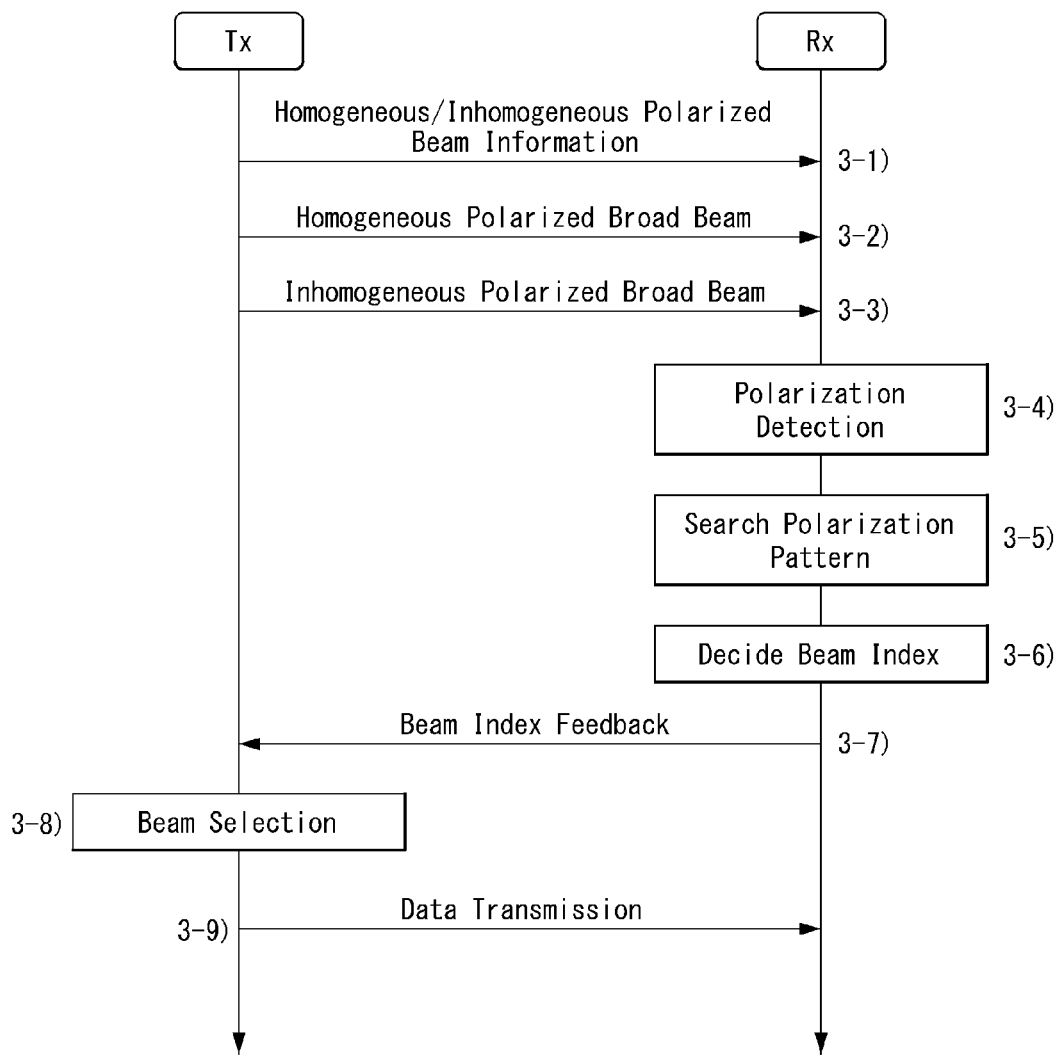

[FIG. 36]
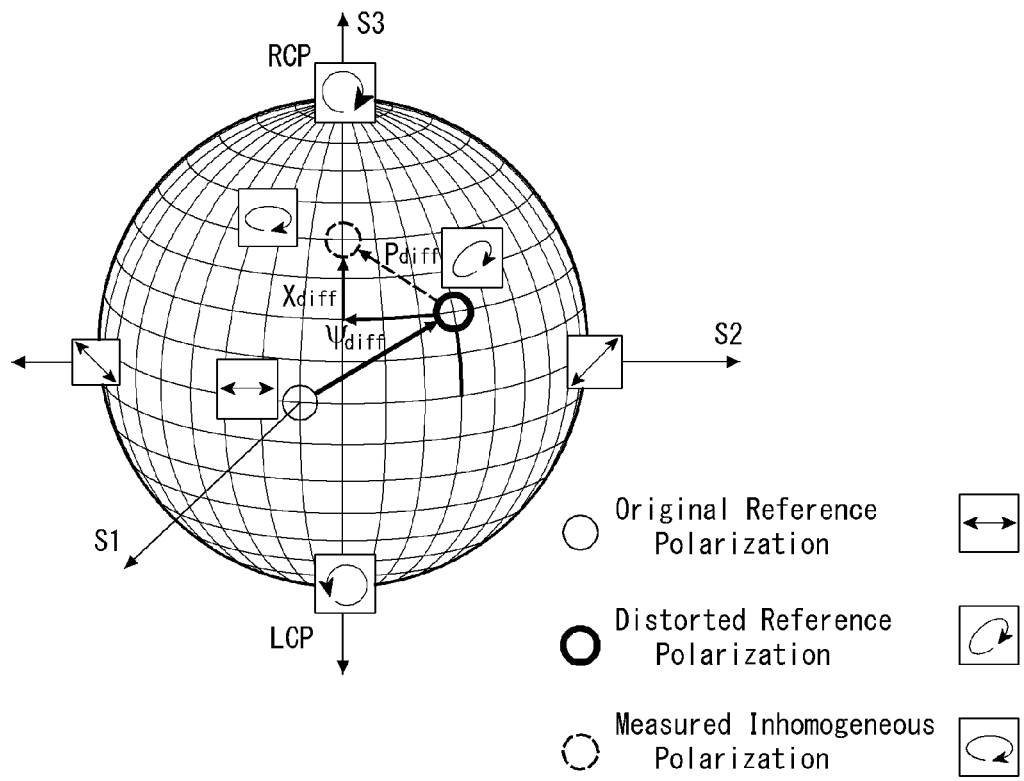
[FIG. 37]
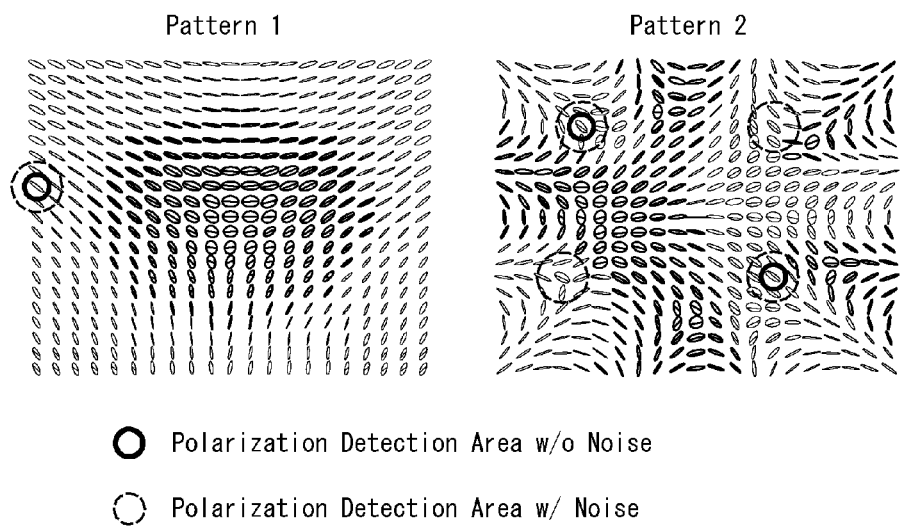

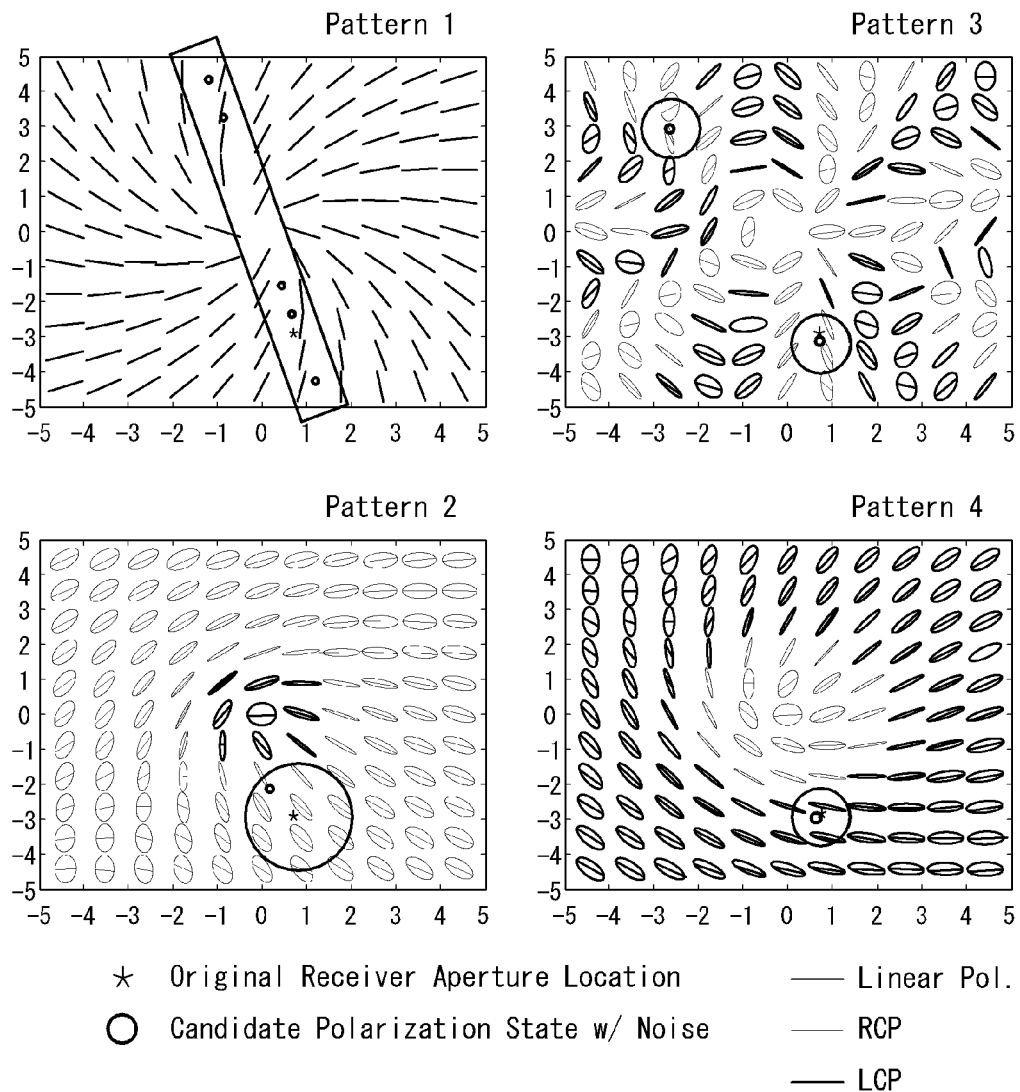
[FIG. 39]

[FIG. 40]
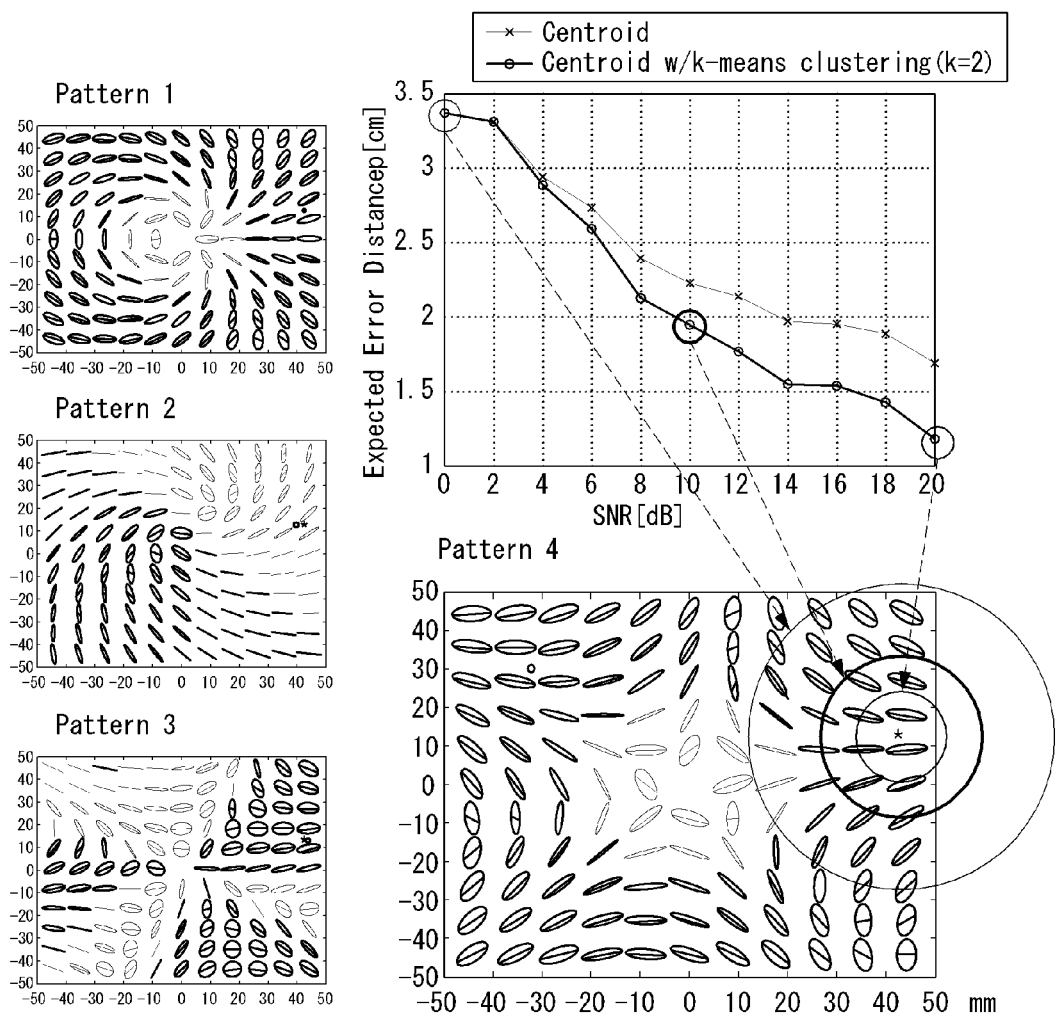

[FIG. 41]
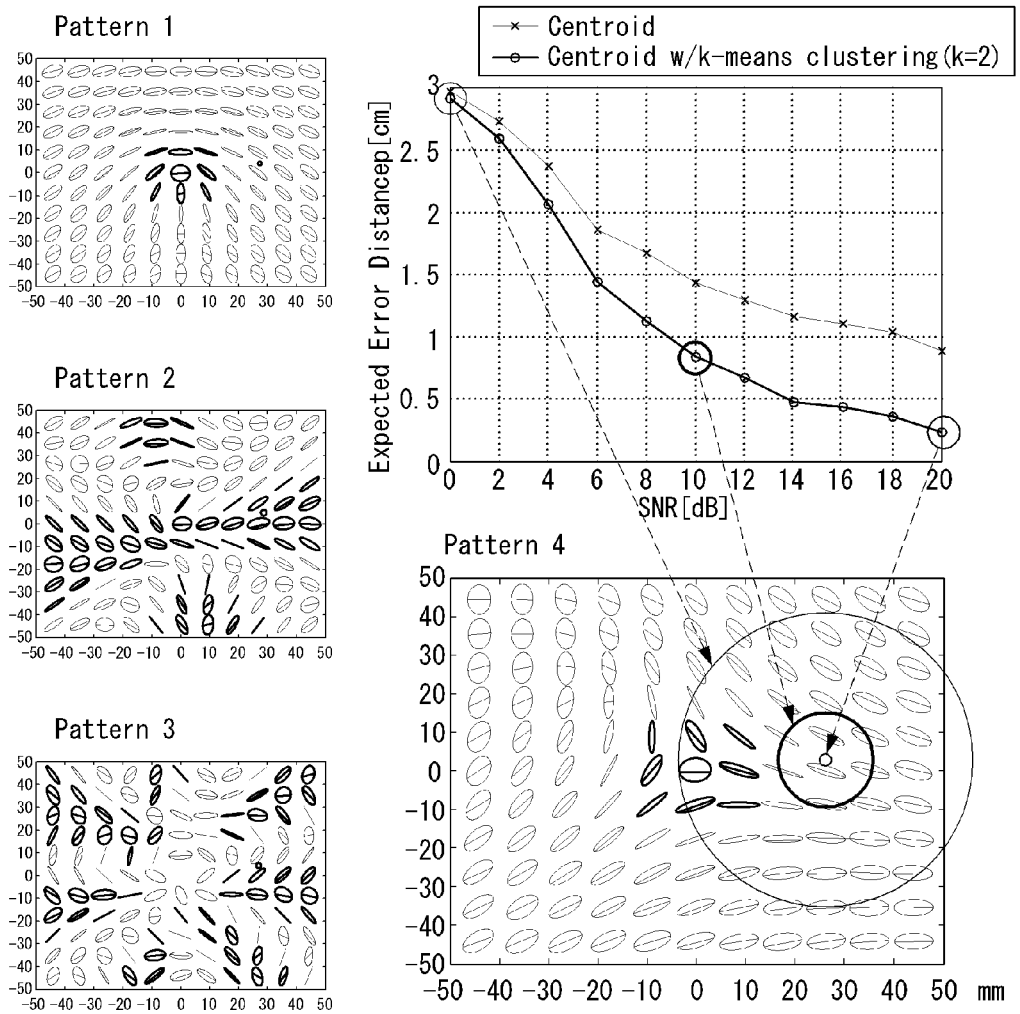

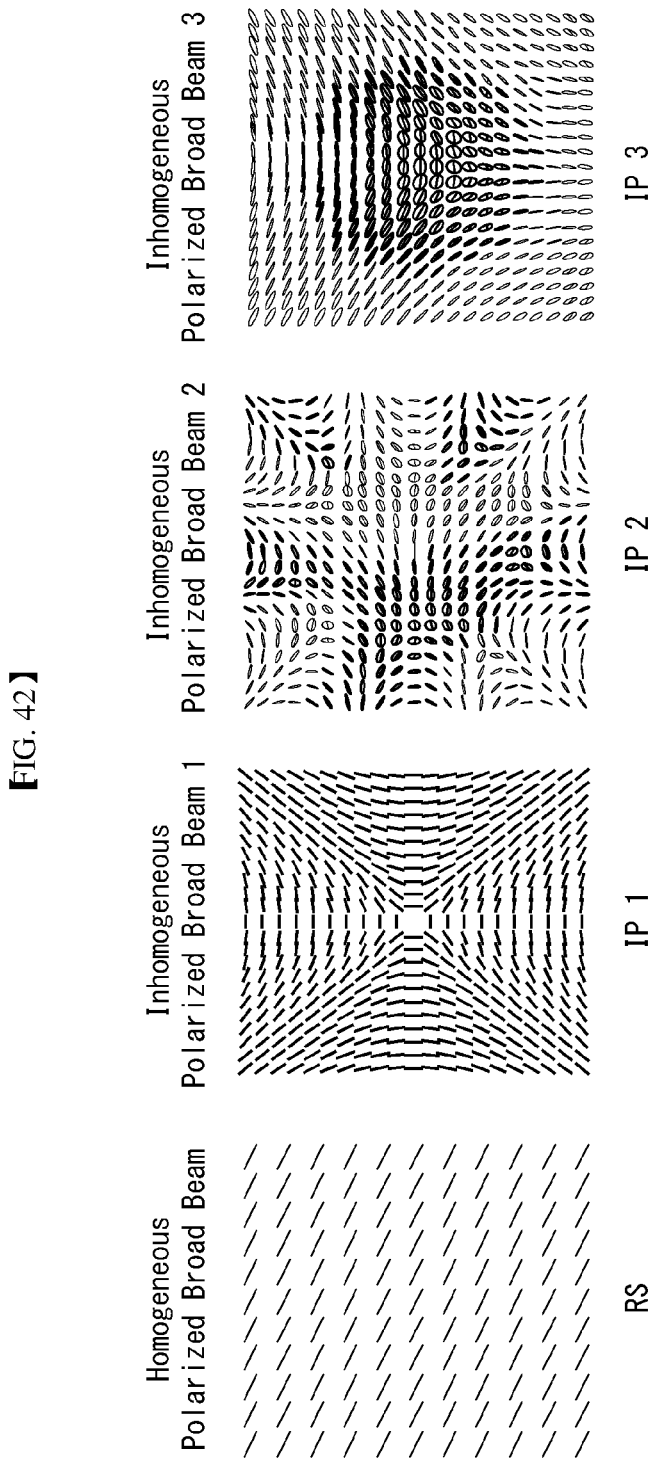
[FIG. 42]

[FIG. 43]
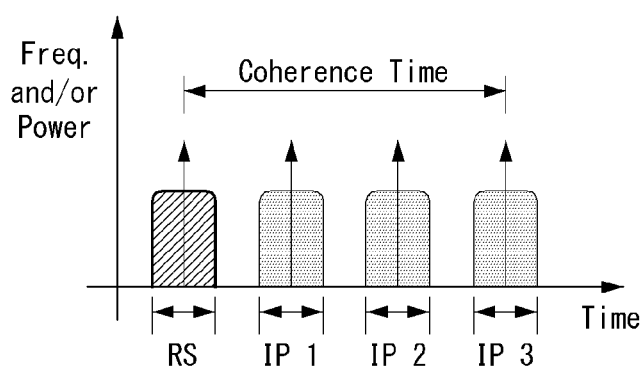
(a)
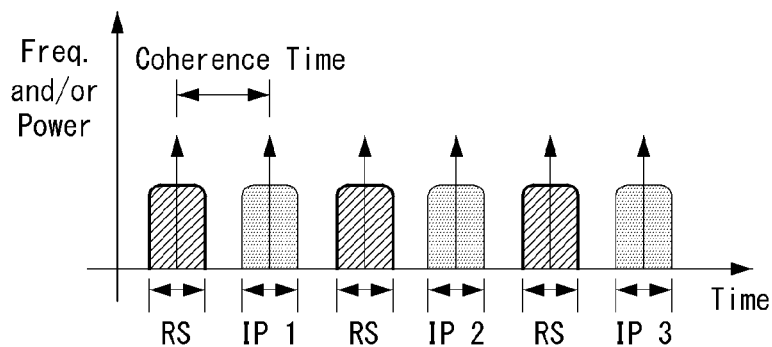
(b)

[FIG. 44]
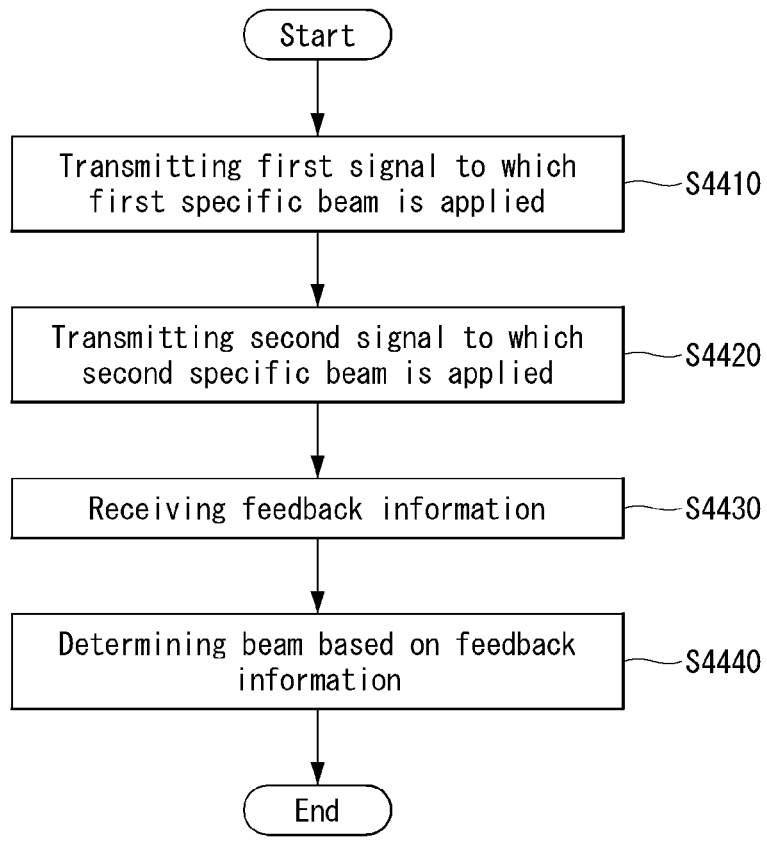

METHOD FOR CONTROLLING BEAM IN WIRELESS COMMUNICATION SYSTEM, AND APPARATUS THEREFOR

CROSS-REFERENCE TO RELATED APPLICATION(S)

This application is the National Stage filing under 35 U.S.C. 371 of International Application No. PCT/KR2021/013219, filed on Sep. 28, 2021, the contents of which is hereby incorporated by reference herein in its entirety.

TECHNICAL FIELD

The present disclosure relates to a method for controlling a beam in a wireless communication system, and an apparatus therefor.

BACKGROUND

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high-speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

SUMMARY

In systems that utilize pencil beams (e.g. 6G Terahertz Communication, etc.), a large number of beams (Tx/Rx Beams) exist within a single cell. Accordingly, the following problems arise with regard to beam alignment.
1) According to the beam alignment method using the index of the synchronization signal block (SSB), time resources (e.g. symbols) equal to the number of beams must be utilized, so there are disadvantages in terms of resource utilization, and the time required for beam alignment increases excessively. 2) The Multi-stage Beam Search method, which is performed in the order of broad beam to narrow beam, causes delay due to hand shaking between the transmitting side (Tx) and the receiving side (Rx).

In order to solve the problems 1) and 2) above, beam alignment may be performed based on an optical beam having the characteristic of inhomogeneous polarization. At this time, the optical beam may be distorted and received. For example, polarization mode distortion (PMD) may occur. The PMD occurs due to pressure applied to the optical fiber, temperature change, curvature, and inhomogeneity of the medium. Due to the above-described distortion, an error occurs in the polarization state obtained from the optical beam.

That is, in the case of a beam alignment method using an optical beam with inhomogeneous polarization characteristics, a problem may occur in which beam alignment accuracy is lowered due to polarization distortion.

The purpose of the present disclosure is to propose a method for solving the problems caused by the above-described polarization distortion. Specifically, the present disclosure proposes a method for aligning beams based on an optical beam including homogeneous information and an optical beam including inhomogeneous information.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

A method performed by a first wireless device in a wireless communication system according to an embodiment of the present disclosure comprises transmitting a first signal to which a first specific beam is applied to a second wireless device, transmitting a second signal to which a second specific beam is applied to the second wireless device, receiving feedback information generated based on the first signal and the second signal from the second wireless device, and determining a beam related to the second wireless device based on the feedback information.

The first signal is based on a first optical beam related to a homogeneous pattern. The second signal is based on a second optical beam related to an inhomogeneous pattern.

One or more first specific states related to the homogeneous pattern are determined based on the first signal.

One or more second specific states related to the inhomogeneous pattern are determined based on the second signal.

The feedback information represents one or more third specific states. The one or more third specific states are determined based on the one or more first specific states and the one or more second specific states.

The beam related to the second wireless device is determined based on a beam index mapped to the one or more third specific states.

Based on the feedback information being related to compensation of distortion of the second optical beam, the one or more third specific states may be based on one or more compensated specific states generated by compensating the distortion from the one or more second specific states.

The compensation of the distortion may be performed based on a distortion vector determined based on the one or more first specific states.

The distortion vector may be determined based on a difference between a pre-configured reference state and the one or more first specific states.

The pre-configured reference state may be an original state based on the homogeneous pattern.

Based on the feedback information being related to differential information, the one or more third specific states may be based on a differential vector.

The differential vector may be determined based on a difference between the one or more first specific states and the one or more second specific states.

The first optical beam may be one broad beam based on one homogeneous pattern, and the second optical beam may include a plurality of broad beams based on a plurality of inhomogeneous patterns.

The one or more second specific states may include one or more states determined from each of the plurality of inhomogeneous patterns.

A first wireless device operating in a wireless communication system according to another embodiment of the present disclosure comprises one or more transceivers, one or more processors controlling the one or more transceivers, and one or more memories operably connected to the one or more processors, and storing instructions that configure the one or more processors to perform operations when being executed by the one or more processors.

The operations include transmitting a first signal to which a first specific beam is applied to a second wireless device, transmitting a second signal to which a second specific beam is applied to the second wireless device, receiving feedback information generated based on the first signal and the second signal from the second wireless device, and determining a beam related to the second wireless device based on the feedback information.

The first signal is based on a first optical beam related to a homogeneous pattern. The second signal is based on a second optical beam related to an inhomogeneous pattern.

One or more first specific states related to the homogeneous pattern are determined based on the first signal.

One or more second specific states related to the inhomogeneous pattern are determined based on the second signal.

The feedback information represents one or more third specific states. The one or more third specific states are determined based on the one or more first specific states and the one or more second specific states.

The beam related to the second wireless device is determined based on a beam index mapped to the one or more third specific states.

The first wireless device may be a base station (BS), and the second wireless device may be a user equipment (UE).

An apparatus according to another embodiment of the present disclosure comprises one or more memories and one or more processors functionally connected to the one or more memories.

The one or more memories store instructions that configure the one or more processors to perform operations when being executed by the one or more processors.

The operations include transmitting a first signal to which a first specific beam is applied to a second wireless device, transmitting a second signal to which a second specific beam is applied to the second wireless device, receiving feedback information generated based on the first signal and the second signal from the second wireless device, and determining a beam related to the second wireless device based on the feedback information.

The first signal is based on a first optical beam related to a homogeneous pattern. The second signal is based on a second optical beam related to an inhomogeneous pattern.

One or more first specific states related to the homogeneous pattern are determined based on the first signal.

One or more second specific states related to the inhomogeneous pattern are determined based on the second signal.

The feedback information represents one or more third specific states. The one or more third specific states are determined based on the one or more first specific states and the one or more second specific states.

The beam related to the second wireless device is determined based on a beam index mapped to the one or more third specific states.

One or more non-transitory computer-readable medium according to another embodiment of the present disclosure store one or more instructions.

The one or more instructions configure the one or more processors to perform operations when being executed by the one or more processors.

The operations include transmitting a first signal to which a first specific beam is applied to a second wireless device, transmitting a second signal to which a second specific beam is applied to the second wireless device, receiving feedback information generated based on the first signal and the second signal from the second wireless device, and determining a beam related to the second wireless device based on the feedback information.

The first signal is based on a first optical beam related to a homogeneous pattern. The second signal is based on a second optical beam related to an inhomogeneous pattern.

One or more first specific states related to the homogeneous pattern are determined based on the first signal.

One or more second specific states related to the inhomogeneous pattern are determined based on the second signal.

The feedback information represents one or more third specific states. The one or more third specific states are determined based on the one or more first specific states and the one or more second specific states.

The beam related to the second wireless device is determined based on a beam index mapped to the one or more third specific states.

According to an embodiment of the present disclosure, the number of physical resources required to perform beam alignment in a communication system in which fine beams are utilized can be reduced, and the time required for beam alignment can be shortened.

Additionally, when beam alignment is performed through an optical beam with an inhomogeneous pattern, errors in beam alignment that occur due to the optical characteristics of the beam can be resolved. That is, the accuracy of a beam alignment operation based on an optical beam with the inhomogeneous pattern can be further improved.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 1 is a view showing an example of a communication system applicable to the present disclosure.

FIG. 2 is a view showing an example of a wireless apparatus applicable to the present disclosure.

FIG. 3 is a view showing a method of processing a transmitted signal applicable to the present disclosure.

FIG. 4 is a view showing another example of a wireless device applicable to the present disclosure.

FIG. 5 is a view showing an example of a hand-held device applicable to the present disclosure.

FIG. 6 is a view showing physical channels applicable to the present disclosure and a signal transmission method using the same.

FIG. 7 is a view showing the structure of a radio frame applicable to the present disclosure.

FIG. 8 is a view showing a slot structure applicable to the present disclosure.

FIG. 9 is a view showing an example of a communication structure providable in a 6G system applicable to the present disclosure.

FIG. 10 is a diagram illustrating a wireless communication system utilizing a pencil beam to which a method according to an embodiment of the present disclosure can be applied.

FIG. 11 is a diagram to explain matters required in a beam search procedure depending on a beam width.

FIG. 12 illustrates a beam including inhomogeneous information according to an embodiment of the present disclosure.

FIG. 14 illustrates Stokes parameters expressed in spherical coordinates according to an embodiment of the present disclosure.

FIG. 15 is a diagram illustrating an example of a wavefront related to polarization synthesis.

FIG. 16 is a diagram illustrating another example of a wavefront related to polarization synthesis.

FIG. 17 is a diagram illustrating a beam related to an inhomogeneous polarized wavefront.

FIGS. 18 to 19 illustrate overlapped polarization according to an overlap of wavefronts.

FIG. 20 is a diagram illustrating detection of an inhomogeneous polarization pattern according to an embodiment of the present disclosure.

FIG. 21 is a diagram for explaining a beam alignment operation based on an inhomogeneous polarization pattern according to an embodiment of the present disclosure.

FIG. 22 illustrates a detection point of a polarization pattern according to a receiver aperture according to an embodiment of the present disclosure.

FIG. 27 is a diagram to explain problems that may occur depending on an orientation of a receiver aperture when polarization pattern matching is performed based on multiple point detection.

FIG. 28 is a diagram showing polarization distortion expressed on Poincare Sphere.

FIG. 29 is a diagram illustrating transmission of a beam based on a homogeneous polarization pattern for measuring polarization distortion according to an embodiment of the present disclosure.

FIG. 30 is a diagram to explain relationship between original reference polarization and distorted reference polarization.

FIG. 31 is a diagram showing an inhomogeneous polarization beam transmitted for calculation of compensated inhomogeneous polarization according to an embodiment of the present disclosure.

FIG. 32 is a diagram for explaining a measured inhomogeneous polarization state and a compensated inhomogeneous polarization state according to an embodiment of the present disclosure.

FIG. 33 is a diagram for explaining a homogeneous and inhomogeneous polarization based beam alignment procedure according to an embodiment of the present disclosure.

FIG. 34 is a diagram for explaining a homogeneous and inhomogeneous polarization based beam alignment procedure according to another embodiment of the present disclosure.

FIG. 35 is a diagram for explaining a homogeneous and inhomogeneous polarization based beam alignment procedure according to another embodiment of the present disclosure.

FIG. 36 is a diagram for explaining an original polarization state, distorted polarization state, and measured inhomogeneous polarization state.

FIG. 37 is a diagram to explain an effect of noise related to polarization detection.

FIG. 39 is a diagram showing simulation results related to an operation of determining a beam based on a plurality of inhomogeneous polarization patterns according to an embodiment of the present disclosure.

FIGS. 40 and 41 are diagrams showing simulation results related to a polarization pattern detection algorithm.

FIG. 42 is a diagram illustrating one homogeneous polarized broad beam and a plurality of inhomogeneous polarized broad beams transmitted according to an embodiment of the present disclosure.

FIG. 43 is a diagram illustrating relationship between one homogeneous polarized broad beam and a plurality of inhomogeneous polarized broad beams transmitted according to an embodiment of the present disclosure.

FIG. 44 is a flowchart for explaining a method performed by a first wireless device in a wireless communication system according to an embodiment of the present disclosure.

DETAILED DESCRIPTION

Figure 13:
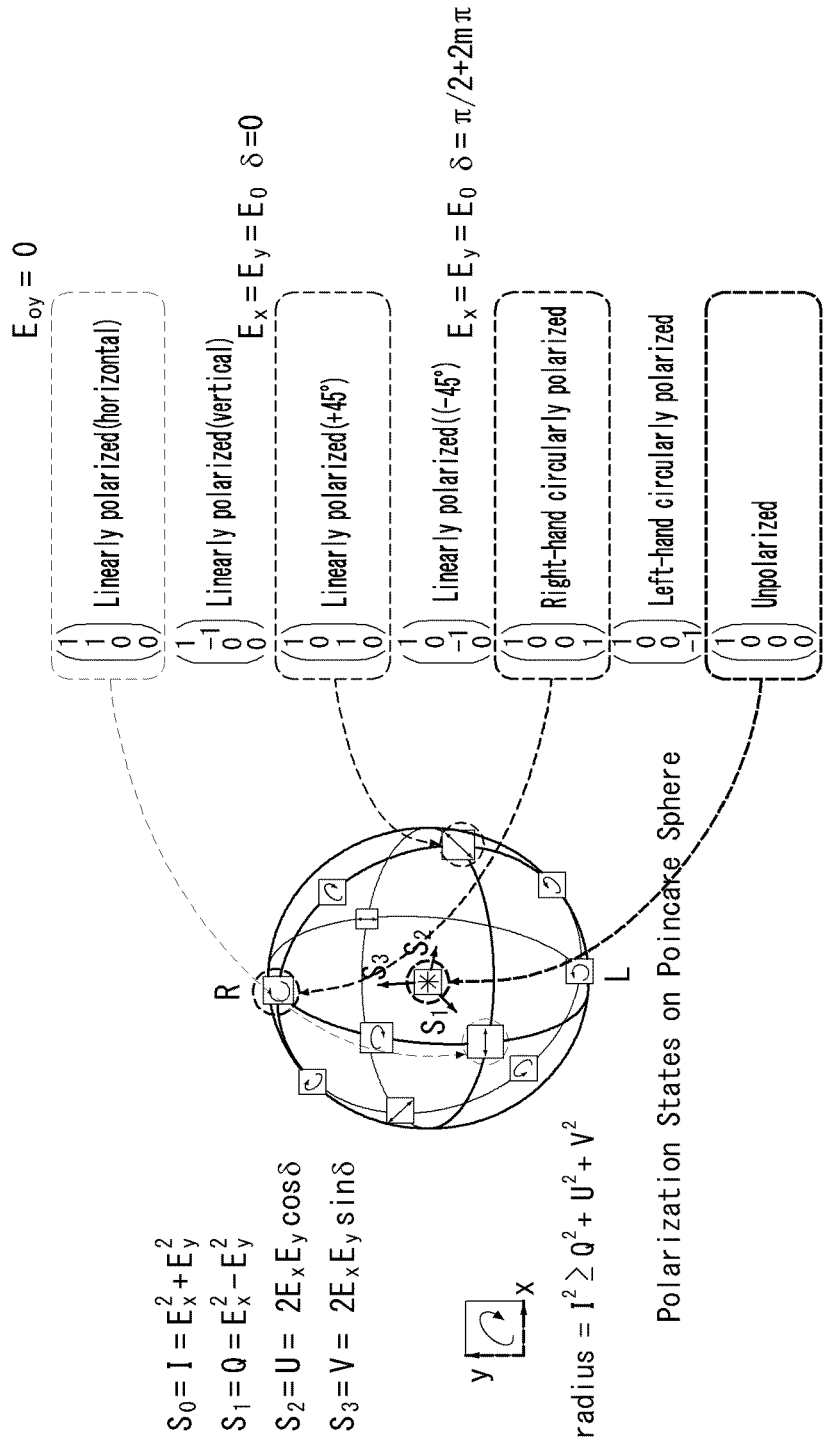
FIG. 13 is a diagram illustrating a Poincare sphere for expressing a synthesis of polarization light according to an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

That is, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, on uplink (UL), a mobile station may serve as a transmitter and a BS may serve as a receiver. Likewise, on downlink (DL), the mobile station may serve as a receiver and the BS may serve as a transmitter.

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.XXX.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 illustrates an example of a communication system applicable to the present disclosure. Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 400. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc.

The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 400 through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

FIG. 2 illustrates an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be connected with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be connected with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

FIG. 3 is a view showing a method of processing a transmitted signal applicable to the present disclosure. For example, the transmitted signal may be processed by a signal processing circuit. At this time, a signal processing circuit 1200 may include a scrambler 300, a modulator 320, a layer mapper 330, a precoder 340, a resource mapper 350, and a signal generator 360. At this time, for example, the operation/function of FIG. 3 may be performed by the processors 202a and 202b and/or the transceiver 206a and 206b of FIG. 2. In addition, for example, the hardware element of FIG. 3 may be implemented in the processors 202a and 202b of FIG. 2 and/or the transceivers 206a and 206b of FIG. 2. In addition, for example blocks 310 to 350 may be implemented in the processors 202a and 202b of FIG. 2 and a block 360 may be implemented in the transceivers 206a and 206b of FIG. 2, without being limited to the above-described embodiments.

A codeword may be converted into a radio signal through the signal processing circuit 300 of FIG. 3. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 6. Specifically, the codeword may be converted into a bit sequence scrambled by the scrambler 310. The scramble sequence used for scramble is generated based in an initial value and the initial value may include ID information of a wireless device, etc. The scrambled bit sequence may be modulated into a modulated symbol sequence by the modulator 320. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 330. Modulation symbols of each transport layer may be mapped to corresponding antenna port(s) by the precoder 340 (precoding). The output z of the precoder 340 may be obtained by multiplying the output y of the layer mapper 330 by an N*M precoding matrix W. Here, N may be the number of antenna ports and M may be the number of transport layers. Here, the precoder 340 may perform precoding after transform precoding (e.g., discrete Fourier transform (DFT)) for complex modulation symbols. In addition, the precoder 340 may perform precoding without performing transform precoding.

The resource mapper 350 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 360 may generate a radio signal from the mapped modulation symbols, and the generated radio signal may be transmitted to another device through each antenna. To this end, the signal generator 360 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 310 to 360 of FIG. 3. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Structure of Wireless Device Applicable to the Present Disclosure

FIG. 4 is a view showing another example of a wireless device applicable to the present disclosure.

Referring to FIG. 4, a wireless device 400 may correspond to the wireless devices 200a and 200b of FIG. 2 and include various elements, components, units/portions and/or modules. For example, the wireless device 400 may include a communication unit 410, a control unit (controller) 420, a memory unit (memory) 430 and additional components 440. The communication unit may include a communication circuit 412 and a transceiver(s) 414. For example, the communication circuit 412 may include one or more processors 202a and 202b and/or one or more memories 204a and 204b of FIG. 2. For example, the transceiver(s) 414 may include one or more transceivers 206a and 206b and/or one or more antennas 208a and 208b of FIG. 2. The control unit 420 may be electrically connected with the communication unit 410, the memory unit 430 and the additional components 440 to control overall operation of the wireless device. For example, the control unit 320 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 4, various elements, components, units/portions and/or modules in the wireless device 400 may be connected with each other through wired interfaces or at least some thereof may be wirelessly connected through the communication unit 410. For example, in the wireless device 400, the control unit 420 and the communication unit 410 may be connected by wire, and the control unit 420 and the first unit (e.g., 130 or 140) may be wirelessly connected through the communication unit 410. In addition, each element, component, unit/portion and/or module of the wireless device 400 may further include one or more elements. For example, the control unit 420 may be composed of a set of one or more processors. For example, the control unit 420 may be composed of a set of a communication control processor, an application processor, an electronic control unit (ECU), a graphic processing processor, a memory control processor, etc. In another example, the memory unit 430 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

FIG. 5 is a view showing an example of a hand-held device applicable to the present disclosure.

FIG. 5 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 5, the hand-held device 500 may include an antenna unit (antenna) 508, a communication unit (transceiver) 510, a control unit (controller) 520, a memory unit (memory) 530, a power supply unit (power supply) 540a, an interface unit (interface) 540b, and an input/output unit 540c. An antenna unit (antenna) 508 may be part of the communication unit 510. The blocks 510 to 530/540a to 540c may correspond to the blocks 410 to 430/440 of FIG. 4, respectively.

The communication unit 510 may transmit and receive signals (e.g., data, control signals, etc.) to and from other wireless devices or base stations. The control unit 520 may control the components of the hand-held device 500 to perform various operations. The control unit 520 may include an application processor (AP). The memory unit 530 may store data/parameters/program/code/instructions necessary to drive the hand-held device 500. In addition, the memory unit 430 may store input/output data/information, etc. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 440c may receive or output video information/signals, audio information/signals, data and/or user input information. The input/output unit 540c may include a camera, a microphone, a user input unit, a display 540d, a speaker and/or a haptic module.

For example, in case of data communication, the input/output unit 540c may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540c in various forms (e.g., text, voice, image, video and haptic).

Physical Channels and General Signal Transmission

FIG. 6 is a view showing physical channels applicable to the present disclosure and a signal transmission method using the same.

The UE which is turned on again in a state of being turned off or has newly entered a cell performs initial cell search operation in step S611 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S612, thereby acquiring more detailed system information.

Thereafter, the UE may perform a random access procedure such as steps S613 to S616 in order to complete access to the base station. To this end, the UE may transmit a preamble through a physical random access channel (PRACH) (S613) and receive a random access response (RAR) to the preamble through a physical downlink control channel and a physical downlink shared channel corresponding thereto (S614). The UE may transmit a physical uplink shared channel (PUSCH) using scheduling information in the RAR (S615) and perform a contention resolution procedure such as reception of a physical downlink control channel signal and a physical downlink shared channel signal corresponding thereto (S616).

The UE, which has performed the above-described procedures, may perform reception of a physical downlink control channel signal and/or a physical downlink shared channel signal (S617) and transmission of a physical uplink shared channel (PUSCH) signal and/or a physical uplink control channel (PUCCH) signal (S618) as general uplink/downlink signal transmission procedures.

FIG. 7 is a view showing the structure of a radio frame applicable to the present disclosure.

UL and DL transmission based on an NR system may be based on the frame shown in FIG. 7. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM (A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above, Nslotsymb may indicate the number of symbols in a slot, Nframe,μslot may indicate the number of slots in a frame, and Nsubframe,μslot may indicate the number of slots in a subframe.

In addition, in a system, to which the present disclosure is applicable, OFDM (A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

FIG. 8 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| Per device peak data rate | 1 Tbps |
| --- | --- |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

FIG. 9 is a view showing an example of a communication structure providable in a 6G system applicable to the present disclosure.

Referring to FIG. 9, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system.

Below, embodiments that can be applied in an optical wireless communication (OWC) system are discussed.

Symbols/abbreviations/terms related to the embodiments described later are as follows.
OF: Optical Frequency
OWC: Optical Wireless Communication
NLOS: Non Line of Sight
DSP: Digital Signal Processor
HP: Horizontal Polarization
VP: Vertical Polarization
RCP: Right-hand Circular Polarization
LCP: Left-hand Circular Polarization
REP: Right-hand Elliptical Polarization
LEP: Left-hand Elliptical Polarization
LG: Laguerre Gaussian
HG: Hermite Gaussian
TIA: Transimpedance Amplifier A method of controlling a beam in a wireless optical communication system is discussed.

In the case of a wireless optical communication system, unlike RF communication of LTE or NR, a very small beam width can be expected. In a mobile OWC system environment that considers mobility, fixed beams cannot be used like in OWC in a fixed point environment. Therefore, beam steering and tracking technology for a predefined cell area is required. For example, if the distance between the transmitter and receiver is 50 m, and a pencil beam with a half angle of beam divergence of about 100 micro-radians (beam waist is about 5 mm) is transmitted, the expected receiving end beam diameter is 5 mm to 3.5 cm. Hereinafter, it will be described with reference to FIG. 10.

FIG. 10 is a diagram illustrating a wireless communication system utilizing a pencil beam to which a method according to an embodiment of the present disclosure can be applied. Referring to FIG. 10, for a cell area (1 m×1 m) near the location of the receiving end, considering an aperture of 1 cm^2, there are a total of 10,000 beams.

In systems that utilize pencil beams as described above (e.g. Mobile OWC, Terahertz Communication, etc.), a large number of Tx/Rx beams may exist within a single cell. For the initial access stage for forming a link between Tx and Rx and maintenance of link connection, beam alignment needs to be guaranteed. A beam tracking procedure is required for such beam alignment.

When the number of beams is large, the beam search time to check the degree of alignment for each beam may also increase in proportion to the number of beams. Below, a method for solving the above-mentioned problems will be discussed.

FIG. 11 is a diagram to explain matters required in a beam search procedure depending on a beam width.

In a general beam search procedure, one beam contains one homogeneous information, and the ability to distinguish beams is determined by the relationship between the beam and the aperture. Elements that distinguish beams may be composed of units that distinguish physical resources such as time, frequency, and space.

Referring to (a) of FIG. 11, a beam search procedure is performed at the transmitting end using a Broad beam. In this case, only one beam is used for a large area, and the receiving end can perform detection for the beam. This method has an advantage in terms of the number of beams, but fine tuning suitable for the receiving aperture is not possible. In other words, even if the receiving end detects the beam, it is difficult for the transmitting end to align the beam used for the receiving end as a beam more suitable for the location of the receiving end.

Referring to (b) of FIG. 11, a beam search procedure is performed at the transmitting end using a narrow beam. In this case, one beam is used for a narrow area, and the receiving end performs detection on the beam related to the area where the receiving end is located. In the case of this method, fine tuning suitable for the receiving aperture is possible, but the search must be performed repeatedly several times to find the beam related to the area where the receiving end is located. Therefore, many physical resources are required.

The present disclosure proposes a method of utilizing one beam including inhomogeneous information/heterogeneous information. Specifically, for a beam including inhomogeneous information, different information is detected depending on the detection location of the beam. Through this, a beam detection operation performed using multiple beams can be performed at once. Hereinafter, an outline of the above-described operation will be described with reference to FIG. 12.

FIG. 12 illustrates a beam including inhomogeneous information according to an embodiment of the present disclosure.

Referring to FIG. 12, one beam transmitted by the transmitting end includes inhomogeneous information (e.g. A, B, C, D . . . ). Accordingly, different information (e.g., K) is detected depending on the location where the corresponding beam is detected. This will be described in more detail below.

In an environment where time/frequency/space, which is a physical resource distinguishing a beam in a beam search procedure, is the same, a beam configured to include inhomogeneous information may be referred to as an inhomogeneous beam. At this time, inhomogeneous information may be intensity, phase, or polarization, etc.

Referring to FIG. 12, the transmitter transmits a Broad Inhomogeneous beam to the cell area for a beam search procedure. The transmitted Broad Inhomogeneous Beam is radiated to the entire cell area. The radiated beam includes inhomogeneous information (letters A to R), and the inhomogeneous information is detected as information depending on the location.

Specifically, the detected information may vary depending on the location of the receiving aperture of the receiver. In the above example, the location of the receiving aperture is located in a partial area of the beam where K information is transmitted.

When the receiver feeds back the information (K) detected in the reception aperture to the transmitter, the transmitter can obtain the orientation of the transmission and reception link.

Hereinafter, information related to the generation of inhomogeneous polarization will be discussed.

Generation of Inhomogeneous Information

Inhomogeneous Beam can be defined as follows.

An optical beam that has inhomogeneous information (non-identical information, e.g. Intensity, Phase, Polarization, etc.) about the wavefront perpendicular to the optical axis of the optical beam from the perspective of transmission and reception.

Hereinafter, the types of inhomogeneous information for generating an inhomogeneous beam will be discussed.

It can be assumed that inhomogeneous information for generating an inhomogeneous beam is composed of intensity or phase. At this time, intensity/phase changes depending on the distance between the transmitter and receiver. Therefore, it is not possible to distinguish between changes in intensity or phase depending on location with respect to the optical axis and changes depending on distance. At this time, when the transmitting end uses a reference signal to deliver reference intensity or reference phase information, the intensity and phase that change depending on the distance between the transmitting and receiving end can be compensated and the inhomogeneous intensity and inhomogeneous phase can be utilized. For example, if a reference beam with homogeneous intensity and an inhomogeneous beam with inhomogeneous intensity are sequentially transmitted in the same area within a preconfigured time (hereinafter, Coherence Time), the beam for the receiver can be determined in the following manner. Depending on the location of the receiving aperture, the orientation of the receiving aperture (i.e. the beam heading from the transmitting end to the receiving end) can be inferred through the difference between the intensity information measured from the homogeneous intensity beam and the intensity information measured from the inhomogeneous intensity beam.

In the same way in the case of the phase information, the orientation of the receiving aperture can be inferred through sequential transmission of the homogeneous phase and the inhomogeneous phase.

As described above, in the method of configuring inhomogeneous information using Intensity or Phase, the Reference Beam must be transmitted within the Coherence Time.

On the other hand, it can be assumed that the inhomogeneous information for the generation of the inhomogeneous beam is composed of polarization. Polarization does not change with distance. Therefore, inhomogeneous polarization can be used as information independent of distance and channel.

Below, the generation of inhomogeneous polarization through a polarization superposition is examined.

Generation of Inhomogeneous Polarization Via Polarization Superposition

A signal with arbitrary polarization can be expressed as the sum of two polarization signals. For example, the polarization can be expressed as the sum of polarization 1 and polarization 2 as follows.

Polarization 1+Polarization 2=Superposed Polarization(for Homogeneous Symbol)

The above contents can be expressed in the following mathematical equation.

$$A_m e^{-j\theta_m}|P_m\rangle + A_n e^{-j\theta_n}|P_n\rangle = A_c e^{-j\theta_c}|P_c\rangle \quad \text{[Equation 1]}$$

Here, $A_m$ and $A_n$ represent the amplitude of the m/nth signal, $A_c$ represents the amplitude of the synthesized signal, $\theta_m$ and $\theta_n$ represent the phase of the m/nth signal, $\theta_c$ represents the phase of the synthesized signal. $|P_m\rangle$ and $|P_n\rangle$ represent the polarization of the m/nth signal, and $|P_c\rangle$ represents the polarization of the synthesized signal. At this time, polarization can be expressed as a Jones Vector.

Jones Vector is a vector representing polarization and can be expressed as Table 5 below.

TABLE 5

| Polarization | Jones vector | Typical ket notation |
|---|---|---|
| Linear polarized in the x direction Typically called "horizontal" | $\begin{pmatrix}1\\0\end{pmatrix}$ | $|H\rangle$ |
| Linear polarized in the y direction Typically called "vertical" | $\begin{pmatrix}0\\1\end{pmatrix}$ | $|V\rangle$ |

TABLE 5-continued

| Polarization | Jones vector | Typical ket notation |
|---|---|---|
| Linear polarized at 45° from the x axis Typically called "diagonal" L + 45 | $\frac{1}{\sqrt{2}}\begin{pmatrix}1\\1\end{pmatrix}$ | $\|D\rangle = \frac{1}{\sqrt{2}}(\|H\rangle + \|V\rangle)$ |
| Linear polarized at −45° from the x axis Typically called "anti-diagonal" L − 45 | $\frac{1}{\sqrt{2}}\begin{pmatrix}1\\-1\end{pmatrix}$ | $\|A\rangle = \frac{1}{\sqrt{2}}(\|H\rangle - \|V\rangle)$ |
| Right-and circular polarized Typically called "RCP" or "RHCP | $\frac{1}{\sqrt{2}}\begin{pmatrix}1\\-i\end{pmatrix}$ | $\|R\rangle = \frac{1}{\sqrt{2}}(\|H\rangle - i\|V\rangle)$ |
| Left-and circular polarized Typically called "LCP" or "LHCP | $\frac{1}{\sqrt{2}}\begin{pmatrix}1\\+i\end{pmatrix}$ | $\|L\rangle = \frac{1}{\sqrt{2}}(\|H\rangle + i\|V\rangle)$ |

At this time, in the synthesis of polarization, the characteristics of the synthesis polarization may vary depending on the difference in amplitude or phase of each polarization. For example, it can be illustrated as follows.

$A_1 e^{-j\theta_1}|H\rangle + A_2 e^{-j\theta_2}|V\rangle = |+45\rangle$, for $\theta_1 = \theta_2$ and $A_1 = A_2$ $A_1 e^{-j\theta_1}|H\rangle + A_2 e^{-j\theta_2}|V\rangle = |-45\rangle$, for $\theta_1 + \pi = \theta_2$ and $A_1 = A_2$ $A_1 e^{-j\theta_1}|H\rangle + A_2 e^{-j\theta_2}|V\rangle = |RCP\rangle$, for $\theta_1 + \pi/2 = \theta_2$ and $A_1 = A_2$ $A_1 e^{-j\theta_1}|H\rangle + A_2 e^{-j\theta_2}|V\rangle = |LCP\rangle$, for $\theta_1 - \pi/2 = \theta_2$ and $A_1 = A_2$ $A_1 e^{-j\theta_1}|RCP\rangle + A_2 e^{-j\theta_2}|LCP\rangle = |REP\rangle$, for $\theta_1 = \theta_2$ and $A_1 > A_2$ $A_1 e^{-j\theta_1}|RCP\rangle + A_2 e^{-j\theta_2}|LCP\rangle = |LEP\rangle$, for $\theta_1 = \theta_2$ and $A_1 < A_2$

|H⟩ and |V⟩ are linear polarization and represent horizontal polarization and vertical polarization, respectively.

|+45⟩ and |−45⟩ represent +45 degree polarization and −45 degree polarization, respectively, based on the x-axis.

|RCP⟩ and |LCP⟩ are circular polarization and represent Right-hand Circular Polarization and Left-hand Circular Polarization.

|REP⟩ and |LEP⟩ are elliptical polarization and represent Right-hand Elliptical Polarization and Left-hand Elliptical Polarization, respectively.

The following matters can be considered to express the synthesis of polarization.

A beam that expresses all changes in the characteristics of synthetic polarization depending on the difference in amplitude or phase of polarization can be defined as a Poincare beam.

The spherical space representing the Poincare beam in all cases can be defined as a Poincare Sphere. At this time, when the two basis polarizations are RCP and LCP, the Poincare Sphere expressed based on the difference in amplitude and phase of each basis can be expressed as shown in FIG. 13.

FIG. 13 is a diagram illustrating a Poincare sphere for expressing a synthesis of polarization light according to an embodiment of the present disclosure.

Referring to FIG. 13, Stokes Parameters (S0, S1, S2, S3) for expressing all polarization states on the Poincare Sphere can be defined as follows.

$S_0 = E_x^2 + E_y^2$ $S_1 = E_x^2 - E_y^2$ $S_2 = 2E_x E_y \cos\delta$ $S_3 = 2E_x E_y \sin\delta$ Here, $E_x$ and $E_y$ represent the E-field in the x-axis direction and the E-field in the y-axis direction, and generally correspond to Horizontal Polarization and Vertical Polarization. δ represents the phase difference between $E_x$ and $E_y$.

The meaning of each Stokes parameter (S0~S3) is as follows.

S0 represents the total intensity of the polarization state. S1 represents the ratio difference between Horizontal Polarization and Vertical Polarization. S2 represents the ratio difference between +45 degree Linear Polarization and −45 degree Linear Polarization. S3 represents the ratio difference between Right-hand Circular Polarization and Left-hand Circular Polarization. Hereinafter, Stokes parameters will be described in relation to spherical coordinates with reference to FIG. 14.

FIG. 14 illustrates Stokes parameters expressed in spherical coordinates according to an embodiment of the present disclosure.

Referring to FIG. 14, the Stokes parameters (S0 to S3) can be expressed in spherical coordinates as follows.

$S_0 = I$ $S_1 = Ip\cos 2\Psi \cos 2X$ $S_2 = Ip\sin 2\Psi \cos 2X$ $S_3 = Ip\sin 2X$ Here, I represents the Total Intensity of Polarization State. p represents the degree of polarization, and depending on its value, the degree of polarization is expressed as follows. p=0 can be defined as Unpolarized, 0<p<1 can be defined as Partially Polarized, and p=1 can be defined as Fully Polarized.

Ψ is the orientation angle, which represents the elliptical direction of elliptical polarization and satisfies $$\Psi = \frac{1}{2}\arctan\left(\frac{S_2}{S_1}\right).$$

X is the ellipticity angle, which represents the degree of ellipticity of elliptical polarization and satisfies $$X = \frac{1}{2}\arctan\left(\frac{S_3}{\sqrt{S_1^2 + S_2^2}}\right).$$

Therefore, since Ψ and X are not affected by Total Intensity I and Degree of Polarization p, they can be defined as angles based on the S1 axis on a Poincare Sphere whose size is fixed to 1. In the present disclosure, Ψ and X are defined as Poincare Sphere Angle.

Hereinafter, with reference to FIGS. 15 and 16, a concept of polarization synthesis will be explained along with a wavefront.

FIG. 15 is a diagram illustrating an example of a wavefront related to polarization synthesis.

FIG. 15 illustrates an example of extending a polarization synthesis concept to a wavefront for an arbitrary beam. It is assumed that Wavefront 1 is a Horizontal Polarized Wavefront which is a Plane Wave with $\theta_1$, and wavefront 2 is a Vertical Polarized Wavefront which is a Plane Wave with $\theta_2$.

Superposed Wavefront becomes Right-hand Circular Polarized Wavefront. Here, it is assumed that there is a relationship of $\theta_i + \pi/2 = \theta_{i+1}$. In other words, when each Homogeneous Polarized Wavefront has a Homogeneous Phase, the Superposed Wavefront also has Homogeneous Polarization.

FIG. 16 is a diagram illustrating another example of a wavefront related to polarization synthesis.

Referring to FIG. 16, a case where the wavefront has an Inhomogeneous Phase is illustrated. Here, Inhomogeneous Phase is defined as a case where the phases are not the same within the same Wavefront. For example, Larguerre-Gaussian (LG) Beam or Hermite-Gaussian (HG) Beam have an Inhomogeneous Phase.

It is assumed that Wavefront 1 is a Horizontal Polarized Wavefront which is a Plane Wave with $\theta_1$, and wavefront 2 is a Vertical Polarized Wavefront which is a Helical Wave with $\theta_1$ to $\theta_4$.

Superposed Wavefront becomes Inhomogeneous Polarized Wavefront. Here, it is assumed that there is a relationship of $\theta_i + \pi/2 = \theta_{i+1}$. In other words, if each Homogeneous Polarized Wavefront has an Inhomogeneous Phase, it can have different phase differences for each location within the Superposed Wavefront. Through this, the polarization synthesized for each internal location of the superposed wavefront can be changed to have Inhomogeneous Polarization. Hereinafter, the Inhomogeneous Polarized Wavefront will be described with reference to FIG. 17.

FIG. 17 is a diagram illustrating a beam related to an inhomogeneous polarized wavefront.

LG Beam is a Gaussian Beam with Orbital Angular Momentum (OAM) characteristics, and has the characteristic of rotating the phase within the wavefront according to the phase rotation characteristic parameter called LG Beam order, OAM order, or Topological Charge. When the wavefront through which electromagnetic waves (or photons) are propagated at the same time is called a wavefront or phasefront, plane phasefront (or plane wave) refers to that the phase of all electromagnetic waves on the wavefront being propagated at the same time is the same. In FIG. 17, this means the case where m=0.

Referring to FIG. 17, the first column represents electromagnetic waves having the same phase in the propagation direction on the same wave front, and the second column is a phase diagram, and represents the distribution of the phases when viewed from the propagation direction at a single time. The third column is an intensity diagram, and represents the distribution of light intensity when viewed from the propagation direction at a single time.

If it is not a plane wave (not m=0), the beam has a helical phasefront and can generally be said to be an electromagnetic wave with OAM. Light carries an orbital angular momentum.

Since OAM is the definition of a wavefront, electromagnetic waves at each point may be linear polarized or circular polarized. By optical definition, OAM can be referred to as Laguerre-Gaussian modes (LG Beam) or Cylindrical transverse mode patterns TEM (pl).

In the present disclosure, p=0 for TEM (pl), and 1 is defined as a value corresponding to the LG Beam order. For example, LG Beam order 3 or OAM mode 3 is TEM (03). LG Beam order is an Integer Value and when it has a negative value, the direction in which the phase rotates within the wavefront is opposite to the direction at positive values.

FIGS. 18 to 19 illustrate overlapped polarization according to an overlap of wavefronts.

FIG. 18 illustrates a case where two wavefronts overlap (concentric superposition case 1 with two wavefronts). The polarization/phase rotation characteristics of each wavefront are as follows.

Wavefront 1: RCP, LG beam with order −1
Wavefront 2: LCP, LG beam with order +1

FIG. 19 illustrates another example of two wavefronts overlapping (concentric superposition Case 2 with two wavefronts). The polarization/phase rotation characteristics of each wavefront are as follows.

Wavefront 1: RCP, LG beam with order −1
Wavefront 2: LCP, LG beam with order 0

In order to generate the Inhomogeneous Polarized Wavefront above, two or more Homogeneous Polarized Wavefronts can be synthesized. At this time, the distribution of the polarization state of the synthesized beam may vary depending on the number and configuration of the synthesized Homogeneous Polarized Wavefront.

The following points can be considered in relation to the generation of the Inhomogeneous Polarized Wavefront.

When two or more homogeneous polarized wavefronts are synthesized to generate an inhomogeneous polarized wavefront, the optical axis (or center) of the beam may be aligned identically, or may be arbitrarily deviated and synthesized, and the distribution of the polarization state of the synthesized beam may vary depending on the degree.

When two or more homogeneous polarized wavefronts are synthesized to generate an inhomogeneous polarized wavefront, the basis of homogeneous polarization of each wavefront may be orthogonal or non-orthogonal, and the distribution of polarization of the synthesized beam may vary depending on the basis polarization used.

When two or more homogeneous polarized wavefronts are synthesized to generate an inhomogeneous polarized wavefront, the distribution of polarization of the synthesized beam may vary depending on the Initial Phase value of each wavefront.

When two or more homogeneous polarized wavefronts are synthesized to generate an inhomogeneous polarized wavefront, the distribution of polarization of the synthesized beam may vary depending on the Initial Amplitude value of each wavefront.

When two or more homogeneous polarized wavefronts are synthesized to generate an inhomogeneous polarized wavefront, the distribution of polarization of the synthesized beam may vary depending on the distribution of the homogeneous phase of each wavefront.

In the present disclosure, Inhomogeneous Polarization is generated based on the Wavefront unit, and is defined as an Inhomogeneous Polarization Pattern.

Below, beam alignment based on Inhomogeneous Polarization is examined in detail.

Inhomogeneous Polarization Based Beam Alignment

Hereinafter, with reference to FIGS. 20 and 21, a beam alignment system based on an inhomogeneous polarization pattern will be described in detail.

FIG. 20 is a diagram illustrating detection of an inhomogeneous polarization pattern according to an embodiment of the present disclosure. Based on detection of the inhomogeneous polarization pattern, the beam of the transmitting end can be aligned.

Specifically, beam alignment can be performed as follows. The transmitting end broadcasts the inhomogeneous polarization pattern. The receiving end detects polarization and feeds back the detected polarization information to the transmitting end. Hereinafter, the above-described operation will be described in detail with reference to FIG. 21.

FIG. 21 is a diagram for explaining a beam alignment operation based on an inhomogeneous polarization pattern according to an embodiment of the present disclosure.

Referring to FIG. 21, the beam alignment operation may be performed in the following order.
1. The transmitter (Tx) broadcasts an Inhomogeneous Polarized Broad beam.
2. The receiver (Rx) detects the polarization state (or polarization pattern) where the receiver is located.
3. The receiver (Rx) feeds back polarization information including a polarization pattern or Stokes parameter to the transmitter (Tx).
4. The transmitter (Tx) searches for a polarization pattern related to the location of the receiver (Rx) in the entire pattern of the previously transmitted inhomogeneous polarized broad beam based on the polarization information obtained through the feedback. The transmitter (Tx) may determine the direction of the beam to the receiver based on the location of the searched polarization pattern. The transmitter (Tx) performs beam alignment based on the determined beam direction.

Hereinafter, the information fed back by the receiver (i.e. polarization information) will be described in detail.
Feedback Information A receiver capable of detecting the above-described polarization state can recognize/determine the polarization state through the Stokes parameter. Matters related to the receiver aperture related to detection of polarization state will be described below with reference to FIG. 22.

FIG. 22 illustrates a detection point of a polarization pattern according to a receiver aperture according to an embodiment of the present disclosure. Referring to FIG. 22, 1, 4 or 9 detection points related to the polarization pattern are shown. When the aperture is one, the number of detection points is one.

When the aperture is multiple apertures or a quantized single aperture, the number of detection points may be multiple (e.g. 4, 9). Hereinafter, feedback operations when the number of detection points is one and multiple are examined in order.
Single Point Feedback When performing Single Polarization State Detection through Single Receiver Aperture, the receiver can feed back one polarization state to the transmitter. Hereinafter, the format of the information to be fed back will be described in detail with reference to FIG. 23.

Figure 23:
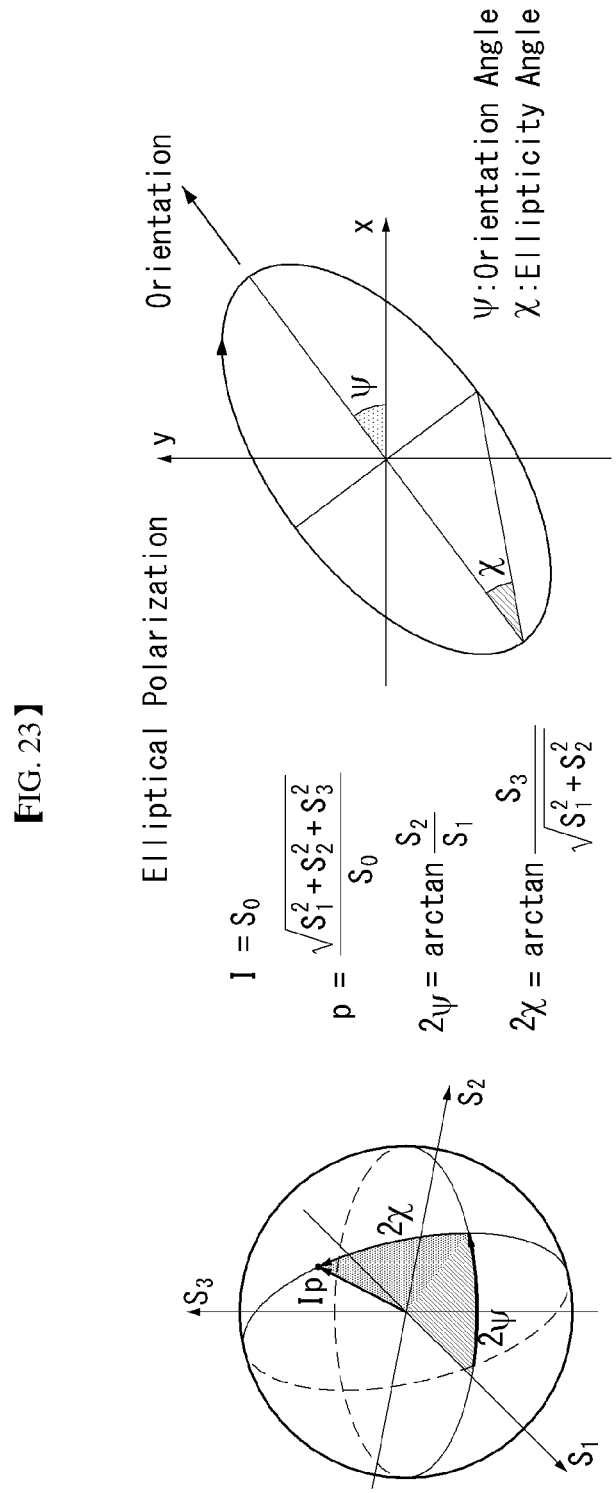
FIG. 23 is a diagram illustrating a format of polarization state information fed back according to an embodiment of the present disclosure.

FIG. 23 is a diagram illustrating a format of polarization state information fed back according to an embodiment of the present disclosure. Referring to FIG. 23, the polarization state information fed back may be based on a Stokes Vector or a Poincare Sphere Angle Vector.

According to one embodiment, the receiver may feed back the Stokes vector based on the measured Stokes parameter. The Stokes Vector is a vector including all Stokes Parameters (S0 to S3) and is used to deliver polarization state information and total intensity. The Stokes Vector can be expressed as Equation 2 below.

Stokes Vector $S = [S_0, S_1, S_2, S_3]$ [Equation 2]

for a Single Polarization Detection Point

According to one embodiment, when the receiver feeds back one polarization state, the receiver may feed back a Poincare Sphere Angle Vector based on the measured Stokes parameter.

The Poincare Sphere Angle Vector is a vector that expresses only polarization state information on a unit Poincare Sphere. The Poincare Sphere Angle Vector is used to deliver only polarization state information without information about total intensity. The Poincare Sphere Angle Vector can be expressed as Equation 3 below.

Poincare Sphere Angle Vector [Equation 3]

$\Omega = [\Psi, X]$ for a Single Stokes Vector

In Equation 3, $\Psi$ is the orientation angle, represents the elliptical direction of elliptical polarization, and satisfies $$\Psi = \frac{1}{2}\arctan\left(\frac{S_2}{S_1}\right).$$

X is an ellipticity angle, which represents the degree of ellipticity of elliptical polarization and satisfies $$X = \frac{1}{2}\arctan\left(\frac{S_3}{\sqrt{S_1^2 + S_2^2}}\right).$$

Below, the feedback operation is examined when the number of detection points is multiple.
Multiple Point Feedback When the receiver performs multiple polarization state detection, multiple polarization states can be fed back.

The multiple polarization state detection may be performed based on 1) multiple receiver apertures or 2) a single receiver aperture and multiple photodetector arrays.

According to one embodiment, the receiver may feed back Stokes Vectors based on the measured Stokes Parameter. The Stokes vector for M detection points can be expressed as Equation 4 below.

Stokes Vector $S_i = \left[S_0^{(i)}, S_1^{(i)}, S_2^{(i)}, S_3^{(i)}\right]$ for [Equation 4]

the $i^{th}$ Polarization Detection Point, $i = 1, \ldots, M$

According to one embodiment, when the receiver feeds back multiple polarization states, the receiver may feed back a Poincare Sphere Angle Vector based on the measured Stokes parameter. The Poincare Sphere Angle Vector for M detection points can be expressed as Equation 5 below.

Poincare Sphere Angle Vector $\Omega_i = \left[\Psi^{(i)}, X^{(i)}\right]$ [Equation 5]

for the $i^{th}$ Single Stokes Vector, $i = 1, \ldots, M$

Ψ$^{(i)}$ is the orientation angle, which represents the elliptical direction of the ith elliptical polarization and satisfies $$\Psi^{(i)} = \frac{1}{2}\arctan\left(\frac{S_2^{(i)}}{S_1^{(i)}}\right).$$

X$^{(i)}$ is the ellipticity angle, which represents the ellipticity of the ith elliptical polarization and satisfies $$X^{(i)} = \frac{1}{2}\arctan\left(\frac{S_3^{(i)}}{\sqrt{(S_1^{(i)})^2 + (S_2^{(i)})^2}}\right).$$

Feedback information based on the above-described embodiments may be quantized and transmitted by a pre-arranged method. Additionally, feedback information based on the above-described embodiments may be quantized by a pre-arranged method and then indexed and transmitted.

Below, the search algorithm for the polarization state pattern is examined.

Polarization State Pattern Search Algorithm

When performing a beam search on the transmitter, the transmitter searches for the beam direction to the receiver from the inhomogeneous polarization pattern transmitted from the transmitter based on the single polarization state information fed back by the receiver.

When performing a beam search at the receiver, the beam direction to the receiver is searched from the inhomogeneous polarization pattern transmitted from the transmitter, based on the single polarization state information detected by the receiver. Hereinafter, beam search will be described sequentially divided into a case where there is one detection point and a case where there are multiple detection points.

Polarization State Pattern Search Algorithm for Single Point

The beam direction to the receiver is searched from the inhomogeneous polarization pattern based on the polarization state information detected (or fed back) from a single point perspective.

Figure 24:
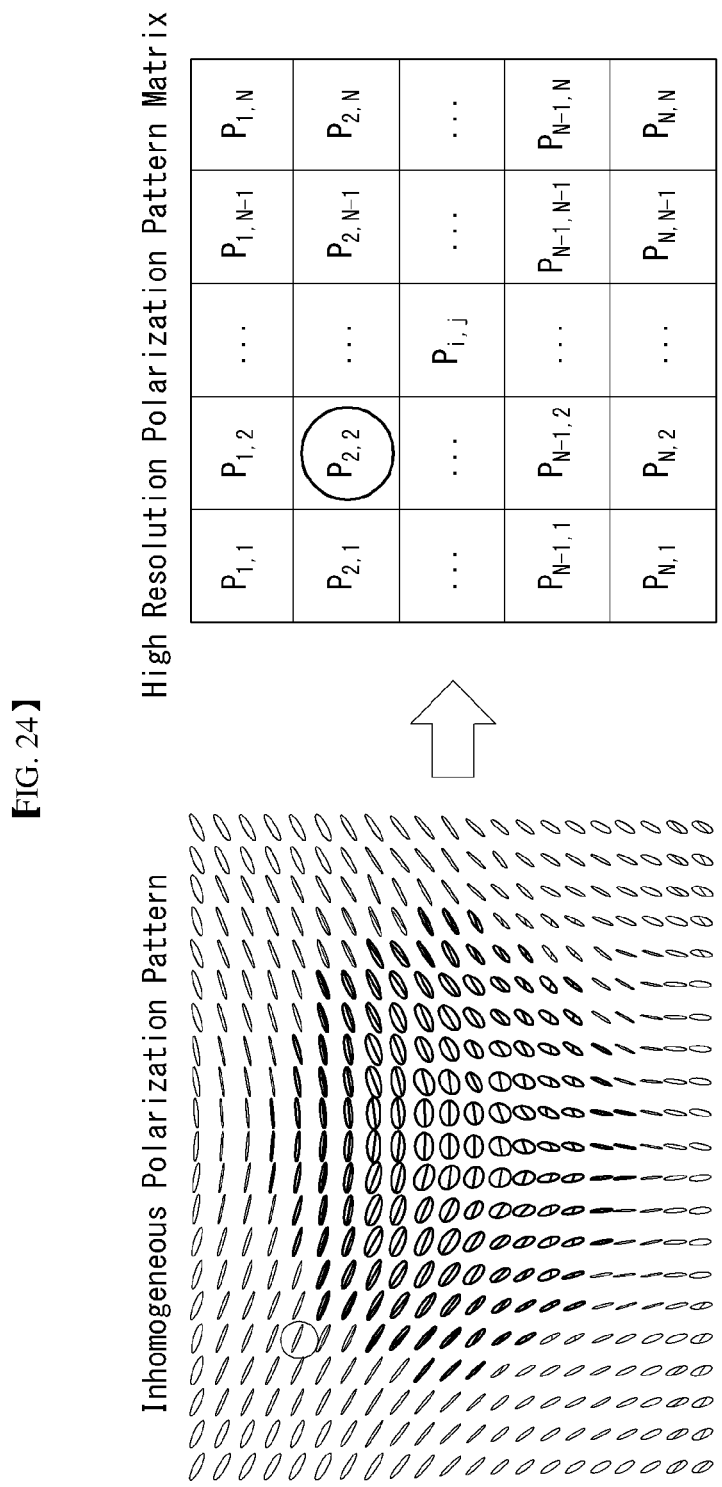
FIG. 24 illustrates a polarization pattern matrix related to an inhomogeneous polarization pattern according to an embodiment of the present disclosure.

For example, the inhomogeneous polarization pattern may be defined in advance based on a high resolution polarization pattern matrix, as shown in FIG. 24.

FIG. 24 illustrates a polarization pattern matrix related to an inhomogeneous polarization pattern according to an embodiment of the present disclosure.

Referring to FIG. 24, the inhomogeneous polarization pattern can be quantized into an N×N high resolution polarization pattern matrix.

The receiver (transmitter) can compare the detected (or fed back) polarization state information with each polarization (i.e. each element of the matrix) of the high resolution polarization pattern matrix, and select the most similar polarization state.

For example, the index of the most similar polarization state may be selected based on the Euclidean Distance, as shown in Equation 6 below.

$$(i, j) = \arg\min_{i,j} \sqrt{\begin{array}{l}(P_{i,j}(S_1) - S_1^{(detected)})^2 + \\ (P_{i,j}(S_2) - S_2^{(detected)})^2 + \\ (P_{i,j}(S_3) - S_3^{(detected)})^2\end{array}}$$ [Equation 6]

$$i, j = 1, \ldots, N$$

Here, $P_{i,j}(S_k)$ means the kth Stokes Parameter of the (i, j)th Polarization State in the High Resolution Polarization Pattern Matrix. $S_k^{(detected)}$ is the kth Stokes Parameter derived through the detected (or fed back) Polarization State. At this time, Stokes Parameter includes S0, S1, S2, and S3, but among them, S1 to S3 can be used for polarization detection. Specifically, since S0 is Total Intensity, S1 to S3 corresponding to the polarization state can be used for polarization detection. Therefore, excluding the Intensity that can be changed by Channel, $P_{i,j}(S_k)$ and $S_k^{(detected)}$ can be obtained through Stokes Parameters normalized by $P_{i,j}(S_0)$ and $S_0^{(detected)}$, respectively. For example, Equation 6 can be constructed through $\overline{P_{i,j}(S_k)} = P_{i,j}(S_k)/P_{i,j}(S_0)$ or $\overline{S_k^{(detected)}} = S_k^{(detected)}/S_0^{(detected)}$.

The operation according to the above embodiment can be equally applied even when the format of the information fed back is a Poincare Sphere Angle Vector. Specifically, even when the detected (or fed back) Polarization State information is a Poincare Sphere Angle Vector, similarity is measured in the same manner as described above, and based on this, the index of the polarization state can be determined.

The beam index can be determined through the index of the polarization state selected in the High Resolution Polarization Pattern Matrix. For F example, if the polarization state index and the beam index are mapped 1:1, it can be selected based on the following Equation.

$$b = (i-1)*N + (j-1)*N, i, j = 1, \ldots, N, b = 1, \ldots, N^2 \quad \text{[Equation 7]}$$

In Equation 7 above, b is the beam index, i is the row index of the N×N High Resolution Polarization Pattern Matrix, and j is the column index of the N×N High Resolution Polarization Pattern Matrix.

The index of the polarization state and the beam index may be mapped as M:1. Here M>1. In this case, the resolution of beam selection may be operated lower than the resolution of selection of the polarization state.

When the above-described operation is performed at the transmitting end, the transmitting end can perform transmit beamforming toward the receiving end using the selected Beam Index.

When the above operation is performed at the receiving end, the receiving end can request Transmit Beamforming by feeding back the selected Beam Index to the transmitting end.

Below, a polarization state pattern search algorithm when there are multiple detection points will be discussed.

Polarization State Pattern Search Algorithm for Multiple Points

Based on Polarization State information detected (or fed back) from the Multiple Point perspective, the beam direction to the receiver is searched from the Inhomogeneous Polarization Pattern. Hereinafter, description will be made with reference to FIG. 25.

Figure 25:
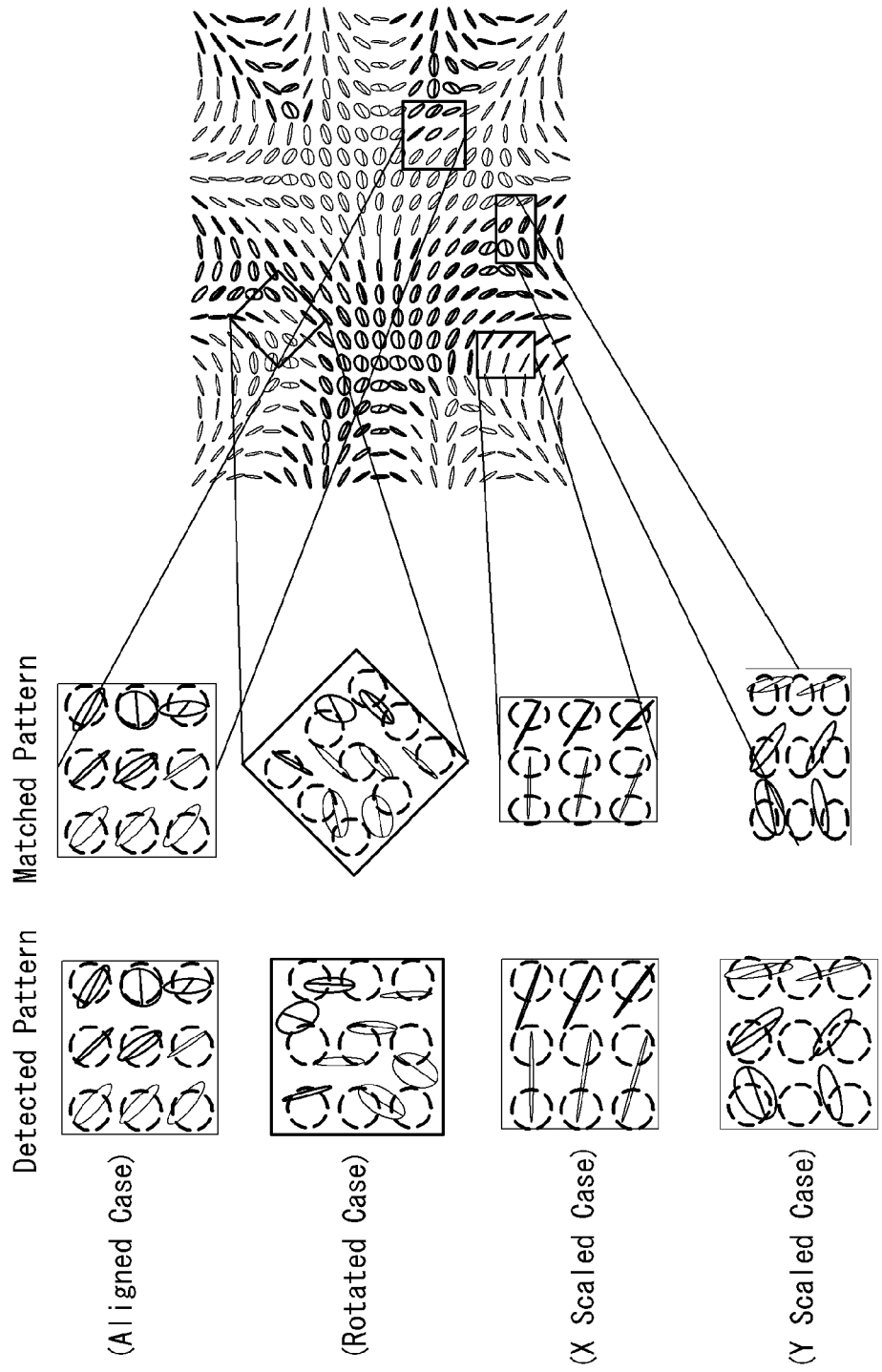
FIG. 25 is a diagram for explaining a search operation of a polarization pattern related to multiple detection points according to an embodiment of the present disclosure.

FIG. 25 is a diagram for explaining a search operation of a polarization pattern related to multiple detection points according to an embodiment of the present disclosure.

Referring to FIG. 25, it is assumed that 9 Stokes vectors for 9 detection points are detected (or fed back). At this time, a pattern search may be performed according to the degree of alignment of the transmitting and receiving ends.

In the case where the transmitting and receiving ends are aligned facing each other, the detected pattern can be searched for in the inhomogeneous polarization pattern.

On the other hand, in the case where the transmitter and receiver are facing each other, but the receiver is rotated from the perspective of the multiple detection points, the searches in the inhomogeneous polarization patterns must be performed considering the rotation of the pattern.

When the optical axis facing the transceiver is the z-axis, if the receiver is tilted to the x-axis or y-axis, the pattern measured at the receiver is scaled to the x-axis or y-axis (X/Y scaled case). Searches in the inhomogeneous polarization pattern must be performed considering the x-axis/y-axis scaling of the pattern. In addition, scaling occurs along the x-axis and y-axis depending on the distance between the transmitter and receiver, so even in this case, searches in the inhomogeneous polarization patterns must consider the x-axis/y-axis scaling of the pattern.

As described above, the following effects are derived from the operation of searching the beam based on the polarization state information detected (fed back) from the perspective of multiple detection points.

Through the search operation of the beam direction from the inhomogeneous polarization pattern to the receiver, not only the direction of the beam but also the rotation, tilting, and distance information of the receiver can be obtained. Through this, localization of the receiver becomes possible.

In the above, the polarization pattern search from the perspective of multiple detection points can be performed by measuring the similarity between patterns (or between matrices and vectors) in the same way as the polarization pattern search from the perspective of a single detection point. Based on the searched polarization pattern, beam selection and feedback can be performed the same as beam selection from a single detection point perspective.

The above-mentioned inhomogeneous polarization based beam alignment method may cause polarization mode distortion (PMD) due to optical channel impact or errors when detecting polarization or polarization patterns by rotating the alignment orientation of the receiver. At this time, depending on the inhomogeneous polarization pattern, the error due to the above factor (PMD, alignment direction rotation) may occur very large.

Here, PMD is a phenomenon that generally occurs in optical fibers and is caused by differential group delay of a transmitted beam. In other words, PMD refers to a phenomenon in which polarization is transformed at the receiving end, which is generated by pressure applied to the optical fiber, temperature change, curvature, and inhomogeneity of the medium. Even in a wireless environment, PMD may be generated due to differences in particles in the atmospheric space, and as a result, variations of polarization may be experienced at the receiving end.

Additionally, the beam alignment procedure can be performed without orientation information of Tx and Rx. If the receiving end performs polarization detection without the direction information, an error may occur. Specifically, when the receiving end performs a polarization search in an inhomogeneous polarization pattern, polarization related to a location other than the location of the transmitting end may be searched. This error is explained with reference to FIG. 26.

Figure 26:
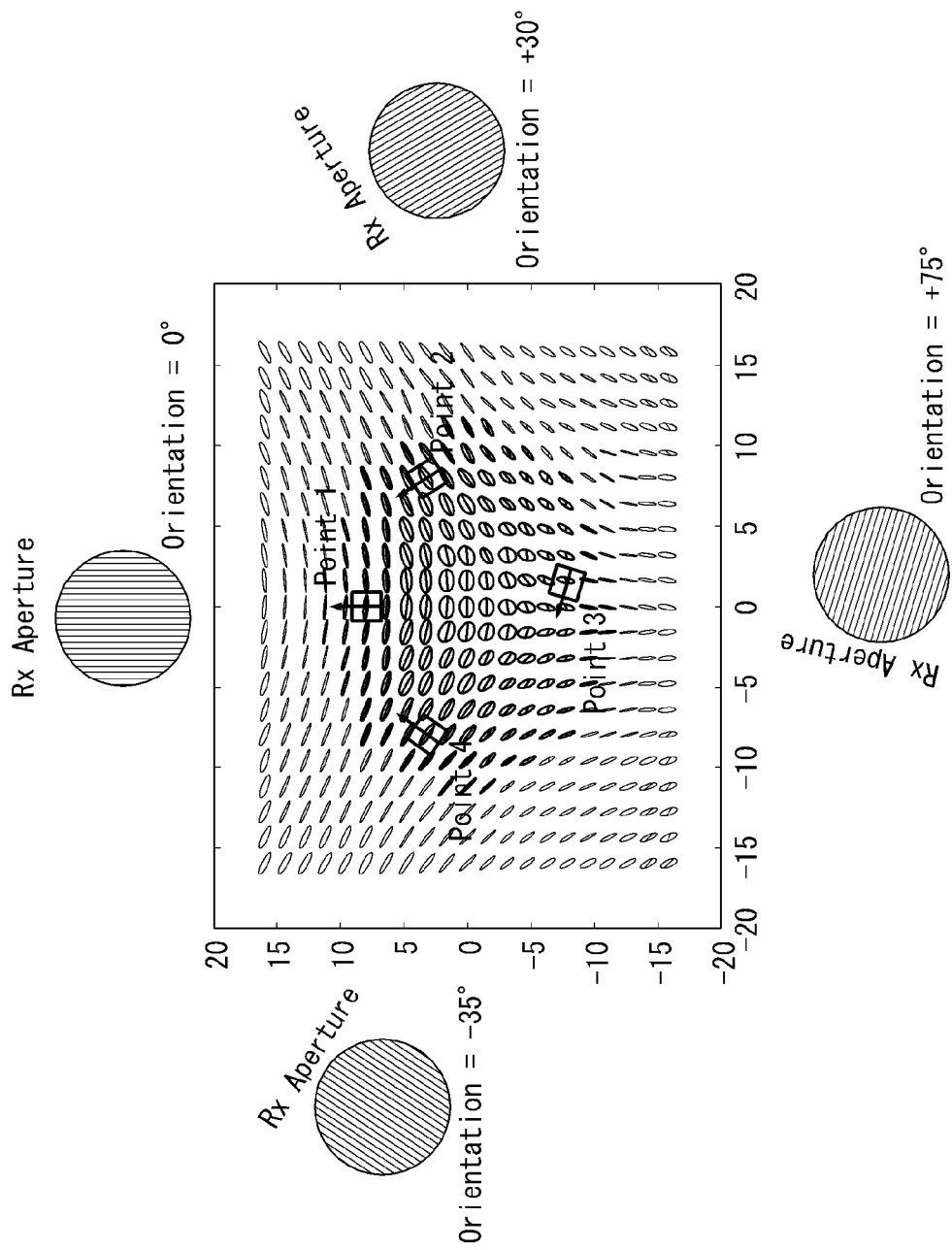
FIG. 26 is a diagram to explain problems that may occur when a beam alignment procedure is performed without direction information.

FIG. 26 is a diagram to explain problems that may occur when a beam alignment procedure is performed without direction information.

In FIG. 26, it is assumed that a beam alignment procedure using an optical beam based on an inhomogeneous polarization pattern is performed. At this time, the polarization state within the inhomogeneous polarization pattern detected from the optical beam may be detected as a polarization state at a completely different location by the alignment rotation of the receiver. Specifically, when the reference orientation of the receiver aperture (Rx Aperture) is the Y axis corresponding to the vertical polarizer, FIG. 26 shows the matching error of single polarization detection according to the orientation of the Rx Aperture. At this time, from the perspective of the inhomogeneous polarization pattern, it is assumed that the polarization state according to the geometric location of the actual receiver aperture (Rx Aperture) is Point 1.

If the orientation of the receiver aperture (Rx Aperture) is 0°, it can be recognized (detected) as Point 1. If the orientation of the receiver aperture (Rx Aperture) is +30°, it can be recognized (detected) as Point 2.

If the orientation of the receiver aperture (Rx Aperture) is +75°, it can be recognized (detected) as Point 3. If the orientation of the receiver aperture (Rx Aperture) is −35°, it can be recognized (detected) as Point 4.

The detection error of the above-described polarization state may occur due to the orientation of the receiver aperture (Rx Aperture) even if the same polarization state is not included in the inhomogeneous polarization pattern. Therefore, if the receiving end (Rx) does not know the orientation information with respect to the transmitting end (Tx), the receiving end (Rx) may completely incorrectly estimate (a polarization state depending on) its own geometric location in the inhomogeneous polarization pattern depending on the situation.

To solve this, polarization pattern matching through multiple point detection can be performed. However, problems may occur due to the orientation of the receiver aperture (Rx Aperture) depending on the inhomogeneous polarization pattern used for beam alignment. Hereinafter, it will be described in detail with reference to FIG. 27.

FIG. 27 is a diagram to explain problems that may occur depending on an orientation of a receiver aperture when polarization pattern matching is performed based on multiple point detection. Referring to FIG. 27, similar to the example of FIG. 26 described above, the polarization state within the inhomogeneous polarization pattern detected from the optical beam may be detected as a polarization state at a completely different position by rotating the alignment of the receiver.

Specifically, when the reference orientation of the receiver aperture (Rx Aperture) is the Y axis corresponding to the vertical polarizer, FIG. 27 shows the matching error of multiple polarization detection according to the orientation of the Rx Aperture. At this time, from the perspective of the inhomogeneous polarization pattern, it is assumed that the polarization state according to the geometric location of the actual receiver aperture (Rx Aperture) is Point 1.

If the orientation of the receiver aperture (Rx Aperture) is +45°, it can be recognized (detected) as Pattern 1. If the orientation of the receiver aperture (Rx Aperture) is +135°, it can be recognized (detected) as Pattern 2.

If the orientation of the receiver aperture (Rx Aperture) is −45°, it can be recognized (detected) as Pattern 3. If the orientation of the receiver aperture (Rx Aperture) is −135°, it can be recognized (detected) as Pattern 4.

The detection error of the above-described polarization state may occur due to the orientation of the receiver aperture (Rx Aperture) even if the same polarization state is not included in the inhomogeneous polarization pattern. If the receiving end (Rx) does not know the orientation information with respect to the transmitting end (Tx), the receiving end (Rx) may completely incorrectly estimate (a polarization state depending on) its own geometric location in the inhomogeneous polarization pattern depending on the situation.

Therefore, in the inhomogeneous polarization based beam alignment method, a method is required to solve optical mode distortion due to optical channel impact or errors that occur when detecting polarization or polarization patterns due to rotation of the alignment orientation of the receiver.

To solve the above problem, the present disclosure proposes a differential polarization pattern based beam alignment method and a multiple polarization pattern based beam alignment method.

Differential Polarization Pattern Based Beam Alignment

Below, a method of performing beam alignment based on the differential polarization pattern between the homogeneous reference polarization pattern and the inhomogeneous polarization pattern is proposed.

As described above, in the inhomogeneous polarization based beam alignment method, the PMD generated by the optical channel between the transmitting and receiving ends or the polarization distortion by the difference in the alignment orientation of the transmitting and receiving ends may occur.

The polarization distortion can be expressed as a change in polarization ratio and phase difference for the two polarization bases that form polarization in terms of Poincare Sphere. The polarization distortion expressed on Poincare Sphere will be described below with reference to FIG. 28.

FIG. 28 is a diagram showing polarization distortion expressed on Poincare Sphere.

Referring to FIG. 28, the Poincare Sphere uses RCP and LCP as the basis. S1 is a space representing H-pol, S2 is a space representing +45 degree linear polarization, and S3 is a space representing RCP.

It can be assumed that the original polarization transmitted from the transmitting end is H-pol, which is $[S_0, S_1, S_2, S_3]=[1, 1, 0, 0]$ in terms of Stokes Parameter. At this time, distorted polarization due to polarization distortion can be expressed as $[S_0, S_1, S_2, S_3]=[1, \cos \Psi_d \cos X_d, \cos \Psi_d \sin X_d, \sin X_d]$.

Here, $\Psi_d$ represents the change in ratio between Basis RCP and Basis LCP due to polarization distortion, and $X_d$ represents the change in phase difference between Basis RCP and Basis LCP due to polarization distortion. Therefore, the polarization distortion vector can be defined as $P_d=[\Psi_d, X_d]$.

In the above example, the Stokes Parameter is normalized to 1, which corresponds to Total Intensity, and p, the degree of polarization, is assumed to be 1.

Hereinafter, in FIG. 29, a method of using a beam with homogeneous polarization characteristics to solve the above-mentioned polarization distortion will be discussed.

FIG. 29 is a diagram illustrating transmission of a beam based on a homogeneous polarization pattern for measuring polarization distortion according to an embodiment of the present disclosure.

Specifically, FIG. 29 illustrates a system that broadcasts a homogeneous polarization based reference beam from a transmitting end to measure a Poincare distortion vector in a wireless communication system.

Referring to FIG. 29, the transmitting end broadcasts a reference beam composed of a homogeneous polarization pattern to the target area (e.g. cell area) before the step for beam search. At this time, the reference beam may be a signal for synchronization (e.g. synchronization signal block, SSB), a reference signal for channel measurement (e.g. CSI-RS), or a reference signal separately configured for polarization measurement. The reference beam may be based on a signal previously agreed upon/defined between the transmitting and receiving end.

The receiving end, which receives the reference beam within the area targeted by the transmitting end, measures the polarization state through a polarization detector. The receiving end can calculate $P_d=[\Psi_d, X_d]$, a polarization distortion vector, on the Poincare Sphere by comparing the pre-arranged/pre-configured homogeneous polarization state and the measured polarization state.

Hereinafter, contents related to compensation of the distortion and feedback of compensated polarization will be described in detail.

Polarization Distortion Compensation and Compensated Polarization Feedback

In the present disclosure, the polarization state of the reference beam promised for measurement of polarization distortion between the transmitting and receiving end is referred to as reference polarization. Hereinafter, with reference to FIG. 30, the relationship between original reference polarization and distorted reference polarization will be described.

FIG. 30 is a diagram to explain relationship between original reference polarization and distorted reference polarization.

According to FIG. 30, the relationship between the original reference polarization without distortion and the distorted reference polarization due to polarization distortion is shown on the Poincare Sphere.

In FIG. 30, it is assumed that horizontal polarization is the reference polarization in the Poincare Sphere with RCP and LCP as the basis.

Even if the transmitting end broadcasts all the same homogeneous polarization based reference beam to the target areas, the distorted reference polarization of the receiving end may be measured differently due to polarization distortion that occurs depending on the location and orientation of the receiving end. Accordingly, the polarization distortion vector $P_d=[\Psi_d, X_d]$ can be calculated on the Poincare Sphere.

Compensated inhomogeneous polarization can be calculated through calculation of the polarization distortion vector. Specifically, when the receiving end receives an inhomogeneous polarization based broad beam, compensated inhomogeneous polarization can be calculated based on the measured polarization state. Hereinafter, the calculation of compensated inhomogeneous polarization will be described in detail with reference to FIG. 31.

FIG. 31 is a diagram showing an inhomogeneous polarization beam transmitted for calculation of compensated inhomogeneous polarization according to an embodiment of the present disclosure.

Referring to FIG. 31, after the homogeneous polarization based reference beam is transmitted, an inhomogeneous polarization beam for beam search can be transmitted. Through this, the polarization state according to the location of the receiving end can be measured on the inhomogeneous polarization pattern.

Hereinafter, with reference to FIG. 32, the measured inhomogeneous polarization state and compensated inhomogeneous polarization state will be described in detail.

FIG. 32 is a diagram for explaining a measured inhomogeneous polarization state and a compensated inhomogeneous polarization state according to an embodiment of the present disclosure.

When an inhomogeneous polarization based broad beam is received at the receiver, the measured polarization state can be compensated by reflecting the polarization distortion calculated by the homogeneous polarization. The receiving end may perform polarization information feedback or perform a polarization pattern search to the transmitting end based on the compensated inhomogeneous polarization.

Each of the above-mentioned polarization states can be expressed as a formula as follows.

Original Reference Polarization

The original reference polarization is an original reference polarization state that is not affected by distortion from the perspective of the transmitter transmission.

Reference Stokes Parameter: $S^{(R)}=[S_0^{(R)}, S_1^{(R)}, S_2^{(R)}, S_3^{(R)}]$ Reference Poincare Sphere Angle Vector: $P^{(R)}=[\Psi^{(R)}, X^{(R)}]$ At this time, it is $$\Psi^{(R)} = \frac{1}{2}\arctan\left(\frac{S_2^{(R)}}{S_1^{(R)}}\right) \text{ and } X^{(R)} = \frac{1}{2}\arctan\left(\frac{S_3^{(R)}}{\sqrt{(S_1^{(R)})^2 + (S_2^{(R)})^2}}\right).$$

Distorted Reference Polarization

The distorted reference polarization is a modified reference polarization state affected by distortion from the perspective of the receiving end measurement.

Distorted Stokes Parameter: $S^{(D)}=[S_0^{(D)}, S_1^{(D)}, S_2^{(D)}, S_3^{(D)}]$ Distorted Poincare Sphere Angle Vector: $P^{(D)}=[\Psi^{(D)}, X^{(D)}]$ At this time, it is $$\Psi^{(D)} = \frac{1}{2}\arctan\left(\frac{S_2^{(D)}}{S_1^{(D)}}\right) \text{ and } X^{(D)} = \frac{1}{2}\arctan\left(\frac{S_3^{(D)}}{\sqrt{(S_1^{(D)})^2 + (S_2^{(D)})^2}}\right).$$

Polarization Distortion Vector

The polarization distortion vector is a vector that represents the degree of transformation due to distortion in the original polarization.

$$P_d = [\Psi_d, X_d] = P^{(D)} - P^{(R)}$$

At this time, it is $\Psi_d = \Psi^{(D)} - \Psi^{(R)}$ and $X_d = X^{(D)} - X^{(R)}$.

Measured Inhomogeneous Polarization

The measured inhomogeneous polarization is an inhomogeneous polarization state affected by distortion from the perspective of the receiving end measurement.

Measured Stokes Parameter: $S^{(M)}=[S_0^{(M)}, S_1^{(M)}, S_2^{(M)}, S_3^{(M)}]$ Measured Poincare Sphere Angle Vector: $P^{(M)}=[\Psi^{(M)}, X^{(M)}]$ At this time, it is $$\Psi^{(M)} = \frac{1}{2}\arctan\left(\frac{S_2^{(M)}}{S_1^{(M)}}\right) \text{ and } X^{(M)} = \frac{1}{2}\arctan\left(\frac{S_3^{(M)}}{\sqrt{(S_1^{(M)})^2 + (S_2^{(M)})^2}}\right).$$

Compensated Inhomogeneous Polarization

The compensated inhomogeneous polarization is a compensated inhomogeneous polarization state generated by compensating an inhomogeneous polarization state (measured inhomogeneous polarization state) affected by distortion from the perspective of the receiving end measurement with a measured polarization distortion vector.

Compensated Poincare Sphere Angle Vector: $P^{(C)}=[\Psi^{(C)}, X^{(C)}]=P^{(M)}-P_d=[\Psi^{(M)}, X^{(M)}]-[\Psi_d, X_d]$ At this time, it is $\Psi^{(C)}=\Psi^{(M)}-\Psi_d$ and $X^{(C)}=X^{(M)}-X_d$.

Compensated Stokes Parameter: $S^{(C)}=[S_0^{(C)}, S_1^{(C)}, S_2^{(C)}, S_3^{(C)}]$ At this time, it is $S_0^{(C)}=S_0^{(M)}=I, S_1^{(C)}=Ip \cos \Psi^{(C)} \cos X^{(C)}, S_2^{(C)}=Ip \sin \Psi^{(C)} \cos X^{(C)}$, and $S_3^{(C)}=Ip \sin X^{(C)}$.

Distorted reference polarization, polarization distortion vector, measured inhomogeneous polarization, and compensated inhomogeneous polarization are explained from the perspective of single point detection for convenience of explanation.

However, application of the method according to the embodiment of the present disclosure is not only applied from the perspective of single point detection. From the perspective of multiple point detection, it is clear that Stokes Parameters and Poincare Sphere Angle Vectors, which represent the above-mentioned parameters (Distorted Reference Polarization, Polarization Distortion Vector, etc.), can be calculated in the same way.

Procedures of Homogeneous and Inhomogeneous Polarization Based Beam Alignment Via Polarization Compensation Hereinafter, with reference to FIGS. 33 to 35, a homogeneous and inhomogeneous polarization based beam alignment procedure through polarization compensation will be described.

FIG. 33 is a diagram for explaining a homogeneous and inhomogeneous polarization based beam alignment procedure according to an embodiment of the present disclosure.

Referring to FIG. 33, a homogeneous polarized beam and inhomogeneous polarized beam are broadcast, and a beam search is performed at the transmitting end (Tx) based on the feedback information.

1-1) Broadcast Homogeneous Polarized Beam Information (e.g., MIB from xPBCH, SIB from xPDSCH, . . . )

The transmitting end and the receiving end can exchange information about the homogeneous polarized beam pattern in advance. Information about the homogeneous polarized beam pattern may be defined in advance at the device design stage.

1-2) Transmit Homogeneous Polarized Broad Beam

The transmitting end transmits a homogeneous polarized broad beam through pre-arranged physical resources (Time, Frequency) for beam search. The homogeneous polarized broad beam may be broadcast by the transmitting end.

The homogeneous polarized broad beam is the homogeneous polarization beam generated by the polarization beam generator of the transmitter that has been spread out through the beam divergence controller so that it can be transmitted to the target area.

1-3) Transmit Inhomogeneous Polarized Broad Beam

The transmitting end transmits an inhomogeneous polarized broad beam through pre-arranged physical resources (Time, Frequency) for beam search. The inhomogeneous polarized broad beam may be broadcast by the transmitting end.

The inhomogeneous polarized broad beam is the inhomogeneous polarization beam generated by the inhomogeneous polarization beam generator of the transmitter that has been spread out through the beam divergence controller so that it can be transmitted to the target area.

1-4) Polarization Detection

The receiving end detects the reference polarization of the beam received at the location of the receiving end among the homogeneous polarized broad beams through pre-arranged physical resources (Time, Frequency) for beam search or other purposes (e.g. Reference Signal for Synchronization, Channel Estimation, etc.).

Through polarization detection, distorted reference polarization state information, which is a value measured by the polarization detector of the receiver, is obtained.

The receiving end receives an inhomogeneous polarized broad beam through pre-arranged physical resources (Time, Frequency) for beam search. The receiving end detects the inhomogeneous polarization of the beam received at the location of the receiving end.

Through polarization detection, measured inhomogeneous polarization state information, which is a value measured by the polarization detector of the receiver, is obtained.

The polarization state information may be 1) single information for each of distorted reference polarization and measured inhomogeneous polarization in the case of single point detection, and 2) pattern information in the case of multiple point detection.

For single point detection, polarization state information related to distorted reference polarization can be defined as a distorted Stokes vector or distorted Poincare sphere angle vector.

In the case of multiple point detection, polarization state pattern information related to distorted reference polarization can be defined as a plurality of distorted Stokes Vectors or a plurality of distorted Poincare Sphere Angle Vectors.

In the case of single point detection, polarization state information for measured inhomogeneous polarization can be defined as measured Stokes Vector or measured Poincare Sphere Angle Vector.

In the case of multiple point detection, polarization state pattern information for measured inhomogeneous polarization can be defined as a plurality of measured Stokes Vectors or a plurality of measured Poincare Sphere Angle Vectors.

1-5) Polarization Information Feedback

The receiving end feeds back the measured polarization state information to the transmitting end through pre-arranged/defined physical resources (Time, Frequency) or physical channels (e.g. xPUSCH, xPUCCH, etc.) for polarization information feedback.

Polarization state information may consist of compensated inhomogeneous polarization information reconstructed by the polarization distortion vector measured based on reference polarization.

For example, the polarization state information may be polarization information defined as compensated Stokes Vector(s) or compensated Poincare Sphere Angle Vector(s). The polarization state information fed back may be quantized information based on a predefined method or an index representing the quantized information.

The amount of polarization state information fed back (or the size of the information) may be pre-defined/configured by a pre-arranged physical resource or physical channel.

1-6) Search Polarization Pattern

The transmitting end matches the polarization information fed back from the receiving end with the inhomogeneous polarized broad beam to find the beam direction from the transmitter to the receiver.

In the case of polarization information corresponding to a single point, the most similar polarization state is searched for by matching an inhomogeneous polarized broad beam for one compensated Stokes nector or compensated Poincare sphere angle vector.

In the case of polarization information corresponding to multiple points, the most similar polarization pattern is searched by matching the inhomogeneous polarized broad beam for compensated Stokes vectors or compensated Poincare sphere angle vectors equal to the number of multiple points.

Search for polarization state or polarization state pattern can be performed based on the above-described similarity. Specifically, the transmitting end can search for a polarization state or polarization state pattern with maximum similarity to information quantized by a high resolution polarization pattern matrix.

1-7) Beam Selection

The transmitting end selects the center orientation of the beam for unicast transmission or multicast transmission based on the polarization state or polarization state pattern searched in 1-6).

The center direction of the narrow beam is selected based on the direction of the polarization state or polarization state pattern, and the size of the divergence of the beam can be determined depending on the purpose (e.g. type of information delivered to the receiving end) at the transmitting end.

1-8) Data Transmission

The transmitting end performs (unicast or multicast based) data transmission through the beam determined according to the purpose of the transmitting end in the direction of the center of the beam determined in 1-7). At this time, the transmitted data may be user data or control data.

FIG. 34 is a diagram for explaining an inhomogeneous polarization based beam alignment procedure according to another embodiment of the present disclosure.

Referring to FIG. 34, a fixed inhomogeneous polarized beam is transmitted and a beam search is performed at the receiving end (Rx).

2-1) Predefined Homogeneous/Inhomogeneous Polarized Beam Pattern Information

The transmitting end and the receiving end can exchange information about the homogeneous polarized beam pattern in advance. As an example, the transmitting end can configure information about the homogeneous polarized beam pattern to the receiving end. Information about the homogeneous polarized beam pattern can be defined in advance at the device design stage.

The transmitting end and the receiving end can exchange information about the inhomogeneous polarized beam pattern in advance. As an example, the transmitting end can configure information about the inhomogeneous polarized beam pattern to the receiving end. Information about the inhomogeneous polarized beam pattern can be defined in advance at the design stage of the device.

As an example, information about the inhomogeneous polarized beam pattern may be quantized into a High Resolution Polarization Pattern Matrix.

As an example, information about the inhomogeneous polarized beam pattern may be defined as beam combination information that generates the inhomogeneous polarization pattern.

Beam Combination information is the generation information of each beam used in the inhomogeneous polarization beam generator of the transmitter. For example, information of $[m, A_m, \theta_m, | P_m \rangle]$ may be defined in advance for a specific element Beam m. Here, m is the LG Beam order of the element beam, $A_m$ is the Amplitude information of the element Beam m, $\theta_m$ is the phase information of the element Beam m, and $|P_m\rangle$ is the polarization information of element Beam m.

2-2) Transmit Homogeneous Polarized Broad Beam

The transmitting end transmits a homogeneous polarized broad beam through pre-arranged physical resources (Time, Frequency) for beam search or other purposes (e.g. Reference Signal for Synchronization, Channel Estimation, etc.). At this time, the homogeneous polarized broad beam is broadcast by the transmitting end.

The homogeneous polarized broad beam is the homogeneous polarization beam generated by polarization beam generator of the transmitter that has been spread out through the beam divergence controller so that it can be transmitted to the target area.

2-3) Transmit Inhomogeneous Polarized Broad Beam

The transmitting end transmits an inhomogeneous polarized broad beam through pre-arranged physical resources (Time, Frequency) for Beam Search. At this time, the inhomogeneous polarized broad beam is broadcast by the transmitting end.

The inhomogeneous polarized broad beam is a beam that spreads the inhomogeneous polarization beam generated by the inhomogeneous polarization beam generator of the transmitter so that it can be transmitted to the target area through a beam divergence controller.

2-4) Polarization Detection

The receiving end detects the reference polarization of the beam received at the receiving end's location among the homogeneous polarized broad beams through pre-arranged physical resources (Time, Frequency) for beam search or other purposes (e.g. Reference Signal for Synchronization, Channel Estimation, etc.)

Through polarization detection, distorted reference polarization state information, which is a value measured by the polarization detector of the receiver, is obtained.

The receiving end receives an inhomogeneous polarized broad beam through pre-arranged physical resources (Time, Frequency) for beam search. The receiving end detects the inhomogeneous polarization of the beam received at the location of the receiving end.

Through polarization detection, measured inhomogeneous polarization state information, which is a value measured by the polarization detector of the receiver, is obtained.

Polarization state information may be 1) single information for each of distorted reference polarization and measured inhomogeneous polarization in the case of single point detection, and 2) pattern information in the case of multiple point detection.

In the case of single point detection, polarization state information related to distorted reference polarization can be defined as a distorted Stokes Vector or distorted Poincare Sphere Angle Vector.

In the case of multiple point detection, polarization state pattern information related to distorted reference polarization can be defined as a plurality of distorted Stokes Vectors or a plurality of distorted Poincare Sphere Angle Vectors.

In the case of single point detection, polarization state information for measured inhomogeneous polarization can be defined as measured Stokes Vector or measured Poincare Sphere Angle Vector.

In the case of multiple point detection, polarization state pattern information for measured inhomogeneous polarization can be defined as a plurality of measured Stokes Vectors or a plurality of measured Poincare Sphere Angle Vectors.

2-5) Search Polarization Pattern

The receiving end determines the compensated inhomogeneous polarization state for polarization pattern search.

The compensated inhomogeneous polarization state is reconstructed by the measured polarization distortion vector based on the reference polarization.

For example, the compensated inhomogeneous polarization state can be determined based on the distorted reference polarization state and the measured inhomogeneous polarization state. The compensated inhomogeneous polarization state can be expressed based on compensated Stokes Vector (s) or compensated Poincare Sphere Angle Vector(s).

The receiving end finds a beam orientation from the transmitter to the receiver by matching the compensated inhomogeneous polarization information with the inhomogeneous polarized broad beam for the inhomogeneous polarized broad beam that is pre-arranged.

In the case of polarization information corresponding to a single point, the most similar polarization state is searched for by matching an inhomogeneous polarized broad beam for one compensated Stokes vector or compensated Poincare sphere angle vector.

In the case of polarization information corresponding to multiple points, the most similar polarization pattern is searched by matching the inhomogeneous polarized broad beam for compensated Stokes Vectors or compensated Poincare Sphere Angle Vectors equal to the number of multiple points.

Search for polarization state or polarization state pattern can be performed based on the above-described similarity.

As an example, the polarization state or polarization state pattern with maximum similarity to quantized information can be searched for by the high resolution polarization pattern matrix pre-arranged/defined in 2-1).

As an example, the receiving end can generate a high resolution polarization pattern matrix using the inhomogeneous polarization pattern reconstructed through the beam combination information pre-arranged in 2-1) using the pre-arranged quantization method. The receiving end can search for the polarization state or polarization state pattern with the maximum similarity to the polarization information corresponding to the detailed index of the generated high resolution polarization pattern matrix.

2-6) Decide Beam Index

The receiving end selects the center direction of the beam for data transmission based on the direction of the polarization state or polarization state pattern found in 2-5).

A pre-arranged beam index is determined based on the center direction of the selected beam. The relationship between the beam index and the direction of the polarization state or polarization state pattern may be agreed upon in advance.

2-7) Beam Index Feedback

The receiving end feeds back the Beam Index determined in 2-6) to the transmitting end through pre-arranged physical resources (Time, Frequency) or physical channels (e.g. xPUSCH, xPUCCH, etc.) for Beam Index Feedback.

2-8) Beam Selection

The transmitting end selects the center direction of the beam for Unicast Transmission or Multicast Transmission based on the Beam Index fed back in 2-7).

The center direction of the narrow beam is selected based on the Beam Index, and the divergence size of the beam may be determined at the transmitting end depending on the purpose (e.g. type of data being transmitted).

2-9) Data Transmission

The transmitting end performs data transmission (based on Unicast or Multicast) through the beam determined according to the purpose of the transmitting end in the direction of the center of the beam determined in 2-8). At this time, the transmitted data may be User Data or Control Data.

FIG. 35 is a diagram for explaining a homogeneous and inhomogeneous polarization based beam alignment procedure according to another embodiment of the present disclosure.

Referring to FIG. 35, inhomogeneous polarized beam information is broadcast and beam search is performed at the receiving end (Rx).

3-1) Broadcast Homogeneous/Inhomogeneous Polarized Beam Information (e.g., MIB from xPBCH, SIB from xPDSCH, . . . )

The transmitting end and the receiving end can exchange information about the homogeneous/inhomogeneous polarization beam pattern in advance.

Information about the inhomogeneous polarization beam pattern can be exchanged in advance through the initial access step or periodic broadcasting.

For example, exchange of information about homogeneous/inhomogeneous polarization beam patterns through broadcasting can be accomplished through a master information block (MIB) through xPBCH.

For example, exchange of information about homogeneous/inhomogeneous polarization beam patterns through broadcasting can be accomplished through a system information block (SIB) through xPDSCH.

That is, information about the homogeneous/inhomogeneous polarization beam pattern may be included in existing information (e.g. MIB, SIB) being broadcast.

Information on the homogeneous polarized beam pattern and the inhomogeneous polarized beam pattern may be transmitted at different times through different channels.

For example, information about the Inhomogeneous Polarized Beam Pattern may be quantized into a High Resolution Polarization Pattern Matrix.

For example, information about the Inhomogeneous Polarized Beam Pattern may be defined as Beam Combination information that generates an Inhomogeneous Polarization Pattern.

Beam Combination information is the generation information of each beam used in the Inhomogeneous Polarization Beam Generator of the transmitter. For example, information of [m, $A_m$, $\theta_m$, $|P_m\rangle$] for a specific element Beam m may be defined in advance. Here, m is the LG Beam order of the element beam, $A_m$ is the Amplitude information of the element Beam m, $\theta_m$ is the phase information of the element Beam m, and $|P_m\rangle$ is the polarization information of element Beam m.

3-2) to 3-9) are the same as 2-2) to 2-9), so duplicate descriptions are omitted.

Below, contents related to differential polarization feedback are discussed.

Differential Polarization Feedback

As previously mentioned in the description of compensated polarization feedback, the relationship between original reference polarization and distorted reference polarization according to polarization distortion can be expressed on the Poincare Sphere. Additionally, when inhomogeneous polarization beams for beam search are sequentially transmitted, measured inhomogeneous polarization state can be expressed depending on the location of the receiving end.

Hereinafter, the three polarization states described above will be described with reference to FIG. 36.

FIG. 36 is a diagram for explaining an original polarization state, distorted polarization state, and measured inhomogeneous polarization state.

In FIG. 36, it is assumed that horizontal polarization is the reference polarization in the Poincare sphere with RCP and LCP as the basis.

Even if the transmitting end broadcasts all the same homogeneous polarization based reference beam to the target areas, the distorted reference polarization of the receiving end may be measured differently due to polarization distortion that occurs depending on the location and direction of the receiving end. Accordingly, the sequentially transmitted inhomogeneous polarization pattern is also influenced and measured by the polarization distortion that occurs depending on the location and direction of the receiving end.

Therefore, the difference between distorted reference polarization and measured inhomogeneous polarization on the Poincare Sphere is defined as a differential polarization vector $P_{diff} = [\Psi_{diff}, X_{diff}]$.

The differential polarization vector represents the difference between distorted reference polarization and measured inhomogeneous polarization while experiencing the same polarization distortion on the Poincare Sphere. Therefore, the equation defining the differential polarization vector is not affected by polarization distortion.

When an inhomogeneous polarization-based broad beam is received at the receiver, the differential polarization vector can be calculated based on the distorted reference polarization measured for the homogeneous polarized broad beam and the measured inhomogeneous polarization measured for the inhomogeneous polarized broad beam.

The receiving end can perform polarization information feedback or polarization pattern search to the transmitting end based on the differential polarization vector.

The above differential polarization vector can be expressed as an equation as follows.

Differential Polarization Vector

The differential polarization vector is a polarization vector that represents the difference between the reference polarization state and the inhomogeneous polarization state affected by distortion from the perspective of the receiving end measurement.

$$\text{Differential Polarization Vector: } P_{diff} = [\Psi_{diff}, X_{diff}] = P^{(M)} - P^{(D)} = [\Psi^{(M)}, X^{(M)}] - [\Psi^{(D)}, X^{(D)}]$$

At this time, it is $\Psi_{diff} = \Psi^{(M)} - \Psi^{(D)}$ and $X_{diff} = X^{(M)} - X^{(D)}$.

$$\text{Differential Stokes Parameter: } S^{(diff)} = [S_0^{(diff)}, S_1^{(diff)}, S_2^{(diff)}, S_3^{(diff)}]$$

At this time, it is $S_0^{(diff)} = S_0^{(M)} = I$, $S_1^{(diff)} = Ip \cos \Psi_{diff} \cos X_{diff}$, $S_2^{(diff)} = Ip \sin \Psi_{diff} \cos X_{diff}$, and $S_3^{(diff)} = Ip \sin X_{diff}$.

In the above, the differential polarization vector and differential Stokes Parameter are explained from the perspective of single point detection, but it is obvious that the differential polarization vector and differential Stokes Parameter can be calculated in the same way from the perspective of multiple point detection.

Hereinafter, the homogeneous/inhomogeneous polarization based beam alignment procedure through differential polarization described above will be described.

Procedures of Homogeneous and Inhomogeneous Polarization Based Beam Alignment Via Differential Polarization The homogeneous/inhomogeneous polarization based beam alignment procedure using differential polarization is performed in the same manner as in FIGS. 33 to 35, but polarization pattern search performed at the transmitting and receiving end is performed based on differential polarization vector(s) or differential Stokes parameter(s).

Additionally, feedback information at the receiving end may include differential polarization vector(s) or differential Stokes parameter(s).

Additionally, the high resolution polarization pattern matrix can be defined in advance based on differential polarization information.

Since only differential information is used in the homogeneous/inhomogeneous polarization based beam alignment procedure using differential polarization, it is obvious that the polarization information for the homogeneous polarized broad beam can operate even if it is not shared with the receiving end.

In all of the above descriptions, the homogeneous polarized broad beam and the inhomogeneous polarized broad beam may be repeatedly transmitted at a prearranged period. At this time, the period of homogeneous polarized broad beam and inhomogeneous polarized broad beam may be different.

In all of the above descriptions, homogeneous polarized broad beam and inhomogeneous polarized broad beam can be transmitted within coherence time to ensure the performance of polarization compensation.

In all of the above descriptions, it is explained that the homogeneous polarized broad beam and the inhomogeneous polarized broad beam are transmitted sequentially, but when homogeneous polarized broad beam and inhomogeneous polarized broad beam are transmitted using different physical resources (e.g. different frequencies), it is clear that the homogeneous polarized broad beams and the inhomogeneous polarized broad beams can be transmitted simultaneously and measured separately.

All of the above operations may be performed for Beam Search in the Initial Access stage, or may be performed periodically for Beam Recovery in the RRC connection state.

All operations according to the above-described embodiment can be performed repeatedly through the Handshake Procedure to improve the accuracy of beam alignment.

All operations according to the above-described embodiment can be performed as a Hybrid Procedure combined with the existing intensity measurement method for beams to improve the accuracy of beam alignment.

For convenience of explanation, all operations according to embodiments of the present disclosure are described focusing on methods based on homogeneous polarized broad beams and inhomogeneous polarized broad beams, but it is not intended to limit the types of homogeneous information and inhomogeneous information (homogeneous pattern and inhomogeneous pattern) to polarization information (polarization pattern).

Specifically, all operations according to the embodiment of the present disclosure can be equally performed based on different types of homogeneous information and inhomogeneous information (homogeneous pattern and inhomogeneous pattern).

As an example, the homogeneous information and inhomogeneous information (homogeneous pattern and inhomogeneous pattern) may be based on intensity information (intensity pattern). That is, all operations according to the above-described embodiment can be performed equally based on the homogeneous intensity broad beam and the inhomogeneous intensity broad beam.

As an example, the homogeneous information and inhomogeneous information (homogeneous pattern and inhomogeneous pattern) may be based on phase information (phase pattern). That is, all operations according to the above-described embodiment can be performed equally based on the homogeneous phase broad beam and the inhomogeneous phase broad beam.

Hereinafter, a beam alignment method based on a plurality of polarization patterns will be described in detail.

Multiple Polarization Patterns Based Beam Alignment

Even if the problem of polarization distortion that occurs during inhomogeneous polarization based beam alignment is solved according to the previously proposed method, errors may occur due to noise in the receiver.

Specifically, since beam search is performed based on the polarization detection of the receiver, errors may occur during polarization detection due to the influence of noise at the receiver. Accordingly, beam search performance may deteriorate.

For example, when single point detection for polarization is performed at the receiver, due to the influence of noise, not the polarization related to the beam to be searched but similar polarization may be searched for in the entire inhomogeneous polarization pattern. Hereinafter, it will be described in detail with reference to FIG. 37.

FIG. 37 is a diagram to explain an effect of noise related to polarization detection.

Referring to Pattern 1 in FIG. 37, the same polarization is not repeated within the inhomogeneous polarization pattern. When compared to adjacent areas of polarization within the pattern, the amount of change is relatively small, so the area affected by noise when performing polarization detection may be relatively large.

On the other hand, referring to Pattern 2 in FIG. 37, when compared to the adjacent area of polarization within the inhomogeneous polarization pattern, the amount of change in polarization is relatively large, so the area affected by noise when performing polarization detection is relatively small. However, in the case of Pattern 2, the same polarization may be repeated within the pattern, so even if there is no effect of noise, ambiguity may occur in recognizing the direction to the actual receiving end. Additionally, due to the influence of noise, polarization search errors do not occur in adjacent areas, but an error that a remote area is searched may occur.

Below, a beam alignment method performed in the following order for solving the problem of the influence of noise or the repetition of the same polarization within a single pattern is described.

The transmitting end broadcasts multiple inhomogeneous polarization patterns. Polarization is repeatedly detected at the receiving end, and the detected polarization information is fed back to the transmitting end. Transmitting end beam alignment may be performed based on the feedback.

When the transmitting end and the receiving end share inhomogeneous polarization pattern information, they can share a plurality of inhomogeneous polarization pattern information. Specifically, a plurality of inhomogeneous polarization pattern information may be performed based on 2-1) and 3-1) of the procedures of FIGS. 33 and 34. A plurality of inhomogeneous polarization pattern information may be exchanged in advance or transmitted through a broadcast channel or the like for receiving ends. At this time, each inhomogeneous polarization pattern may be defined as high resolution polarization pattern matrix or beam combination information.

The transmitting end transmits an inhomogeneous polarized broad beam with multiple different patterns through pre-arranged physical resources (Time, Frequency) for beam search. Specifically, transmission of an inhomogeneous polarized broad beam having a plurality of different patterns can be performed based on steps 1-3), 2-3), and 3-3) of the procedures shown in FIGS. 33 to 35.

Inhomogeneous polarized broad beam is a beam with different inhomogeneous polarization patterns, and can be transmitted sequentially through time resource or simultaneously through frequency resource.

The receiving end detects the inhomogeneous polarization of each of the plurality of beams received at the location of the receiving end for the plurality of inhomogeneous polarized broad beams through pre-arranged physical resources (Time, Frequency) for beam search. Specifically, the operation of detecting inhomogeneous polarization of each of the plurality of beams received at the location of the receiving end for the plurality of inhomogeneous polarized broad beams may be performed based on steps 1-4), 2-4), and 3-4) of the procedures of FIGS. 33 to 35.

Through polarization detection for a plurality of inhomogeneous polarized broad beams, measured inhomogeneous polarization state information, which is a value measured by the polarization detector of the receiver, is obtained. The measured polarization state information can be defined as Measured Stokes Vector(s) or Measured Poincare Sphere Angle Vector(s).

At the receiving end, a plurality of measured inhomogeneous polarization state information by a plurality of beams each can be compensated or differential information can be derived, based on distorted reference polarization information which is measurement information of a homogeneous polarized broad beam.

The above operation may be performed based on steps 1-5), 2-5), and 3-5) of the procedures of FIGS. 33 to 35. Specifically, polarization information for performing polarization information feedback or performing polarization pattern search may be configured based on the following information 1) or 2).

1) Compensated inhomogeneous polarization information generated based on multiple measured inhomogeneous polarization state information and one distorted reference polarization information. At this time, compensated inhomogeneous polarization information may include a plurality of compensated inhomogeneous polarization states.
2) Differential polarization information generated based on multiple measured inhomogeneous polarization state information and one distorted reference polarization information. At this time, the differential polarization information may include a plurality of differential polarizations.

The transmitting end or the receiving end can perform a polarization pattern search through a plurality of compensated inhomogeneous polarization information or differential polarization information derived above.

The above operation may be performed based on steps 1-6), 2-5), and 3-5) of the procedures of FIGS. 33 to 35. Specifically, when a polarization pattern search is performed, the most similar polarization state is searched for by matching each inhomogeneous polarized broad beam through a plurality of compensated inhomogeneous polarization information or differential polarization information.

At this time, after each of the most similar polarization states is searched, one final polarization direction or beam direction may be determined based on the searched polarization state information. Hereinafter, it will be described in detail with reference to FIGS. 38 and 39.

Figure 38:
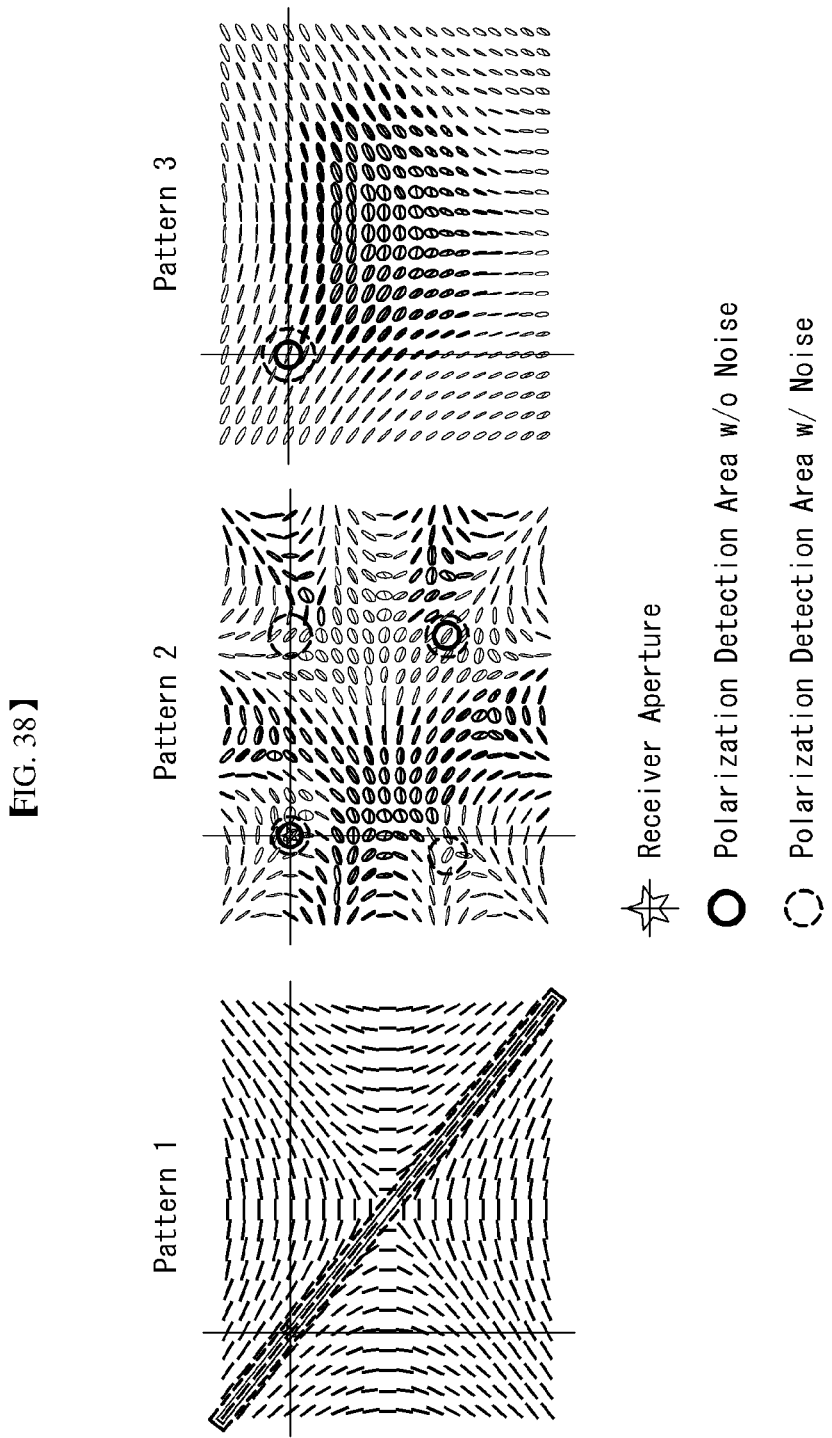
FIG. 38 is a diagram for explaining an operation in which a beam is determined based on a plurality of inhomogeneous polarization patterns according to an embodiment of the present disclosure.

FIG. 38 is a diagram for explaining an operation in which a beam is determined based on a plurality of inhomogeneous polarization patterns according to an embodiment of the present disclosure.

In FIG. 38, it is assumed that three inhomogeneous polarized broad beams based on three patterns (Patterns 1 to 3) are transmitted. Polarization detection of three inhomogeneous polarized broad beams can be performed at the receiving end.

Referring to FIG. 38, the receiver aperture is the polarization location corresponding to the area where the actual receiver is located.

Polarization detection w/o noise represents the polarization location matched through compensated inhomogeneous polarization information or differential polarization information when there is no influence of noise.

Polarization detection w/noise exemplifies the polarization areas that can be matched through compensated inhomogeneous polarization information or differential polarization information due to the influence of noise.

In the above example, the location where the detected polarization matches for each pattern may be different, and the degree of noise influence may vary depending on the pattern.

Pattern 1 has symmetrical characteristics along the x-axis and y-axis, so compensated inhomogeneous polarization information or differential polarization information can be matched to multiple polarization locations.

In Pattern 2, the amount of change in polarization is relatively large compared to the adjacent area of polarization within the inhomogeneous polarization pattern, so the area affected by noise may be relatively small when performing polarization detection.

In Pattern 3, the same polarization is not repeated in the inhomogeneous polarization pattern, so the polarization can be matched closely to the actual receiver aperture location, but when compared to adjacent areas of polarization within the pattern, the amount of change is relatively small, so the area affected by noise may be relatively large when performing polarization detection.

In the following, polarization matching based on the simulation parameters below is examined.

Simulation Parameters
SNR (by Shot & Beat Noise): 10 dB
Beam Waist: $w0=15.6$ mm (width of the beam at $z=0$)
Wavelength=1550 nm FIG. 39 is a diagram showing simulation results related to an operation of determining a beam based on a plurality of inhomogeneous polarization patterns according to an embodiment of the present disclosure.

FIG. 39 is a diagram based on a polarization state by instantaneous measurement in a given simulation environment.

Referring to FIG. 39, an original receiver aperture location is a polarization location corresponding to the direction in which the actual receiver aperture is located. Candidate polarization state is the result of matching the five polarization locations most similar to the measured polarization state in the entire inhomogeneous polarization pattern when polarization is measured at the receiver while affected by noise.

Since Pattern 1 has symmetrical characteristics along the x-axis and y-axis, it can be seen that it is matched at multiple polarization locations. In the case of Pattern 3, since the same polarization is repeated within the pattern, it can be seen that the two polarization locations are matched. On the other hand, Pattern 2 and Pattern 3 are matched at a similar polarization location, but may be matched in an area far from the original receiver aperture due to the influence of noise.

As seen in FIGS. 38 and 39, the polarization direction or beam direction must be found comprehensively by considering the polarization locations matched in the patterns with each of the above characteristics.

According to one embodiment, polarization pattern search may be performed based on any one of the following algorithms.

Algorithm 1) Centroid Method for Multiple Polarization Information

The polarization location matched in each pattern is defined as $(x_{i^{(l)}}, y_{j^{(l)}})$.

l is an index representing the lth inhomogeneous polarization pattern when a total of L inhomogeneous polarization broad beams are transmitted.

$i^{(l)}$, $j^{(l)}$ is an index representing the (i, j)th Polarization State of the high resolution polarization pattern matrix of the lth inhomogeneous polarization pattern. The index corresponding to the (i, j)th polarization state of the high resolution polarization pattern matrix of each inhomogeneous polarization pattern can be calculated as follows.

$$(i, j) = \arg\min_{i,j} \sqrt{\begin{array}{c}(P_{i,j}(S_1) - S_1^{(detected)})^2 + \\ (P_{i,j}(S_2) - S_2^{(detected)})^2 + \\ (P_{i,j}(S_3) - S_3^{(detected)})^2\end{array}}, i, j = 1, \ldots, N$$

Here, $P_{i,j}(S_k)$ means the kth Stokes parameter of the (i, j)th polarization state of the high resolution polarization pattern matrix. $S_k^{(detected)}$ is the kth Stokes parameter derived through the polarization state received through detection or feedback. At this time, Stokes parameter includes S0, S1, S2, and S3, but among them, S1 to S3 can be used for polarization detection. Specifically, since S0 is total intensity, S1 to S3 corresponding to polarization state can be used for polarization detection. Therefore, excluding the intensity that can be changed by channel, $P_{i,j}(S_k)$ and $S_k^{(detected)}$ can be obtained through Stokes parameters normalized by $P_{i,j}(S_0)$ and $S_0^{(detected)}$, respectively. For example, the above equation can be constructed using $\overline{P_{i,j}(S_k)} = P_{i,j}(S_k)/P_{i,j}(S_0)$ or $\overline{S_k(detected)} = S_k^{(detected)}/S_0^{(detected)}$.

The detected/feedbacked polarization state can be compensated by the reference beam or the Stokes parameter determined as a differential value. The corresponding Stokes parameter may be $S^{(C)} = [S_0^{(C)}, S_1^{(C)}, S_2^{(C)}, S_3^{(C)}]$ or $S^{(diff)} = [S_0^{(diff)}, S_1^{(diff)}, S_2^{(diff)}, S_3^{(diff)}]$.

Centroid for the index value of the high resolution polarization pattern matrix matched for each inhomogeneous polarized broad beam can be derived through the following equation.

$$C_i = \frac{\sum_{l=1}^{L} w^{(l)} i^{(l)}}{\sum_{l=1}^{L} w^{(l)}}, C_j = \frac{\sum_{l=1}^{L} w^{(l)} j^{(l)}}{\sum_{l=1}^{L} w^{(l)}}$$

Here, $w^{(l)}$ is a weight value for the lth inhomogeneous polarization pattern. The weight value can be configured to be larger for the inhomogeneous polarization pattern, which has a small noise impact, than for the inhomogeneous polarization pattern, which has a large noise impact. Alternatively, if a total of L inhomogeneous polarization broad beams are transmitted, the centroid value can be obtained from the polarization locations $(x_{i^{(l)}}, y_{j^{(l)}})$ matched for each inhomogeneous polarization broad beam as follows.

$$C_x = \frac{\sum_{l=1}^{L} w^{(l)} x_{i^{(l)}}}{\sum_{l=1}^{L} w^{(l)}}, C_y = \frac{\sum_{l=1}^{L} w^{(l)} y_{j^{(l)}}}{\sum_{l=1}^{L} w^{(l)}}$$

Therefore, when a total of L inhomogeneous polarization broad beams are transmitted, the beam index can be determined through the index corresponding to the final polarization derived by the centroid method. For example, the beam index can be determined based on the following equation.

$$b = (\text{Round}(C_i) - 1) * N + (\text{Round}(C_j) - 1) * N, b = 1, \ldots, N^2$$

In the above, Round $(C_i)$ refers to a function that rounds the $C_i$ value to the nearest integer.

Alternatively, when a total of L inhomogeneous polarization broad beams are transmitted, the center direction of the beam can be determined by the location coordinate $(C_x, C_y)$ representing the direction corresponding to the final polarization derived by the centroid method.

Algorithm 2) Centroid Method with K-Means Clustering for Multiple Polarization Information Since the centroid method of Algorithm 1 is a centroid method for multiple polarization matching, the final performance can be greatly affected when a very large matching error occurs instantaneously due to the influence of noise, etc. Therefore, multiple polarization matching points can be grouped through K-means clustering, and the final polarization can be determined through the centroid method only for the most dominant group.

The concept of K-means clustering can be summarized as follows.

Step 1: Configuring K random centroid values based on the configured K values

Step 2: Grouping multiple polarization matching points to the closest point among the K configured centroids Step 3: Calculating centroid point based on the polarization matching point of each Group Step 4: If the centroid point has changed, performing again from Step 2, if the centroid point has not changed, ending clustering Among the clusters derived above, only the cluster with the largest number of polarization matching points is selected, and centroid calculation is performed only with the polarization matching points of the cluster. Through this, beam index selection or location coordinates can be determined in the same manner as the procedure in Algorithm 1.

FIGS. 40 and 41 are diagrams showing simulation results related to a polarization pattern detection algorithm.

FIG. 40 shows simulation performance according to Case 1 for Algorithm 1 and Algorithm 2. In FIG. 40, the simulation parameters are configured as follows.

SNR (by Shot & Beat Noise): 0 dB~20 dB
Iteration=1000 (at each SNR point)
Beam Waist: w0=15.6 mm (width of the beam at z=0)
Wavelength=1550 nm
L=4, K=2, N=201
$w^{(l)}=1$ for all l FIG. 41 shows simulation performance according to Case 2 for Algorithm 1 and Algorithm 2. In FIG. 41, the simulation parameters are configured as follows.
SNR (by Shot & Beat Noise): 0 dB~20 dB
Iteration=1000 (at each SNR point)
Beam Waist: w0=15.6 mm (width of the beam at z=0)
Wavelength=1550 nm
L=4, K=2, N=201
$w^{(l)}=1$ for all l It is obvious that the pattern search algorithm described above can be replaced with an algorithm that optimizes performance in terms of implementation.

As mentioned earlier, homogeneous information and inhomogeneous information according to embodiments of the present disclosure may be based on types of information other than polarization information.

As an example, homogeneous information may be based on any one of homogeneous polarization information, homogeneous intensity information, or homogeneous phase information. The uniform information may also be referred to as a uniform pattern (e.g. uniform polarization pattern, uniform intensity pattern, or uniform phase pattern).

As an example, inhomogeneous information may be based on any one of inhomogeneous polarization information, inhomogeneous intensity information, or inhomogeneous phase information. The inhomogeneous information may also be referred to as an inhomogeneous pattern (e.g. inhomogeneous polarization pattern, inhomogeneous intensity pattern, or inhomogeneous phase pattern).

Therefore, in the application of the embodiment according to the present disclosure, an operation based on the homogeneous/inhomogeneous polarization pattern may be interpreted as an operation based on the homogeneous/inhomogeneous intensity pattern or the homogeneous/inhomogeneous phase pattern.

It is obvious that the relationship between a homogeneous polarized broad beam and a plurality of inhomogeneous polarized broad beam described above can be replaced and applied by the relationship between a homogeneous intensity broad beam and a plurality of inhomogeneous intensity broad beams.

It is obvious that the relationship between a homogeneous polarized broad beam and a plurality of inhomogeneous polarized broad beams described above can be replaced and applied by the relationship between a homogeneous phase broad beam and a plurality of inhomogeneous phase broad beams.

The relationship between the homogeneous polarized broad beam and the plurality of inhomogeneous polarized broad beams described above can be mapped as 1:1 or 1:N. Hereinafter, it will be described in detail with reference to FIGS. 42 and 43.

FIG. 42 is a diagram illustrating one homogeneous polarized broad beam and a plurality of inhomogeneous polarized broad beams transmitted according to an embodiment of the present disclosure. In FIG. 42, a system in which one homogeneous polarized broad beam and three inhomogeneous polarized broad beams are transmitted is assumed.

Referring to FIG. 42, a homogeneous polarized broad beam is represented by RS, and a plurality of inhomogeneous polarized broad beams are represented by IP 1 to IP 3 according to the Pattern Index. Below, with reference to FIG. 43, the relationship between RS and IP1 to IP3 will be described.

FIG. 43 is a diagram illustrating relationship between one homogeneous polarized broad beam and a plurality of inhomogeneous polarized broad beams transmitted according to an embodiment of the present disclosure.

Referring to (a) of FIG. 43, when RS is transmitted once within the Coherence Time, IP 1 to IP 3 are transmitted sequentially. Referring to (b) of FIG. 43, IP 1 to IP 3 are each transmitted together with RS within the coherence time. That is, whenever RS is transmitted, IP (one of IP 1 to IP 3) is transmitted.

Here, coherence time is different from coherence time related to channel fluctuation. The coherence time refers to the time during which polarization distortion remains the same (or within a range based on a specific threshold). Specifically, the coherence time may refer to the time during which the polarization distortion occurring depending on the location and orientation of the receiving end or the polarization distortion occurring by the optical wireless channel remains the same (or similar based on a specific threshold).

The relationship between the homogeneous polarized broad beam and the plurality of inhomogeneous polarized broad beams as described above can be defined in advance and shared between the transmitting and receiving ends. The coherence time, which defines the relationship between a homogeneous polarized broad beam and a plurality of inhomogeneous polarized broad beams, can be defined in advance based on a specific threshold.

The example of FIG. 43 illustrates that a homogeneous polarized broad beam and a plurality of inhomogeneous polarized broad beams are sequentially transmitted using the time axis, but it is obvious that a homogeneous polarized broad beam and a plurality of inhomogeneous polarized broad beams can be distinguished through the frequency axis (different frequency resources) and transmitted simultaneously.

The example of FIG. 43 illustrates that beam alignment can be performed on an inhomogeneous polarized broad beam through a homogeneous polarized broad beam and a plurality of inhomogeneous polarized broad beams, but it is obvious that beam alignment can be performed on an inhomogeneous intensity broad beam through a homogeneous intensity broad beam and a single or a plurality of inhomogeneous intensity broad beams.

The example of FIG. 43 illustrates that beam alignment can be performed on an inhomogeneous polarized broad beam through a homogeneous polarized broad beam and a plurality of inhomogeneous polarized broad beams, but it is obvious that beam alignment can be performed on the inhomogeneous phase broad beam through a homogeneous phase broad beam and a single or a plurality of inhomogeneous phase broad beams.

According to the above-described embodiment, the following effects are obtained.

In a communication system where a pencil beam is used, the number of physical resources required for beam search can be reduced, and the time required for beam search is also reduced accordingly.

When the inhomogeneous polarization based beam alignment is performed, the problem of polarization distortion that may occur depending on channel influence or receiver alignment direction can be solved.

Additionally, when the inhomogeneous polarization based beam alignment is performed, the problem of polarization detection distortion, which may occur due to noise in the receiver detector, can be solved.

In terms of implementation, operations (e.g. operations related to beam alignment based on homogeneous/inhomogeneous polarized beams) according to the above-described embodiments can be processed by the devices (e.g. processors 202a and 202b in FIG. 2) of FIGS. 1 to 5 described above.

Additionally, operations (e.g. operations related to beam alignment based on homogeneous/inhomogeneous polarized beams) according to the above-described embodiments may be stored in memory (e.g. 204a, 204b in FIG. 2) in the form of instructions/programs (e.g. instruction, executable code) for driving at least one processor (e.g. processors 202a and 202b in FIG. 2).

Hereinafter, the above-described embodiments will be described in detail with reference to FIG. 44 in terms of operation of the wireless device (e.g. a first wireless device 200a, a second wireless device 200b in FIG. 2). The methods described below are divided for convenience of explanation, and it goes without saying that some components of one method may be replaced with some components of another method or may be applied in combination with each other.

FIG. 44 is a flowchart for explaining a method performed by a first wireless device in a wireless communication system according to an embodiment of the present disclosure.

Referring to FIG. 44, a method performed by a first wireless device in a wireless communication system according to an embodiment of the present disclosure includes transmitting a first signal to which a first specific beam is applied (S4410), transmitting a second signal to which a second specific beam is applied (S4420), receiving feedback information (S4430), and determining a beam based on feedback information (S4440). As mentioned above in relation to homogeneous information/inhomogeneous information (homogeneous pattern/inhomogeneous pattern), among the terms described in the following description, polarization can be interpreted/applied by changing to intensity or phase.

In S4410, the first wireless device transmits the first signal to which the first specific beam is applied to a second wireless device.

According to one embodiment, the first wireless device may be a base station (BS) or a user equipment (UE), and the second wireless device may be a user equipment (UE) or a base station (BS).

According to one embodiment, the first signal may be based on a first optical beam related to a homogeneous pattern.

According to one embodiment, based on the first signal, one or more first specific states related to the homogeneous pattern may be determined. The one or more first specific states may be based on the distorted reference polarization described above.

According to one embodiment, the homogeneous pattern may be based on a homogeneous polarization pattern, a homogeneous intensity pattern, or a homogeneous phase pattern. According to the above-described S4410, the operation of transmitting the first signal to which the first specific beam is applied by the first wireless device (e.g. 200a in FIG. 2) to the second wireless device (e.g. 200b in FIG. 2) can be implemented by the devices of FIGS. 1 to 5. For example, referring to FIG. 2, one or more processors 202a may control one or more transceivers 206a and/or one or more memories 204a to transmit the first signal to which the first specific beam is applied to the second wireless device 200b.

In S4420, the first wireless device transmits the second signal to which the second specific beam is applied to the second wireless device.

According to one embodiment, the second signal may be based on a second optical beam related to an inhomogeneous pattern.

According to one embodiment, based on the second signal, one or more second specific states related to the inhomogeneous pattern may be determined. The one or more second specific states may be based on the measured inhomogeneous polarization described above.

According to one embodiment, the first optical beam may be one broad beam based on one homogeneous pattern, and the second optical beam may include a plurality of broad beams based on a plurality of inhomogeneous patterns. This embodiment may be based on at least one of the embodiments proposed to resolve noise effects at the receiving end.

The one or more second specific states may include one or more states determined from each of the plurality of inhomogeneous patterns.

According to one embodiment, the inhomogeneous pattern may be based on an inhomogeneous polarization pattern, an inhomogeneous intensity pattern, or an inhomogeneous phase pattern.

According to the above-described S4420, the operation of transmitting the second signal to which the second specific beam is applied by the first wireless device (e.g. 200a in FIG. 2) to the second wireless device (e.g. 200b in FIG. 2) can be implemented by the devices of FIGS. 1 to 5. For example, referring to FIG. 2, one or more processors 202a may control one or more transceivers 206a and/or one or more memories 204a to transmit the second signal to which the second specific beam is applied to the second wireless device 200b.

In S4430, the first wireless device receives feedback information generated based on the first signal and the second signal from the second wireless device.

According to one embodiment, the feedback information may represent one or more third specific states. The feedback information may be information related to compensation for polarization distortion or differential polarization.

The one or more third specific states may be determined based on the one or more first specific states and the one or more second specific states.

According to one embodiment, based on the feedback information being related to compensation of distortion of the second optical beam, the one or more third specific states may be based on one or more compensated specific states generated by compensating the distortion from the one or more second specific states. This embodiment may be based on at least one of the embodiments related to polarization distortion compensation and compensated polarization feedback described above.

Compensation for the distortion may be performed based on a distortion vector determined based on the one or more first specific states.

The distortion vector may be determined based on the difference between a pre-configured reference state and the one or more first specific states.

The pre-configured reference state may be an original state based on the homogeneous pattern.

According to one embodiment, based on the feedback information being related to differential information, the one or more third specific states may be based on a differential vector. This embodiment may be based on at least one of the embodiments related to differential polarization feedback described above.

The differential vector may be determined based on a difference between the one or more first specific states and the one or more second specific states.

According to the above-described S4430, the operation of receiving feedback information generated based on the first signal and the second signal by the first wireless device (e.g. 200a in FIG. 2) from the second wireless device (e.g. 200b in FIG. 2) may be implemented by the devices of FIGS. 1 to 5. For example, referring to FIG. 2, one or more processors 202a may include one or more transceivers 206a and/or one or more memories 204a to receive feedback information generated based on the first signal and the second signal from a second wireless device 200b.

In S4440, the first wireless device determines a beam related to the second wireless device based on the feedback information.

According to one embodiment, the beam related to the second wireless device may be determined based on a beam index mapped to the one or more third specific states.

According to the above-described S4440, the operation of determining a beam related to the second wireless device (e.g. 200b in FIG. 2) based on the feedback information by the first wireless device (e.g. 200a in FIG. 2) may be implemented by the devices of FIGS. 1 to 5. For example, referring to FIG. 2, one or more processors 202a may control one or more transceivers 206a and/or one or more memories 204a to determine a beam related to the second wireless device 200b based on the feedback information.

For convenience, the above-described operations have been described focusing on the operation of the first wireless device, however, this does not mean that application of the method based on the embodiment of the present disclosure is limited to the operation of the first wireless device. That is, the transmission operation of the first wireless device may be interpreted as the reception operation of the second wireless device, and the reception operation of the first wireless device may be interpreted as the transmission operation (e.g. transmitting feedback information) of the second wireless device.

In other words, the above-described operations may be interpreted as a method performed by a second wireless device in a wireless communication system. A method performed by the second wireless device in the wireless communication system includes receiving a first signal to which a first specific beam is applied from a first wireless device, receiving a second signal to which a second specific beam is applied from a first wireless device, generating feedback information based on the first signal and the second signal, and transmitting the feedback information to the first wireless device. At this time, a beam related to the second wireless device may be determined based on the feedback information.

Here, the wireless communication technology implemented in the device (200a, 200b) of the present disclosure may include LTE, NR, and 6G as well as Narrowband Internet of Things (NB-IoT) for low-power communication. For example, the NB-IoT technology may be an example of a LPWAN (Low Power Wide Area Network) technology, and may be implemented in standards such as LTE Cat NB1 and/or LTE Cat NB2, and is not limited to the above-described name. Additionally or alternatively, the wireless communication technology implemented in the device (200a, 200b) of the present disclosure may perform communication based on the LTE-M technology. For example, the LTE-M technology may be an example of LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the device (200a, 200b) of the present disclosure may include at least one of ZigBee, Bluetooth, and Low Power Wide Area Network (LPWAN) in consideration of low power communication, and is not limited to the above-described name. For example, the ZigBee technology may generate PAN (personal area networks) related to small/low-power digital communication based on various standards such as IEEE 802.15.4, and may be called by various names.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method performed by a first wireless device in a wireless communication system, comprising:
transmitting a first signal to which a first specific beam is applied to a second wireless device;

transmitting a second signal to which a second specific beam is applied to the second wireless device;

receiving feedback information generated based on the first signal and the second signal from the second wireless device; and determining a beam related to the second wireless device based on the feedback information, wherein the first signal is based on a first optical beam related to a homogeneous pattern, wherein the second signal is based on a second optical beam related to an inhomogeneous pattern, wherein one or more first specific states related to the homogeneous pattern are determined based on the first signal, wherein one or more second specific states related to the inhomogeneous pattern are determined based on the second signal, wherein the feedback information represents one or more third specific states, wherein the one or more third specific states are determined based on the one or more first specific states and the one or more second specific states, and wherein the beam related to the second wireless device is determined based on a beam index mapped to the one or more third specific states.

2. The method of claim 1, wherein, based on the feedback information being related to compensation of distortion of the second optical beam, wherein the one or more third specific states are based on one or more compensated specific states generated by compensating the distortion from the one or more second specific states.

3. The method of claim 2, wherein the compensation of the distortion is performed based on a distortion vector determined based on the one or more first specific states.

4. The method of claim 3, wherein the distortion vector is determined based on a difference between a pre-configured reference state and the one or more first specific states.

5. The method of claim 4, wherein the pre-configured reference state is an original state based on the homogeneous pattern.

6. The method of claim 1, wherein, based on the feedback information being related to differential information, the one or more third specific states are based on a differential vector.

7. The method of claim 6, wherein the differential vector is determined based on a difference between the one or more first specific states and the one or more second specific states.

8. The method of claim 1, wherein the first optical beam is one broad beam based on one homogeneous pattern, and wherein the second optical beam includes a plurality of broad beams based on a plurality of inhomogeneous patterns.

9. The method of claim 8, wherein the one or more second specific states include one or more states determined from each of the plurality of inhomogeneous patterns.

10. The method of claim 1, wherein the homogeneous pattern is based on a homogeneous polarization pattern, a homogeneous intensity pattern, or a homogeneous phase pattern, and wherein the inhomogeneous pattern is based on an inhomogeneous polarization pattern, an inhomogeneous intensity pattern, or an inhomogeneous phase pattern.

11. A first wireless device operating in a wireless communication system, comprising:

one or more transceivers;

one or more processors controlling the one or more transceivers; and one or more memories operably connected to the one or more processors, and storing instructions that configure the one or more processors to perform operations when being executed by the one or more processors, wherein the operations include:

transmitting a first signal to which a first specific beam is applied to a second wireless device;

transmitting a second signal to which a second specific beam is applied to the second wireless device;

receiving feedback information generated based on the first signal and the second signal from the second wireless device; and determining a beam related to the second wireless device based on the feedback information, wherein the first signal is based on a first optical beam related to a homogeneous pattern, wherein the second signal is based on a second optical beam related to an inhomogeneous pattern, wherein one or more first specific states related to the homogeneous pattern are determined based on the first signal, wherein one or more second specific states related to the inhomogeneous pattern are determined based on the second signal, wherein the feedback information represents one or more third specific states, wherein the one or more third specific states are determined based on the one or more first specific states and the one or more second specific states, and wherein the beam related to the second wireless device is determined based on a beam index mapped to the one or more third specific states.

12. The first wireless device of claim 11, wherein the first wireless device is a base station (BS), and the second wireless device is a user equipment (UE).

13. One or more non-transitory computer-readable medium storing one or more instructions, wherein the one or more instructions configure the one or more processors to perform operations when being executed by the one or more processors, wherein the operations include:

transmitting a first signal to which a first specific beam is applied to a second wireless device;

transmitting a second signal to which a second specific beam is applied to the second wireless device;

receiving feedback information generated based on the first signal and the second signal from the second wireless device; and determining a beam related to the second wireless device based on the feedback information, wherein the first signal is based on a first optical beam related to a homogeneous pattern, wherein the second signal is based on a second optical beam related to an inhomogeneous pattern, wherein one or more first specific states related to the homogeneous pattern are determined based on the first signal, wherein one or more second specific states related to the inhomogeneous pattern are determined based on the second signal, wherein the feedback information represents one or more third specific states, wherein the one or more third specific states are determined based on the one or more first specific states and the one or more second specific states, and wherein the beam related to the second wireless device is determined based on a beam index mapped to the one or more third specific states.

* * * * *